(12) United States Patent
Van Baelen et al.

(10) Patent No.: US 11,740,421 B2
(45) Date of Patent: Aug. 29, 2023

(54) COMMUNICATIONS PANEL SYSTEM

(71) Applicant: CommScope Technologies LLC, Hickory, NC (US)

(72) Inventors: David Jan Irma Van Baelen, Winksele (BE); John T. Pfarr, Le Sueur, MN (US); Michael J. Wentworth, Belle Plaine, MN (US); Scott C. Sievers, Jordan, MN (US); Wouter Vranken, Nieuwrode (BE); Austin Holcomb, Minnetonka, MN (US); James J. Solheid, Minneapolis, MN (US); Matthew J. Holmberg, Le Center, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/675,921

(22) Filed: Feb. 18, 2022

(65) Prior Publication Data

US 2022/0260799 A1   Aug. 18, 2022

Related U.S. Application Data

(60) Provisional application No. 63/150,828, filed on Feb. 18, 2021, provisional application No. 63/166,558, filed on Mar. 26, 2021, provisional application No. 63/214,106, filed on Jun. 23, 2021, provisional application No. 63/310,963, filed on Feb. 16, 2022.

(51) Int. Cl.
*G02B 6/00* (2006.01)
*G02B 6/44* (2006.01)

(52) U.S. Cl.
CPC ......... *G02B 6/4452* (2013.01); *G02B 6/4455* (2013.01)

(58) Field of Classification Search
CPC ....... G02B 6/4452; G02B 6/4455; G02B 6/00
See application file for complete search history.

(56) References Cited

U.S. PATENT DOCUMENTS

| | | | |
|---|---|---|---|
| 5,816,863 A | 10/1998 | Reichle | |
| 6,647,197 B1 | 11/2003 | Marrs et al. | |
| 7,310,471 B2 * | 12/2007 | Bayazit | G02B 6/4471 385/137 |

(Continued)

FOREIGN PATENT DOCUMENTS

| | | |
|---|---|---|
| CA | 286637 A | 1/1929 |
| CA | 3 019 081 A1 | 4/2019 |

(Continued)

OTHER PUBLICATIONS

6RU Front-Access V-Panel (FVP), Datasheet, AFL Hyperscale, 4 pages (Apr. 30, 2020).

(Continued)

*Primary Examiner* — Jennifer Doan
(74) *Attorney, Agent, or Firm* — Merchant & Gould P.C.

(57) ABSTRACT

A communications panel includes a chassis receiving one or more tray arrangements that each support one or more cassettes. Each cassette carries a plurality of ports at which connections are made between front and rear plug connectors. Each tray arrangement includes guides along which the cassettes slidably mount. The guides and cassettes are configured to enable cassettes of various size to mount to the same tray without reconfiguring the guides.

21 Claims, 77 Drawing Sheets

(56) References Cited

U.S. PATENT DOCUMENTS

| | | |
|---|---|---|
| 7,347,633 B2 | 3/2008 | Minota |
| 7,689,089 B2 | 3/2010 | Wagner et al. |
| 7,751,674 B2 | 7/2010 | Hill |
| 7,945,138 B2 | 5/2011 | Hill et al. |
| 7,962,000 B2 | 6/2011 | Wagner et al. |
| 8,009,954 B2 | 8/2011 | Bran de León et al. |
| 8,059,932 B2 | 11/2011 | Hill et al. |
| 8,346,046 B2 | 1/2013 | Wagner et al. |
| 8,374,477 B2 | 2/2013 | Hill |
| 8,433,171 B2 | 4/2013 | Cooke et al. |
| 8,452,148 B2 | 5/2013 | Cooke et al. |
| 8,712,206 B2 | 4/2014 | Cooke et al. |
| 8,923,013 B2 | 12/2014 | Anderson et al. |
| 8,953,924 B2 | 2/2015 | Cote et al. |
| 8,985,862 B2 | 3/2015 | Cote et al. |
| 9,020,320 B2 | 4/2015 | Cooke et al. |
| 9,134,497 B2 | 9/2015 | Guzzo et al. |
| 9,341,801 B2 | 5/2016 | Clatanoff et al. |
| 9,442,265 B2 | 9/2016 | Hill et al. |
| 9,535,230 B2 * | 1/2017 | Newbury ............ G02B 6/4472 |
| 9,678,295 B2 | 6/2017 | Giraud et al. |
| 9,690,064 B2 | 6/2017 | Sauter et al. |
| 9,690,065 B2 | 6/2017 | Wiltjer et al. |
| 9,709,765 B2 | 7/2017 | Wells et al. |
| 9,841,574 B1 | 12/2017 | Pilon |
| 9,864,158 B2 | 1/2018 | Wiltjer et al. |
| 9,910,236 B2 | 3/2018 | Cooke et al. |
| 10,048,460 B2 | 8/2018 | Courchaine et al. |
| 10,054,750 B2 | 8/2018 | Hsu et al. |
| 10,185,108 B2 | 1/2019 | Fontaine |
| 10,215,944 B2 | 2/2019 | Sedor et al. |
| 10,268,013 B2 | 4/2019 | Wiltjer et al. |
| 10,281,672 B1 | 5/2019 | Mullsteff |
| 10,317,637 B2 | 6/2019 | Wiltjer et al. |
| 10,332,429 B2 | 6/2019 | Pilon |
| 10,359,595 B2 | 7/2019 | Aramayo et al. |
| 10,416,406 B1 | 9/2019 | Ebrahimi et al. |
| 10,422,971 B2 | 9/2019 | Cooke et al. |
| 10,429,603 B2 | 10/2019 | Hsu |
| 10,444,456 B2 | 10/2019 | Cooke et al. |
| 10,451,828 B1 | 10/2019 | Ebrahimi et al. |
| 10,459,184 B2 | 10/2019 | Cooke et al. |
| 10,514,518 B1 | 12/2019 | Livingston et al. |
| 10,551,585 B2 | 2/2020 | Mullsteff |
| 10,564,377 B2 | 2/2020 | Franzke et al. |
| 10,564,378 B2 | 2/2020 | Cooke et al. |
| 10,571,640 B2 | 2/2020 | Berridge |
| 10,598,884 B2 | 3/2020 | Fontaine et al. |
| 10,606,013 B2 | 3/2020 | Wiltjer et al. |
| 10,613,286 B2 | 4/2020 | Courchaine et al. |
| 10,641,980 B2 | 5/2020 | Sledzinski |
| 10,656,359 B2 | 5/2020 | Fontaine et al. |
| 10,670,822 B2 | 6/2020 | Vogel |
| 10,698,171 B2 | 6/2020 | Wiltjer et al. |
| 10,718,919 B2 | 7/2020 | Courchaine et al. |
| 10,725,258 B2 | 7/2020 | Sedor et al. |
| 10,761,285 B2 | 9/2020 | Courchaine et al. |
| 10,768,385 B2 | 9/2020 | Wiltjer et al. |
| 10,795,107 B2 | 10/2020 | Pilon |
| 10,802,235 B2 | 10/2020 | Ebrahimi et al. |
| 10,809,479 B2 | 10/2020 | Crawford et al. |
| 10,823,927 B2 | 11/2020 | Ebrahimi et al. |
| 10,823,928 B2 | 11/2020 | Vogel |
| 10,845,561 B1 | 11/2020 | Courchaine et al. |
| 10,852,499 B2 | 12/2020 | Cooke et al. |
| 10,852,501 B2 | 12/2020 | Livingston et al. |
| 10,928,603 B2 | 2/2021 | Roa-Quispe et al. |
| 10,955,634 B2 | 3/2021 | Giraud et al. |
| 10,962,730 B2 | 3/2021 | Hill et al. |
| 10,969,554 B2 | 4/2021 | Guzzo |
| 11,022,770 B2 | 6/2021 | Campbell et al. |
| 11,105,995 B2 | 8/2021 | Wiltjer et al. |
| 11,169,346 B2 | 11/2021 | Courchaine et al. |
| 11,169,347 B2 | 11/2021 | Vogel |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2011/0228473 A1 | 9/2011 | Anderson et al. |
| 2011/0267794 A1 | 11/2011 | Anderson et al. |
| 2012/0134639 A1* | 5/2012 | Giraud ................ G02B 6/4454 |
| | | 385/135 |
| 2013/0148936 A1 | 6/2013 | Hill |
| 2014/0226946 A1 | 8/2014 | Cooke et al. |
| 2014/0348480 A1 | 11/2014 | Giraud et al. |
| 2015/0370025 A1 | 12/2015 | Wells et al. |
| 2016/0033732 A1 | 2/2016 | Giraud et al. |
| 2017/0131500 A1 | 5/2017 | Sauter et al. |
| 2017/0353014 A1 | 12/2017 | Fontaine et al. |
| 2017/0357071 A1 | 12/2017 | Pilon |
| 2018/0003913 A1 | 1/2018 | Takeuchi et al. |
| 2018/0224621 A1 | 8/2018 | Campbell et al. |
| 2019/0154936 A1 | 5/2019 | Sedor et al. |
| 2019/0310426 A1 | 10/2019 | Pilon et al. |
| 2020/0064576 A1 | 2/2020 | Pilon et al. |
| 2020/0081214 A1 | 3/2020 | Roa-Quispe et al. |
| 2020/0124815 A1 | 4/2020 | Cooke et al. |
| 2020/0124816 A1 | 4/2020 | Berridge |
| 2020/0158975 A1 | 5/2020 | Berridge et al. |
| 2020/0158977 A1 | 5/2020 | Vogel |
| 2020/0183090 A1 | 6/2020 | Pilon et al. |
| 2020/0200988 A1 | 6/2020 | Vogel |
| 2020/0209499 A1 | 7/2020 | Hill et al. |
| 2020/0225434 A1 | 7/2020 | Ruiz |
| 2020/0233171 A1 | 7/2020 | Cooke et al. |
| 2020/0310060 A1 | 10/2020 | Guzzo |
| 2020/0310061 A1 | 10/2020 | Livingston et al. |
| 2020/0310064 A1 | 10/2020 | Crawford et al. |
| 2020/0341223 A1 | 10/2020 | Sedor et al. |
| 2020/0371304 A1 | 11/2020 | Wiltjer et al. |
| 2020/0379201 A1 | 12/2020 | Courchaine et al. |
| 2020/0400908 A1 | 12/2020 | Pilon |
| 2021/0018711 A1 | 1/2021 | Courchaine et al. |
| 2021/0080671 A1 | 3/2021 | Bell et al. |
| 2021/0096317 A1 | 4/2021 | Ripumaree et al. |
| 2021/0099229 A1 | 4/2021 | Cox et al. |
| 2021/0116663 A1 | 4/2021 | Pilon et al. |
| 2021/0140248 A1 | 5/2021 | Villiger et al. |
| 2021/0173164 A1 | 6/2021 | Guzzo |
| 2021/0231899 A1 | 7/2021 | Ye |
| 2021/0294057 A1 | 9/2021 | Berridge et al. |
| 2022/0026654 A1 | 1/2022 | Vogel |
| 2022/0035113 A1 | 2/2022 | Courchaine et al. |

FOREIGN PATENT DOCUMENTS

| | | |
|---|---|---|
| CH | 688 120 A5 | 5/1997 |
| CN | 207081867 U | 3/2018 |
| CN | 207081868 U | 3/2018 |
| CN | 210155372 U | 3/2020 |
| DE | 10 2015 108 528 A1 | 12/2016 |
| DE | 10 2020 106 399 A1 | 9/2020 |
| DE | 20 2021 104 069 U1 | 9/2021 |
| EP | 0 346 613 A1 | 12/1989 |
| EP | 3 361 846 A1 | 8/2018 |
| EP | 3 404 461 A1 | 11/2018 |
| EP | 2 888 617 B1 | 11/2019 |
| EP | 3 660 564 A1 | 6/2020 |
| EP | 3 660 565 A1 | 6/2020 |
| EP | 2 929 388 B1 | 11/2020 |
| EP | 3 767 354 A1 | 1/2021 |
| WO | 2008/045994 A2 | 4/2008 |
| WO | 2008/154626 A2 | 12/2008 |
| WO | 2014/088981 A1 | 6/2014 |
| WO | 2014/095310 A1 | 6/2014 |
| WO | 2016/040548 A1 | 3/2016 |
| WO | 2017/021116 A1 | 2/2017 |
| WO | 2017/072022 A1 | 5/2017 |
| WO | 2018/005222 A1 | 1/2018 |
| WO | 2019/005479 A2 | 1/2019 |
| WO | 2019/160672 A1 | 8/2019 |
| WO | 2019/246181 A1 | 12/2019 |
| WO | 2020/109326 A1 | 6/2020 |
| WO | 2020/109327 A1 | 6/2020 |
| WO | 2020/197579 A1 | 10/2020 |

(56) References Cited

FOREIGN PATENT DOCUMENTS

OTHER PUBLICATIONS

ASCEND™ High Density Solutions, BRO-13084, AFL, 16 pages (Jul. 9, 2019).
Assembly instructions for MTP HD module support 1HE Pro, Connect Com, pp. 1-7 (Copyright Jul. 2020).
Centrix™ Platform, Family Spec Sheet 0230_NAFTA_AEN, Corning Optical Communications LLC, pp. 1-16 (Mar. 7, 2016).
Connections 56, Specialist magazine by Reichle & De-Massari AG, pp. 1-35 (Apr. 2019).
Data Center Solutions, Connectivity Solutions Direct, pp. 1-3 (Sep. 2019).
DCX System Optical Distribution Frame, Belden Inc., pp. 1-11 (Copyright 2019).
EDGE8® Solutions, Spec Sheet LAN-2266-AEN, Corning Optical Communications, pp. 1-39 (Jan. 24, 2020).
EDGE™ and EDGE8™, LAN-1935-AEN, Corning Optical Communications, 2 pages (Jun. 2017).
EDGE™ Product Families, LAN-1405-AEN, Corning Optical Communications, 2 pages (May 2018).
EDGE™ Solutions for Enterprise Data Centers and Storage Area Networks, Spec Sheet LAN-2267-AEN, Corning Optical Communications, pp. 1-43 (Jun. 15, 2020).
Enhanced Management Frame (EMF), Family Spec Sheet 0168_NAFTA_AEN, Corning Optical Communications, pp. 1-26 (Nov. 17, 2016).
Fiber Management Systems LiSA Front Access, Edition 2015, Huber & Suhner AG, pp. 1-34 (Aug. 2015).
Fiber Management Systems LiSA Side Access, Edition 2015, Huber & Suhner AG, pp. 1-46 (Aug. 2015).
Fiber Optic System Catalogue LiSA, Edition 2014, Huber & Suhner AG, 202 pages (Aug. 2014).
Fiber Systems, E19 7700A, Leviton Manufacturing Co., Inc, pp. 1-15 (Admitted as prior art as of Jan. 6, 2021).
FVP Pre-Terminated Replacement Cassette, Datasheet, AFL Hyperscale, 3 pages (Apr. 30, 2020).
HD Flex Patch Panel, Installation Instructions, FS128B, Panduit Corp., pp. 1-16 (Copyright 2018).
HD Flex™ Fiber Cabling System Ordering Guide, FBCB45-SA-ENG Replaces FBCB29, Panduit Corp., 12 pages (Sep. 2018).
HD Flex™ Fiber Cabling System, FBCB46-SA-ENG replaces FBCB28, Panduit Corp., 12 pages (Nov. 2018).
HD Flex™ Fiber Optic Cassettes, Specification Sheet, FBSP96-WW-ENG, Panduit Corp., 5 pages (Apr. 2018).
HD Flex™ Fiber Panel, Specification Sheet, FBSP120-WW-ENG, Panduit Corp., 2 pages (Copyright 2017).
HD82 High Density Fiber Optic Deployment Solution, Tactical Deployment Systems LLC, 14 pages (Copyright 2020).
Judge, "Connectivity Solutions claims densest data center fiber," DataCenterDynamics, 3 pages (Jan. 24, 2020).
N+1™ Housing, 61013 rev., Connectivity Solutions Direct, 2 pages (May 2019).
N+1™ Platform Installation Instructions, 95-100001 Rev B, Connectivity Solutions Direct, pp. 1-8 (Copyright 2020).
Netscale Solutions Delivering the highest 10/40/100 GbE density of any fiber solution out there, R330415/1.0d, Reichle & De-Massari AG, 20 pages (Jun. 2016).
Netscale-Solutions Delivering the highest fiber density, R330415/1.0e, Reichle & De-Massari AG, 8 pages (Aug. 2016).
Press Release, "New Leviton Opt-X® UHDX Enclosure Meets the Demands for Maximum Density and Minimum Patching Congestion," Leviton Manufacturing Co., Inc., 3 pages (Aug. 27, 2015).
Prime ODF the New Generation of Optical Distribution Systems, PRIME-ODF_01.19_EN/02.19, Reichle & De-Massari AG, 3 pages (Feb. 2019).
Secure Solutions Ordering Guide, LAN-1852-AEN, Corning Optical Communications, pp. 1-87 (Apr. 2020).
Ultra High Density (UHD) MPO Module, Datasheet, AFL Hyperscale, 5 pages (Jan. 7, 2020).
Ultra High Density 1U Chassis, Datasheet, AFL Hyperscale, 4 pages (Jan. 8, 2020).
Ultra High Density 2U Chassis, Datasheet, AFL Hyperscale, 4 pages (Mar. 20, 2020).
Ultra High Density Splice Module, Datasheet, AFL Hyperscale, 3 pages (Feb. 24, 2020).
International Search Report and Written Opinion for Application No. PCT/US2022/017088 dated Jun. 7, 2022.

* cited by examiner

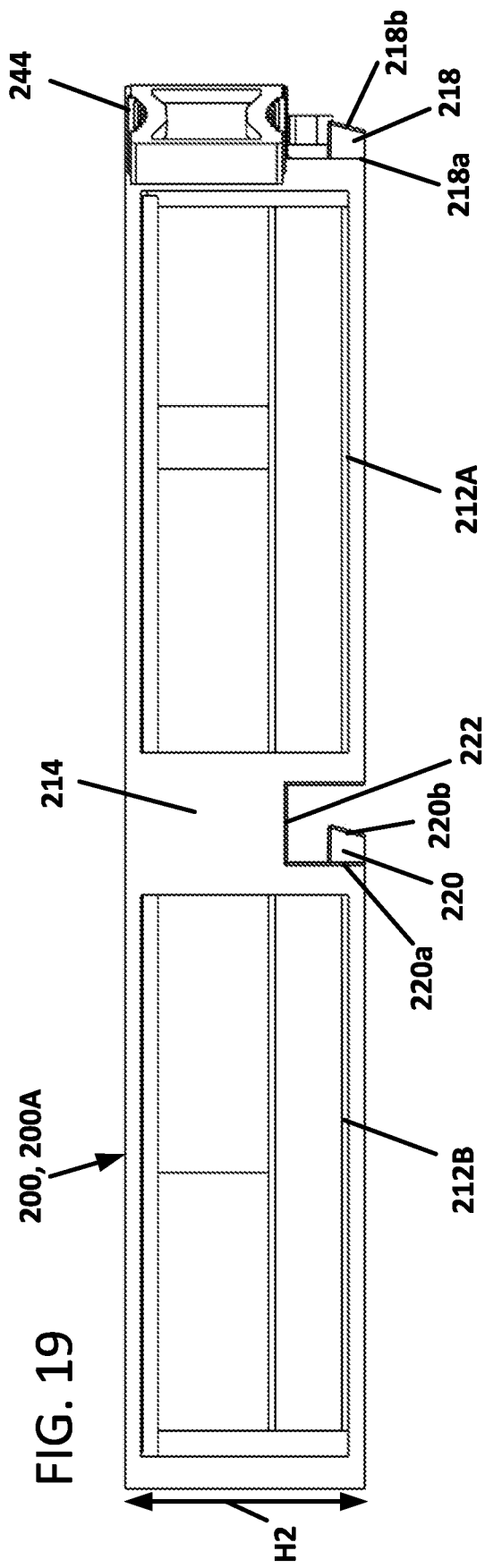
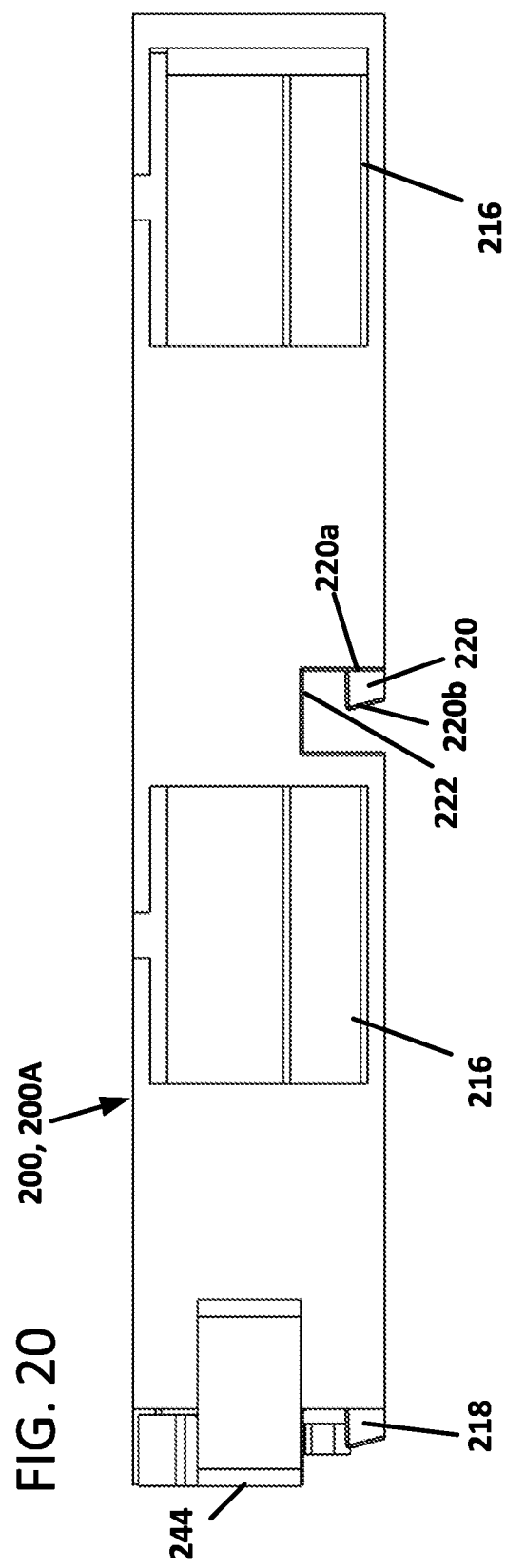

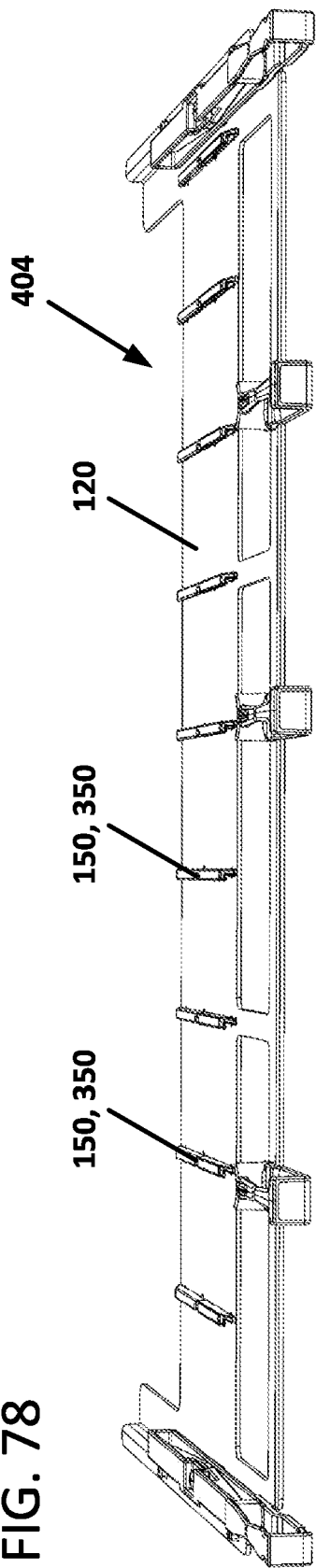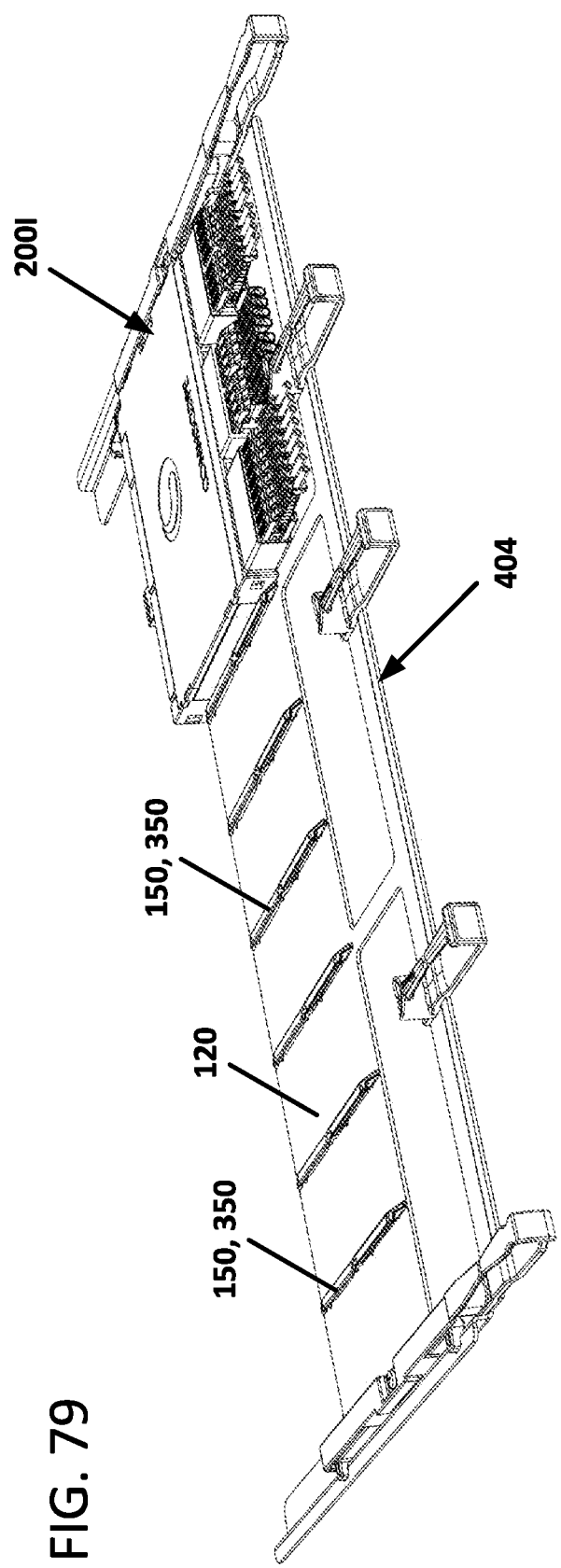
FIG. 78
FIG. 79

COMMUNICATIONS PANEL SYSTEM

CROSS-REFERENCE TO RELATED APPLICATIONS

This application claims priority from U.S. Provisional Application Ser. No. 63/150,828, filed Feb. 18, 2021, and titled "Communications Panel System;" U.S. Provisional Application Ser. No. 63/166,558, filed Mar. 26, 2021, and titled "Communications Panel System;" U.S. Provisional Application Ser. No. 63/214,106, filed Jun. 23, 2021, and titled "Communications Panel System;" and U.S. Provisional Application Ser. No. 63/310,963, filed Feb. 16, 2022, and titled "Communications Panel System," the disclosures of which are incorporated herein by reference in their entirety.

BACKGROUND

In the telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

In communications panel systems, port members (e.g., optical adapters, electrical jacks, hybrid port members, etc.) defining front ports are mounted to one or more trays that are disposable within a chassis. The front ports are configured to receive plug connectors at the fronts of the trays. The trays can either be stationary within a chassis or can slide forwardly of the chassis to enhance access to the port members.

Improvements are desired.

SUMMARY

A communications panel includes a chassis holding one or more trays. Each tray spans a width and depth of the chassis. In some implementations, the trays are stationary within the chassis. In other implementations, the trays are slidable within the chassis between two or more positions. Each tray is configured to support one or more cassettes carrying ports (e.g., optical ports, electrical ports, or hybrid ports) to receive plug connectors. A tray populated with one or more cassettes is referred to herein as a communications arrangement. The cassettes are slidably mounted to the tray along guides.

Some aspects of the disclosure are directed to a communications arrangement including a tray carrying guides configured to slidingly receive a plurality of cassettes along the guides from either the front end of the tray or from the rear end of the tray at the discretion of the user. The guides and cassettes are configured so the cassette sizes need not be in integer increments of each other. For example, the tray may receive a first cassette having a first width and a second cassette having a second width that is 1.5 times the first width. Accordingly, the same tray can be fully populated by a plurality of cassettes having the first width or by a plurality of cassettes having the second width at the discretion of the user without modifying the guides or the tray. Alternatively, trays of different widths can be mixed on the tray.

Other aspects of the disclosure are directed to a communications arrangement including a tray having parallel guides spaced apart along a lateral axis of the tray, the guides extending along a forward-rearward axis of the tray that is perpendicular to the lateral axis. One or more cassettes can be mounted to the tray to slide along the guides. Each cassette has a latching arrangement that releasably locks to a respective one of the guides. The latching arrangement includes a release handle that slides relative to the cassette along an actuation axis that is parallel to the forward-rearward axis of the tray. Pulling or pushing the release handle forwardly releases the lock between the cassette and the respective guide. Continuing to pull or push the release handle forwardly slides the cassette forwardly along the guides. Similarly, pulling or pushing the release handle rearwardly releases the lock between the cassette and the respective guide. Continuing to pull or push the release handle rearwardly slides the cassette rearwardly along the guides.

Other aspects of the disclosure are directed to a communications arrangement including a tray carrying a plurality of parallel guides spaced a common distance from each other along a lateral axis of the tray. The space disposed between adjacent guides is referred to herein as a bay. One or more cassettes are mounted to the tray to slide along the guides. Each cassette spans at least two bays. Each guide is configured to inter-connect with no more than one cassette.

Other aspects of the disclosure are directed to a tray carrying generally parallel guides that each define cassette engagement structure facing in a first direction. None of the guides define cassette engagement structure facing in a second direction opposite the first direction. For example, each guide may define a groove facing in the first direction and a wall facing in the second direction.

Other aspects of the disclosure are directed to a cassette extending along a width between opposite first and second ends and along a length between front and rear ends. The length is orthogonal to the width. The cassette defines a bottom channel extending along the length of the cassette. In certain implementations, the cassette includes a bottom rail disposed within the bottom channel. The bottom rail extends from a base end attached to the cassette to a free end. In certain examples, the bottom rail extends parallel with the width of the cassette.

Other aspects of the disclosure are directed to a cassette extending across a width between opposite first and second ends. The cassette includes an end rail at the first end. The cassette is devoid of rails at the second end. In certain implementations, the cassette defines a bottom channel extending along a depth of the cassette orthogonal to the width. In certain examples, the cassette includes a bottom rail disposed within the bottom channel. In an example, the end rail and the bottom rail of each cassette extend in a common direction from a base end to a free end.

Other aspects of the disclosure are directed to a communications arrangement including a tray having parallel guides spaced apart along a lateral axis of the tray, the guides extending along a forward-rearward axis of the tray. The guides each define a notch through a top of the guide. One or more cassettes are mounted to the tray to slide along the guides. Each cassette has a latching arrangement at an end of the cassette that rides over the top of a respective one of the guides. The latching arrangement includes a stop member that drops into the notch of the respective guide to lock the cassette to the guide. The latching arrangement also includes a release handle that is actuated by moving the release handle in a different direction from the stop member. In certain examples, the release handle is moved orthogonally to the movement of the stop member. In an example, the release handle is moved along the forward-rearward axis of the tray. The release handle may extend forwardly and/or rearwardly relative to the front and rear ends of the cassette.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 19 is a front elevational view of the first cassette of FIG. 17 with the front and rear port members removed;

FIG. 20 is a rear elevational view of the first cassette of FIG. 19;

FIG. 78 is a top perspective view of an example tray arrangement suitable for receiving cassettes of the type shown in FIGS. 74-77;

FIG. 79 is a top perspective view of the cassette of FIG. 74 loaded onto the tray arrangement of FIG. 78;

DETAILED DESCRIPTION

Figure 1:
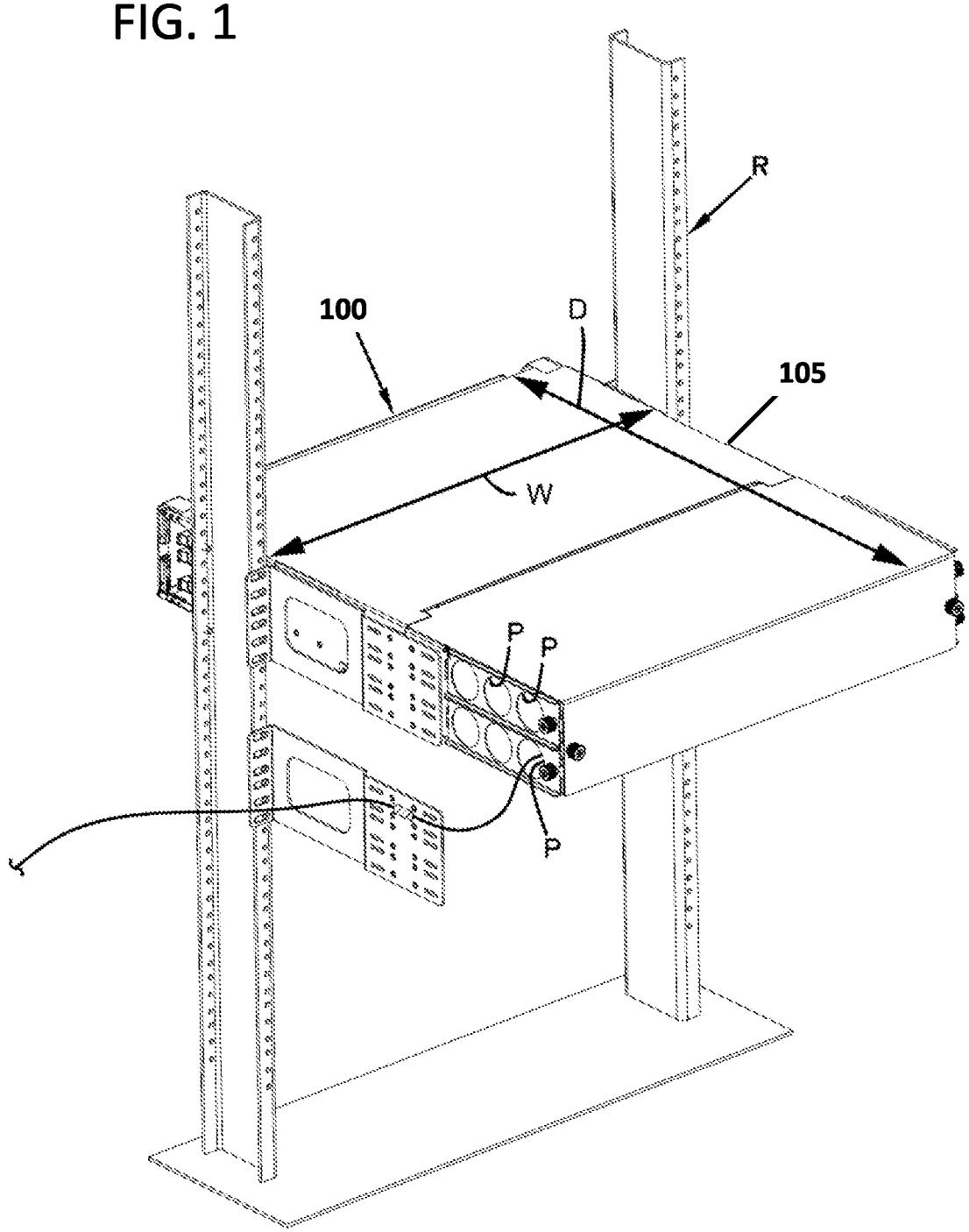
FIG. 1 is a perspective view of an example communications panel system including a chassis mounted to a rack, the chassis being configured to hold a plurality of tray arrangements.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a communications panel 100 configured to mount to a rack R. The communications panel 100 includes a chassis 105 holding one or more tray arrangements 110, 310 (e.g., see FIGS. 3-7). Each tray arrangement 110, 310 spans a width W of the chassis 105. In some implementations, the tray arrangements 110, 310 are stationary within the chassis 105. In other implementations, the tray arrangements 110, 310 are slidable along a depth D of the chassis 105 between two or more positions. Each tray arrangement 110, 310 is configured to support one or more cassettes 200 carrying ports (e.g., optical ports, electrical ports, hybrid ports, etc.) configured to receive plug connectors. A tray arrangement 110, 310 populated with one or more cassettes 200 is referred to herein as a communications arrangement 108.

As will be discussed in more detail herein, a cassette 200 carries one or more front ports at a front of the cassette 200. The front ports are configured to receive plug connectors. In some implementations, the front ports are optical ports configured to receive optical plug connectors. In other implementations, the front ports may be electrical ports configured to receive electrical plug connectors, hybrid ports configured to receive hybrid plug connectors, or a mixture thereof. In some implementations, a cassette 200 carries single-fiber front ports (e.g., LC front ports). In other implementations, a cassette 200 carries multi-fiber front ports (e.g., MPO front ports, SN front ports offered by Senko, etc.). In still other implementations, the same cassette 200 may carry a mix of two or more types of front ports (e.g., a mixture of MPO and LC ports).

In some implementations, the cassette 200 carries one or more rear ports (e.g., optical port, electrical port, hybrid port, etc.) at the rear of the cassette 200. Each rear port is configured to receive a plug connector. Intermediate optical fibers within the cassette connect the front and rear ports. In other implementations, the cassette 200 carries ports only at the front of the cassette 200. In such implementations, a rear of the cassette 200 is configured to enable optical fibers or one or more optical fiber cables to extend into/onto the cassette 200 and be routed towards the front ports.

Figure 2:
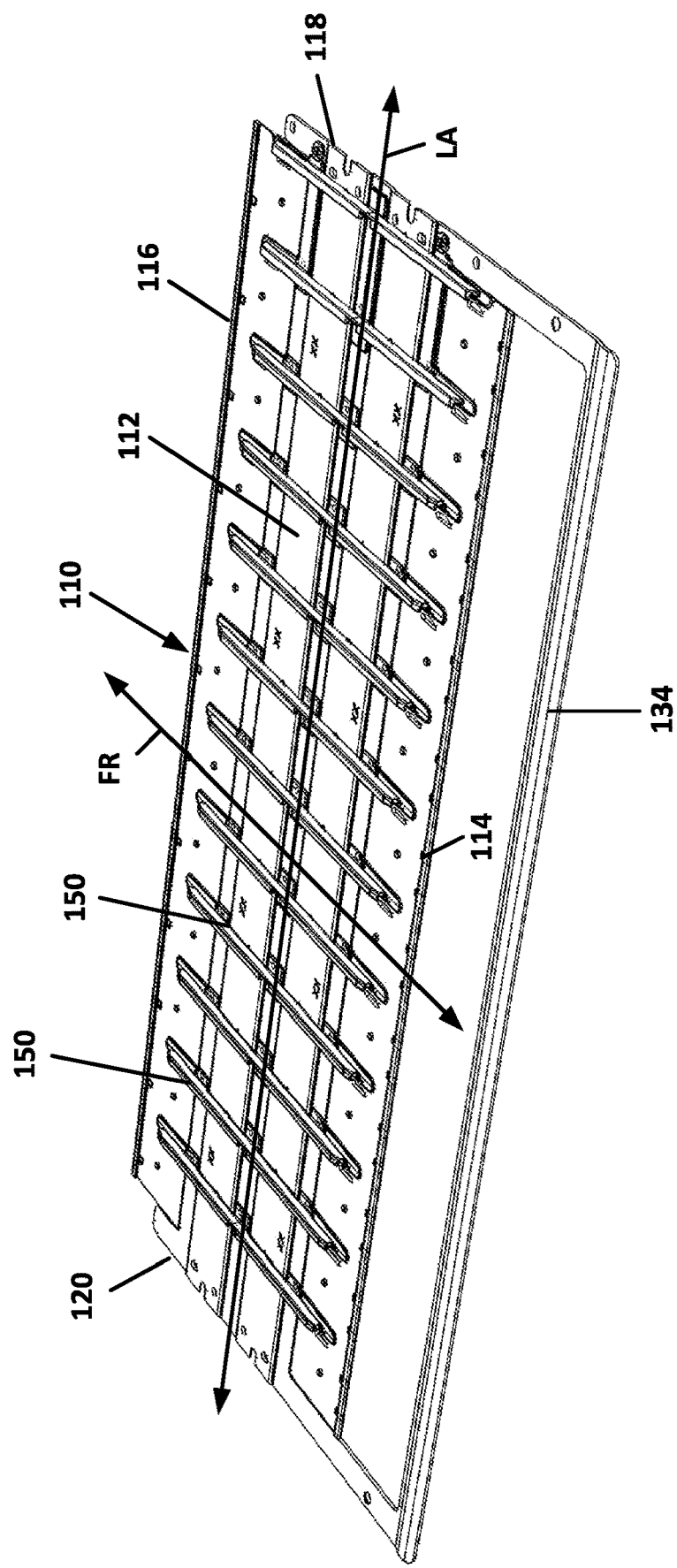
FIG. 2 is a perspective view of an example tray arrangement configured to be mounted within the chassis of FIG. 1, the tray arrangement including a tray carrying a plurality of guides.

The cassettes 200 are slidably mounted to the tray arrangement 110, 310 along guides 150, 350. As shown in FIG. 2, the tray arrangement 110, 310 includes a main region 112, 312 that extends along a forward-rearward axis FR between a front end 114, 314 and a rear end 116, 316 of the main region 112, 312. The main region 112, 312 also extends along a lateral axis LA between opposite first and second ends 118, 120, 318, 320 of the main region 112, 312. The main region 112, 312 of the tray arrangement 110, 310 carries the guides 150, 350. Each guide 150, 350 extends parallel to the forward-rearward axis FR. The guides 150, 350 are spaced from each other along the lateral axis LA.

The guides 150, 350 are configured to slidingly receive a plurality of cassettes 200 along the guides 150, 350 from either the front end 114, 314 of the main region 112, 312 or from the rear end 116, 316 of the main region 112, 312 at a discretion of a user. Interaction between the guides 150, 350 and the cassettes 200 will be discussed in more detail herein.

The guides 150, 350 and the cassettes 200 are configured so the sizes of the cassettes 200 need not be in integer increments of each other to each fit on the same tray arrangement 110, 310 with the same configuration of guides 150, 350. For example, the tray arrangement 110, 310 may receive a first cassette 200 having a first width and a second cassette having a second width that is 1.5 times the first width. Accordingly, the same tray can be fully populated by a plurality of cassettes having the first width or by a plurality of cassettes having the second width at the discretion of the user without modifying the guides or the tray. In other cases, trays of different widths can be mixed on the tray.

Figure 3:
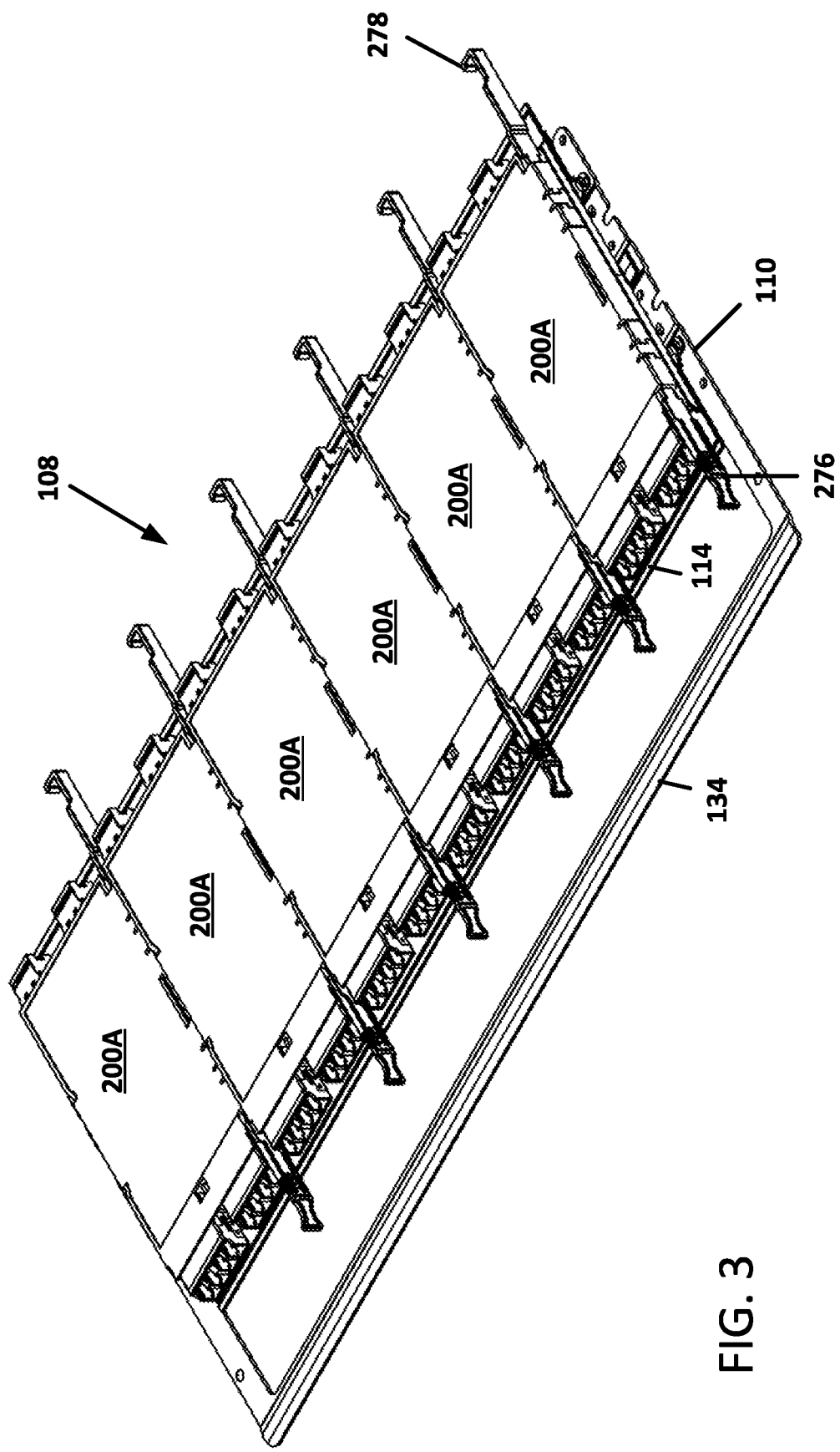
FIG. 3 is a perspective view of the tray arrangement of FIG. 2 shown populated with a plurality of cassettes to form a communications arrangement, the cassettes each having a first width.
Figure 4:
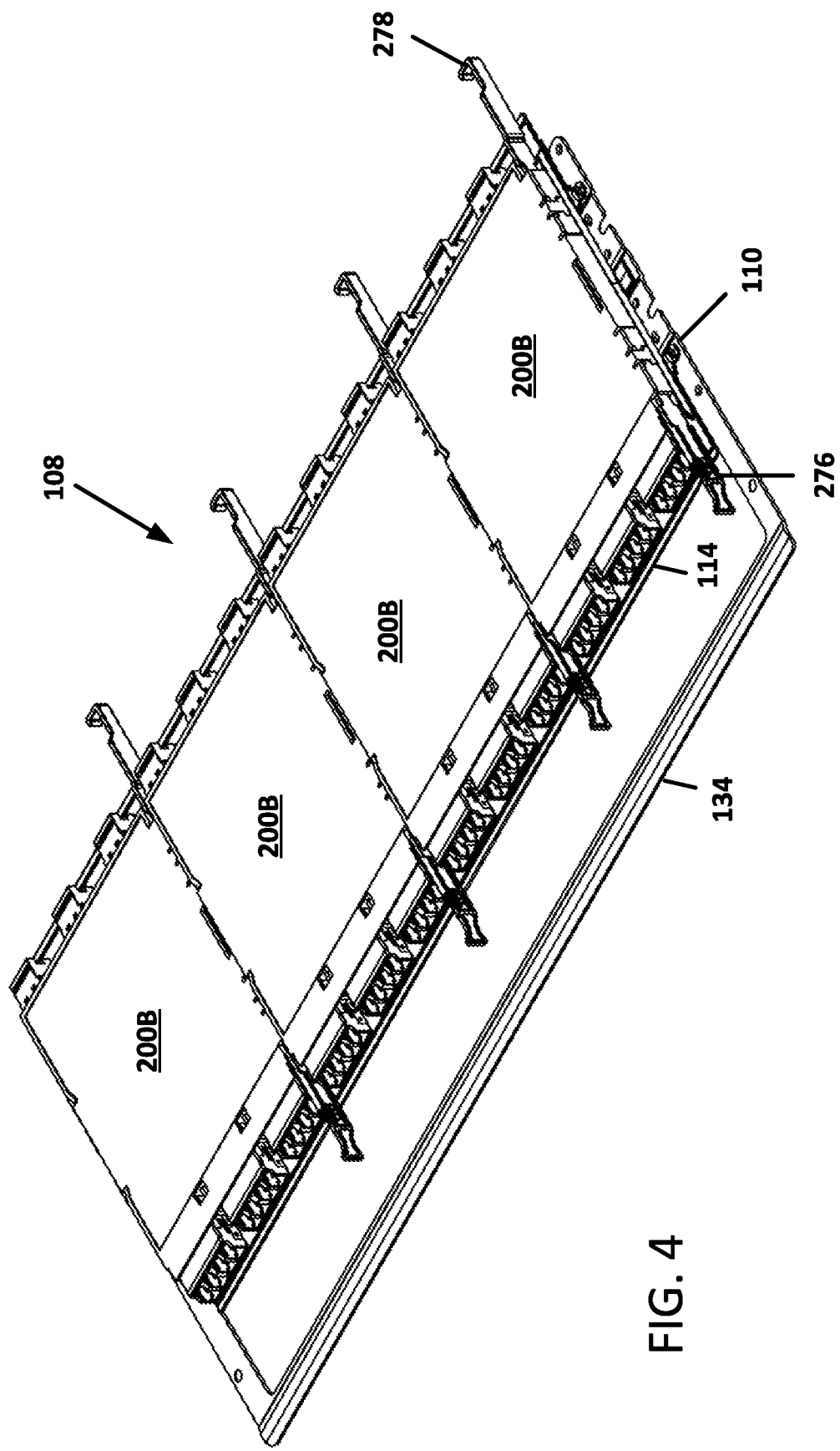
FIG. 4 is a perspective view of the tray arrangement of FIG. 2 shown populated with a plurality of cassettes each having a second width, the second width being about 1.5 times the first width.
Figure 5:
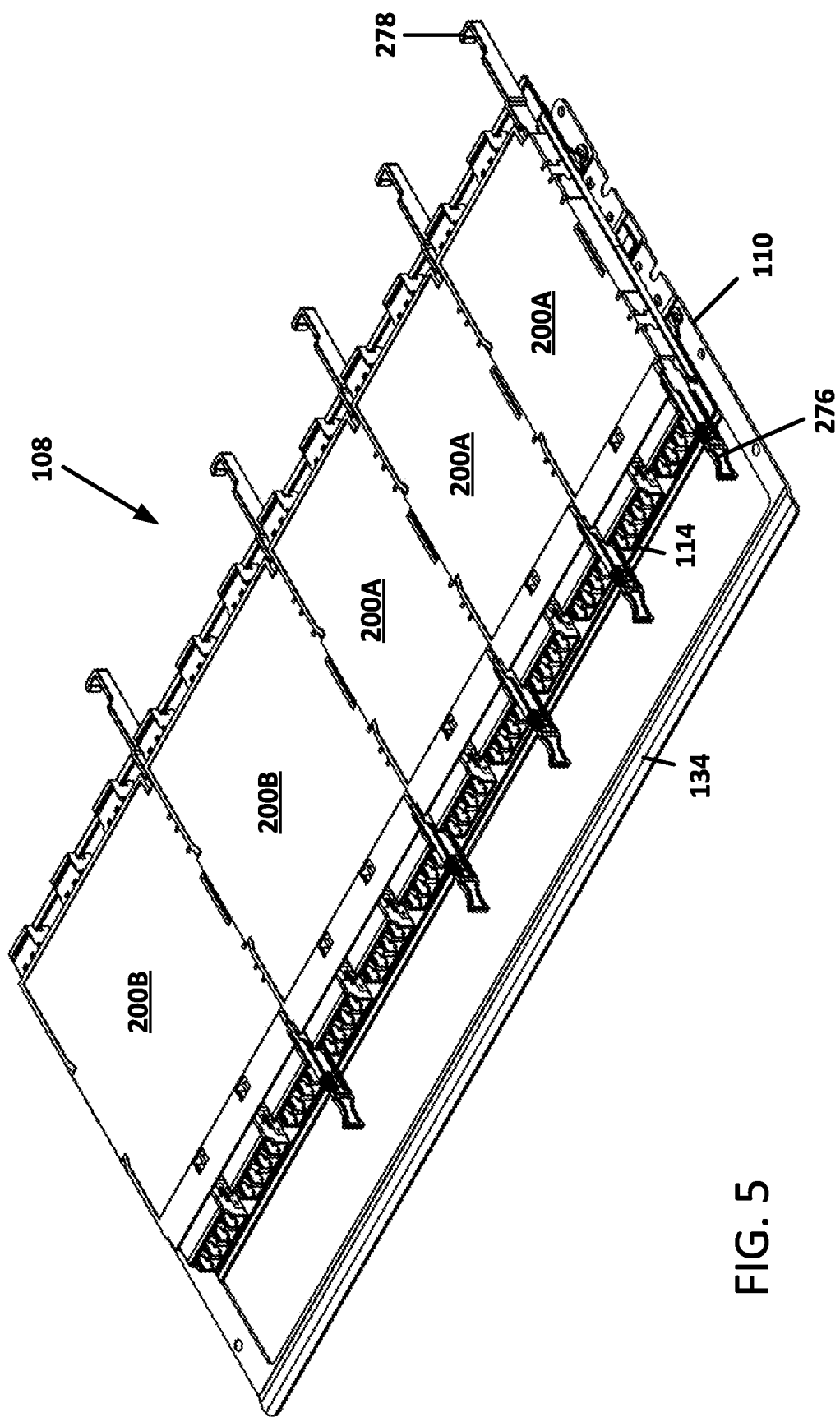
FIG. 5 is a perspective view of the tray arrangement of FIG. 2 shown populated with a mixture of the cassettes of FIGS. 3 and 4.

In FIG. 3, the tray arrangement 110 of FIG. 2 is shown fully populated by first cassettes 200A having the first width to form a first example communications arrangement 108. FIG. 4 shows the tray arrangement 110 of FIG. 2 fully populated by second cassettes 200B having a second width that is larger than the first width to form a second example communications arrangement 108. The configuration (e.g., positioning or spacing) of the guides 150 has not been modified between the two images. In the example shown, the second width is about 1.5 times the first width. FIG. 5 shows the tray arrangement 110 of FIG. 2 populated by a combination of the first and second cassettes 200A, 200B.

Figure 6:
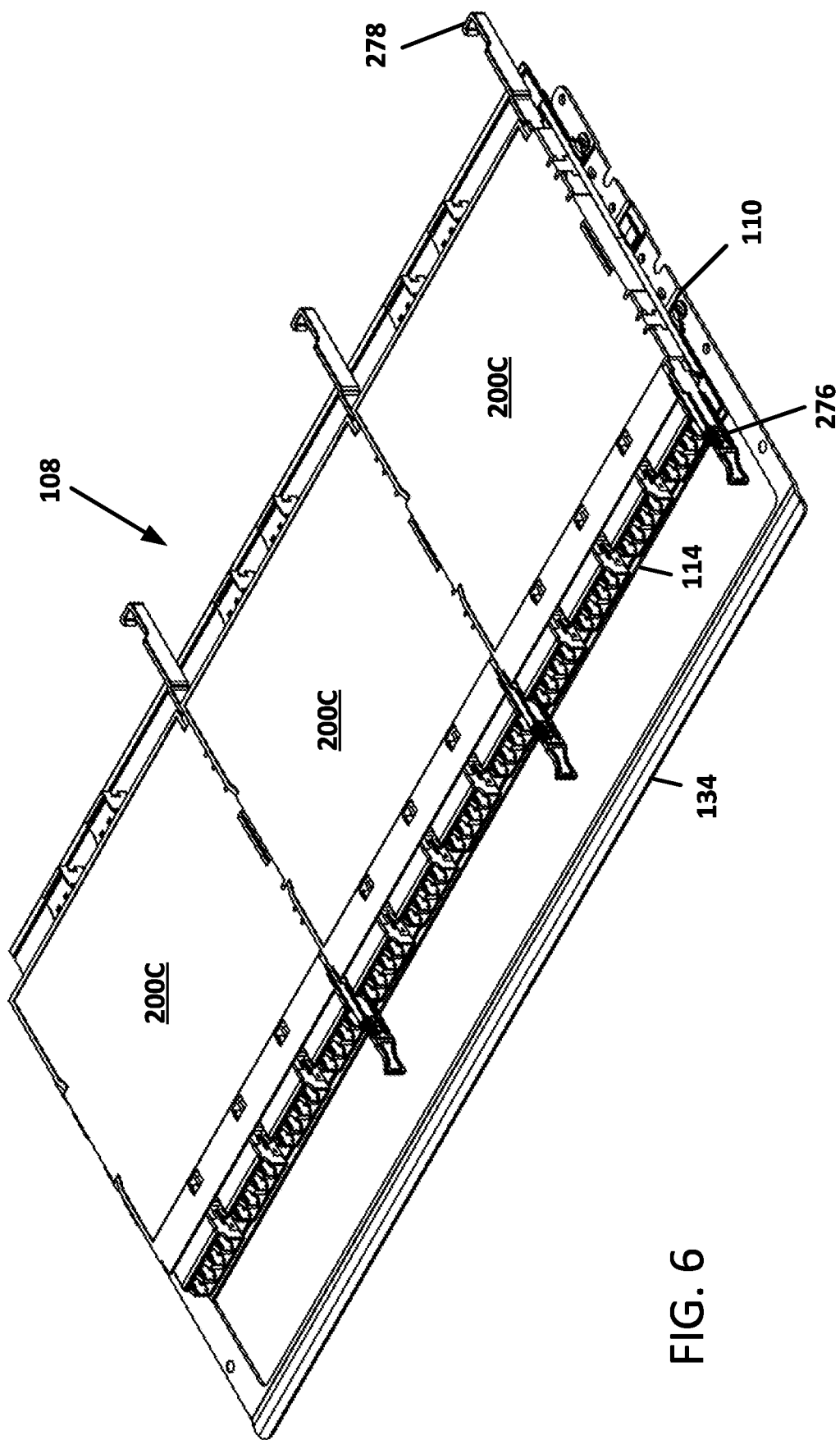
FIG. 6 is a perspective view of the tray arrangement of FIG. 2 shown populated with a plurality of cassettes each having a third width, the third width being about double the first width.
Figure 7:
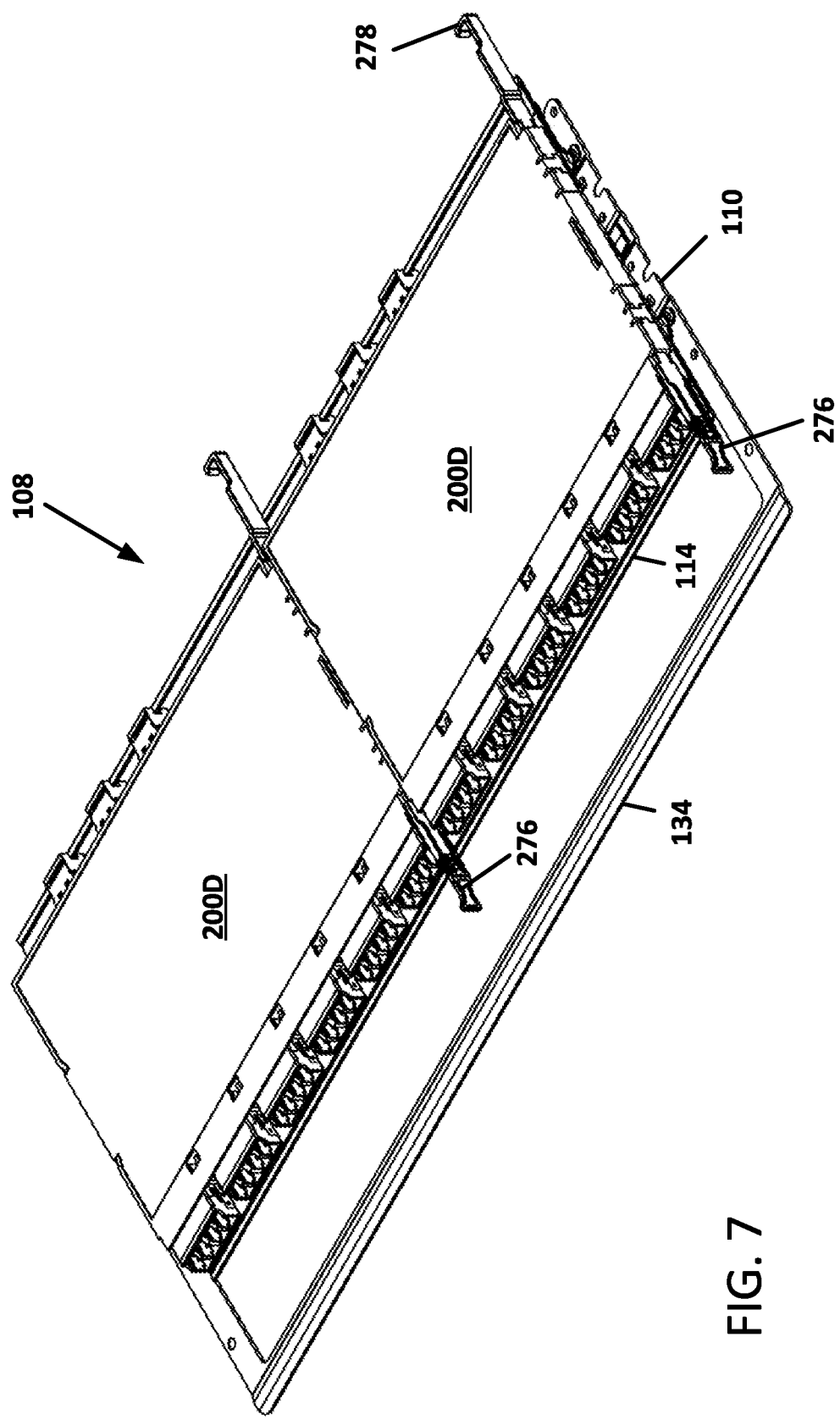
FIG. 7 is a perspective view of the tray arrangement of FIG. 2 shown populated with a plurality of cassettes each having a fourth width, the fourth width being about triple the first width.

FIG. 6 shows the tray arrangement 110 of FIG. 2 fully populated by third cassettes 200C having a third width that is larger than the second width (e.g., approximately twice the width of the first width). FIG. 7 shows the tray arrangement 110 of FIG. 2 fully populated by fourth cassettes 200D having a fourth width that is larger than the third width (e.g., approximately three times the width of the first width). The positioning of the guides 150 remains constant in all five of these iterations. These same cassette configurations can be mounted to the tray arrangement 350 of FIGS. 49-51 as well.

In various implementations, a cassette 200 (e.g., any of cassettes 200A, 200B, 200C, 200D) can be a base-8 cassette, a base-12 cassette, or another type of cassette (e.g., a base-2 cassette, a base-16 cassette, a base-24 cassette, etc.). A base-8 cassette receives fibers at the rear (e.g., through a rear adapter or through fibers extending into the cassette) in increments of eight whereas a base-12 cassette receives fiber at the rear in increments of twelve. In certain examples, a base-16 cassette receives fibers at the rear in increments of sixteen and a base-24 cassette receives fibers at the rear in increments of twenty-four. In certain implementations, a base-8 cassette receives plug connectors having eight live fibers at a rear of the cassette 200, a base-12 cassette receives plug connectors having twelve live fibers at a rear of the cassette 200, a base-16 cassette receives plug connectors having sixteen live fibers at a rear of the cassette 200, and a base-24 cassette receives plug connectors having twenty-four live fibers at a rear of the cassette 200.

In certain implementations, a base-12 cassette has a larger width than a base-8 cassette. For example, a base-12 cassette providing a row of six duplex-LC front ports (i.e., twelve LC front ports) may be wider than a base-8 cassette providing a row of four duplex-LC front ports (i.e., eight LC front ports). In an example, such a base-12 cassette may be 1.5 times as wide as the base-8 cassette. In such implementations, the tray arrangement 110 of FIG. 2 could be populated with the base-8 cassettes, the base-12 cassettes, or a combination thereof without modification to the arrangement of the guides 150. In other implementations, however, a base-8 cassette and a base-12 cassette can have the same width depending on port type.

Figure 8:
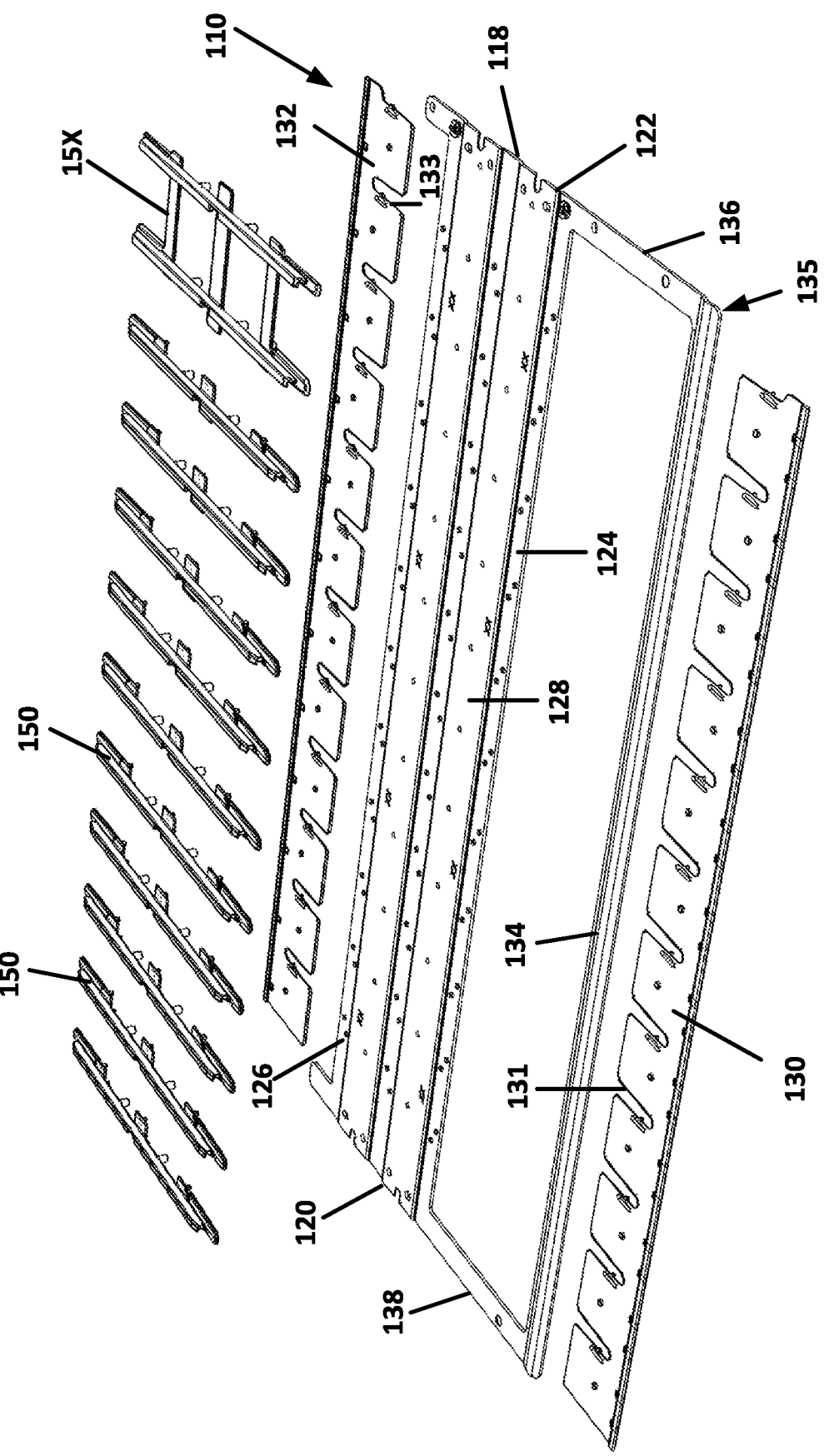
FIG. 8 is a perspective view of the tray arrangement of FIG. 2 showing the guides, a front extension arrangement, and a rear extension arrangement exploded outwardly from the tray.

FIG. 8 shows the example tray arrangement 110 of FIG. 2 including a tray 122 onto which various components (e.g., guides 150) are mounted to form the tray arrangement 110. In certain implementations, the tray 122 extends along the lateral axis LA between the first and second ends 118, 120 of the tray arrangement 110. In certain implementations, the guides 150 are mounted to the tray 122.

Figure 10:
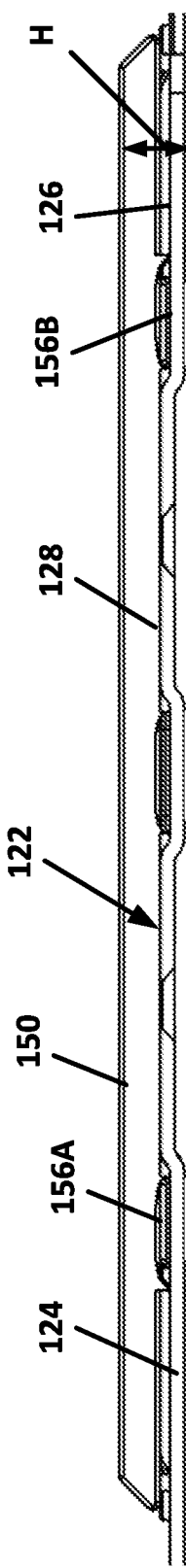
FIG. 10 is a side elevational view of the tray arrangement of FIG. 9.

In the example shown, the tray 122 includes a front portion 124, a rear portion 126, and an intermediate portion 128. The front portion 124 is disposed toward the front end 114 of the tray arrangement 110 and the rear portion 126 is disposed toward the rear end 116 of the tray arrangement 110. The intermediate portion 128 is disposed between the front portion 124 and the rear portion 126 along the forward-rearward axis FR. The intermediate portion 128 is raised along a height H of the tray arrangement 110 relative to the forward portion 124 (e.g., see FIG. 10).

The guides 150 are mounted to the tray arrangement 110 so that each guide 150 extends across the intermediate portion 128 along the forward-rearward axis FR. In certain implementations, the guides 150 are mounted to the forward portion 124 of the tray 122 and to the rearward portion 126 of the tray 122. In certain examples, each guide 150 also extends across the forward and rearward portions 124, 126 along the forward-rearward axis FR.

In certain implementations, the tray arrangement 110 includes a front extension arrangement 130 that mounts to the forward portion 124 of the tray 122 (e.g., see FIGS. 2 and 8). In some examples, the front extension arrangement 130 forms part of the main region 112 of the tray arrangement 110 and defines the front end 114 of the main region 112. In other examples, the forward portion 124 of the tray 122 defines the forward end 114 of the main region 112. In certain implementations, the front extension arrangement 130 extends between the first and second ends 118, 120 of the tray arrangement 110. In certain implementations, the front extension arrangement 130 is disposed no higher than the intermediate portion 128 of the tray 122. In certain examples, the front extension arrangement 130 is disposed lower than the intermediate portion 128 of the tray 122.

In certain implementations, the tray arrangement 110 includes a rear extension arrangement 132 that mounts to the rearward portion 126 of the tray 122. In some examples, the rear extension arrangement 133 forms part of the main region 121 of the tray arrangement 110 and defines the rear end 116 of the main region 112. In other examples, the rearward portion 126 of the tray 122 defines the rearward end 116 of the main region 112. In certain implementations, the rear extension arrangement 132 extends between the first and second ends 118, 120 of the tray arrangement 110. In certain implementations, the rear extension arrangement 132 is disposed no higher than the intermediate portion 128 of the tray 122. In certain examples, the rear extension arrangement 132 is disposed lower than the intermediate portion 128 of the tray 122.

In certain implementations, the front extension arrangement 130 and/or the rear extension arrangement 132 are formed of a different material than the tray 122. For example, the tray 122 may be formed of metal while the front and/or rear extension arrangements 130, 132 are formed of plastic or other materials. In certain implementations, the front extension arrangement 130 and/or the rear extension arrangement 132 defines notches in which portions of the guides 150 extend.

In certain implementations, the tray arrangement 110 includes a cable support arrangement 135 extending forwardly of the main region 112 of the tray arrangement 110. The cable support arrangement 135 includes a cable support bar 134 that extends parallel to the lateral axis LA of the tray arrangement 110 to support cables routed to the front ports of the cassettes 200 mounted to the tray arrangement 110. The cable support bar 134 is coupled to the main region 112 of the tray arrangement 110 by arms 136, 138. In certain examples, the arms 136, 138 space the support bar 134 away from the front end 114 of the tray main region 112 sufficient to provide finger access to plug connectors received at the front ports of the cassettes 200. In some examples, the support bar 134, first arm 136, and second arm 138 are monolithically formed with the tray 122. In other examples, the cable support arrangement 135 is a separate piece coupled to the main region 112 of the tray arrangement 110 using fasteners, latches, or other attachment mechanisms.

Figure 9:
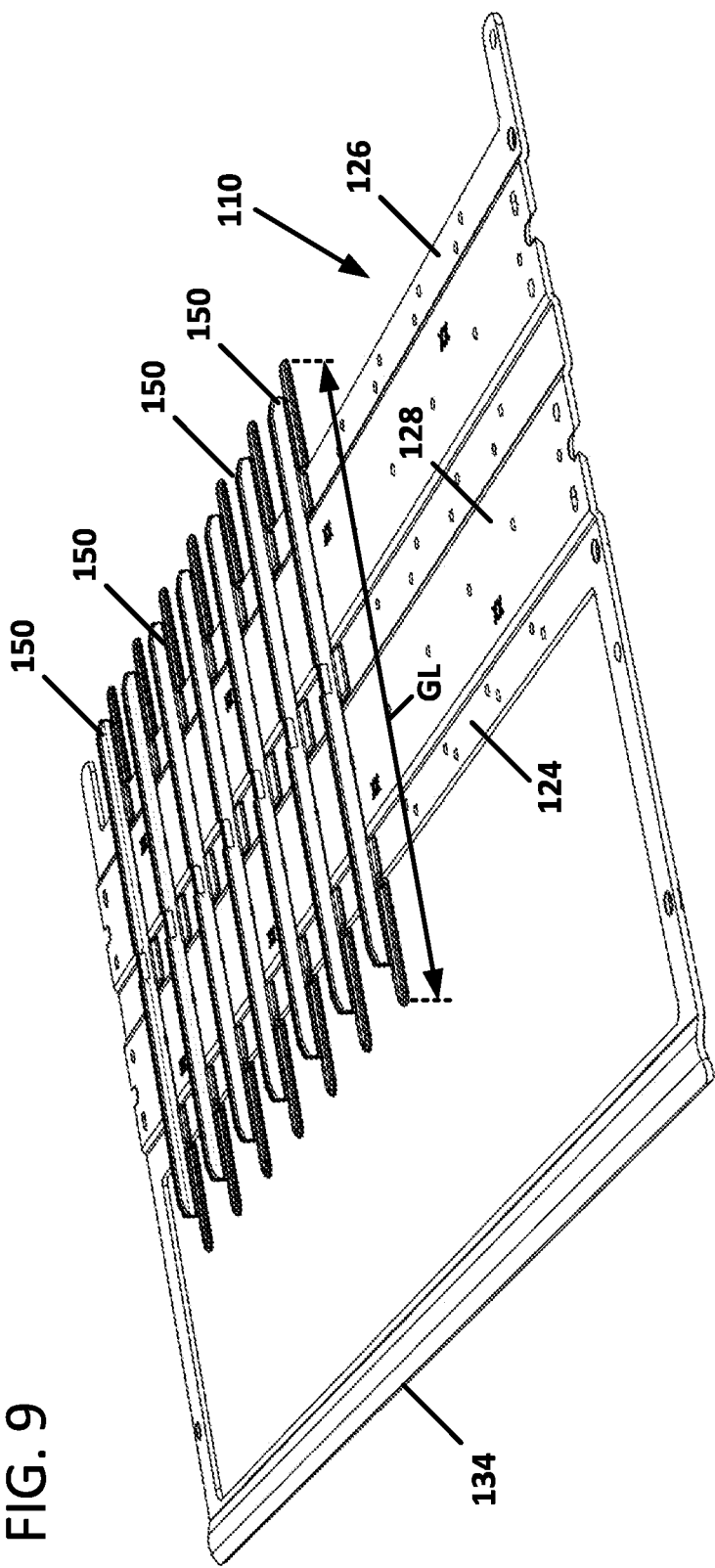
FIG. 9 is a perspective view of the tray arrangement of FIG. 2 with the front and rear extension arrangements removed from the tray.
Figure 11:
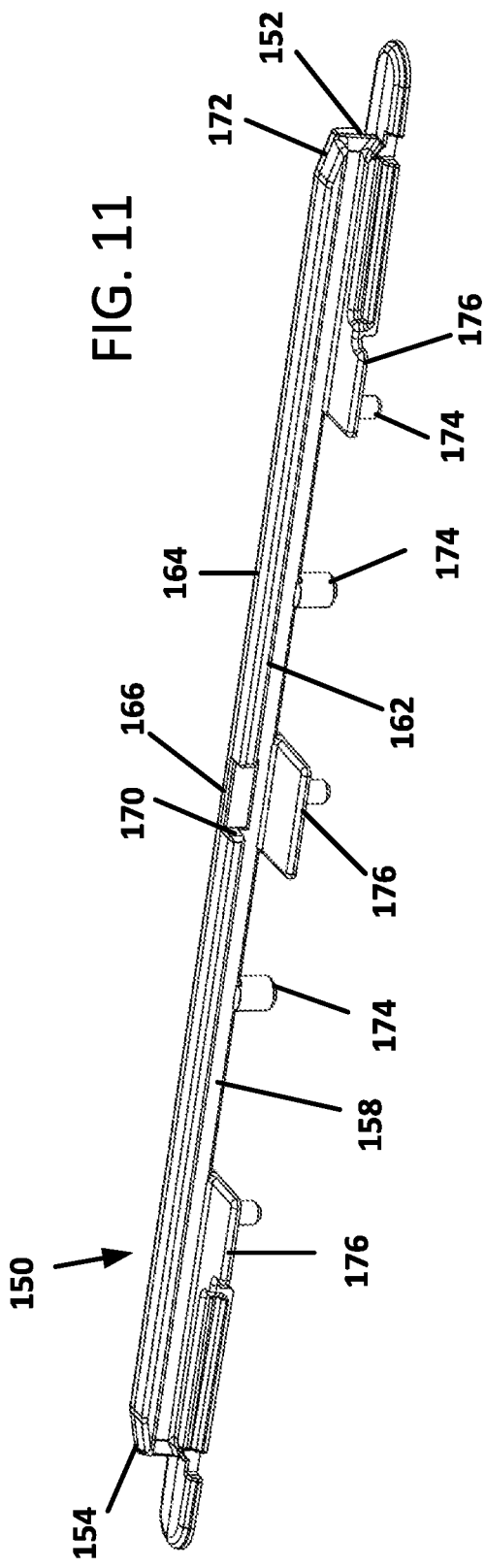
FIG. 11 is a perspective view showing a first side of an example guide suitable for use with the tray arrangement of FIG. 2.
Figure 12:
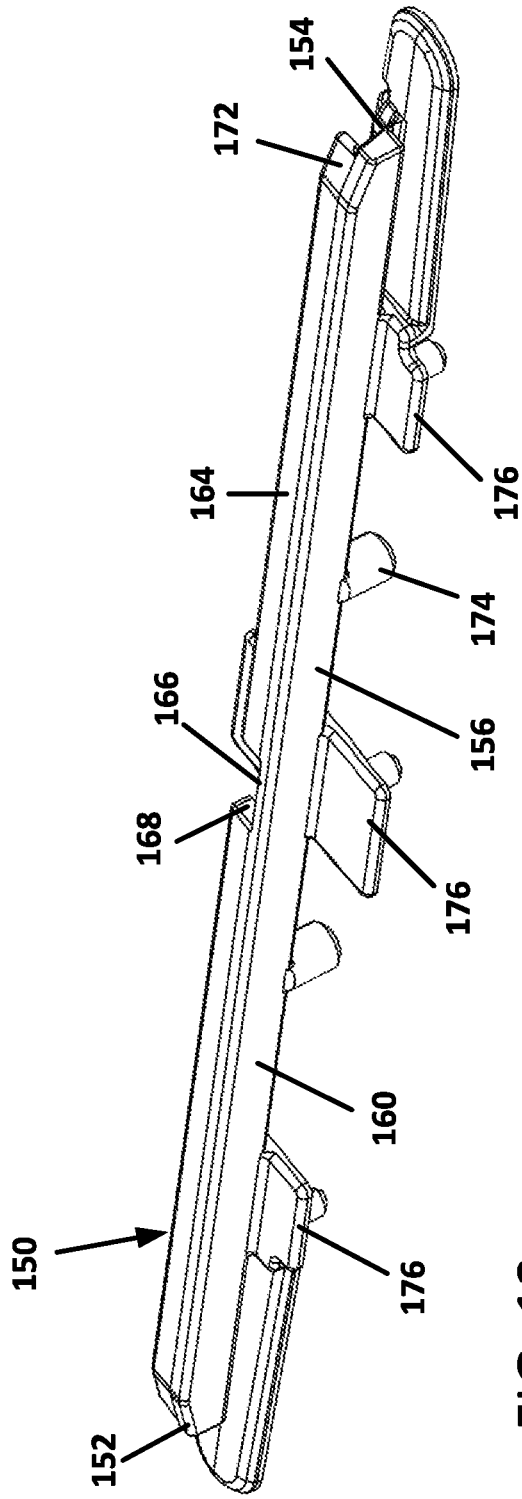
FIG. 12 is a perspective view showing a second side of the guide of FIG. 11.

FIGS. 11 and 12 illustrate an example guide 150 suitable for use with the tray arrangement 110 of FIG. 2. The guide 150 extends along a length GL (FIG. 9) between a front end 152 and a rear end 154 and along a height H (FIG. 10) between a bottom and a top surface 164. The guide 150 also has opposite first and second sides 156, 158 facing orthogonally to length GL and the height H.

Figure 15:
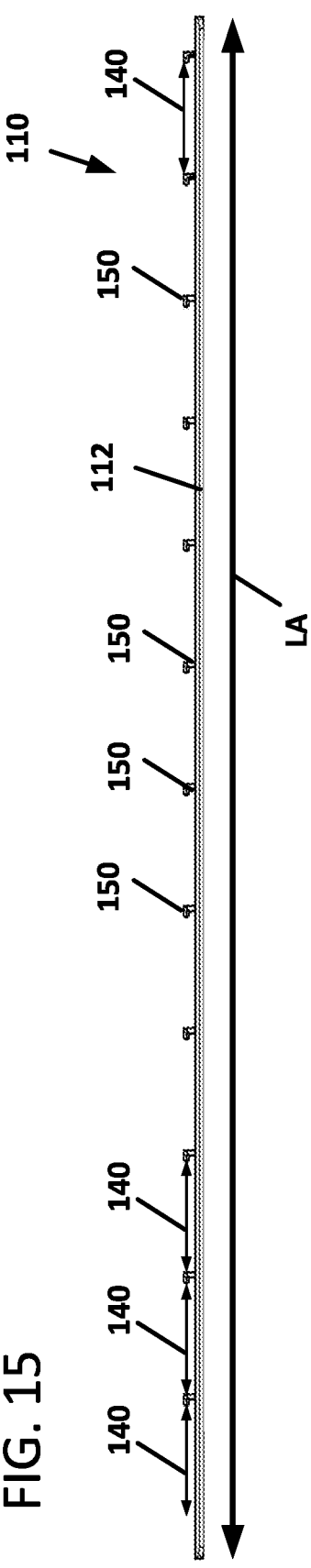
FIG. 15 is a front elevational view of the tray arrangement of FIG. 9.

The guide 150 is configured to engage (e.g., interconnect) with a cassette from only the second side 158. For example, the second side 158 defines cassette engagement structure and the first side 156 does not. In the example shown, the first side 156 defines a closed surface 160 and the second side 158 defines a groove 162 that extends along the length GL between opposite open ends. In some examples, the guide 150 has an L-shaped cross-sectional profile (e.g., see FIG. 15). In other examples, the guide 150 has a C-shaped cross-sectional profile along at least part of the length GL of the guide 150 (e.g., see FIG. 13).

The guides 150 each define a top surface 164 extending along the length GL of the guide 150. In certain examples, the top surface 164 of a guide 150 defines a ramped surface 172 at the first and second open ends of the groove 162. The top surface 164 defines a notch 166 at an intermediate position between the first and second open ends of the groove 162. In certain examples, the notch provides access to the groove 162 through the top surface 164. In certain implementations, the notch 166 provides access to a forward-facing catch surface 168 and a rearward-facing catch surface 170 at opposite ends of the notch 166.

In certain implementations, the guides 150 are configured to be mounted to the main region 112 of the tray arrangement 110 (e.g., to the tray 122). In some examples, the guides 150 include pegs 174 that can be inserted into apertures defined through the main region 112 to attach the guides 150 to the tray arrangement 110. In various examples, the pegs 174 can be attached to the main region 112 by heating, ultrasonically welding, adhesive, friction, or another mechanism. In other examples, the guides 150 can be fastened, soldered, latched, or otherwise attached to the tray.

In certain implementations, a guide 150 includes side tabs 176 extending outwardly from the first and second sides 156, 158 of the guide 150. The side tabs 176 may carry pegs 174 or other attachment structure. In certain examples, the side tabs 176 provide stability to the guides 150. In certain examples, an example guide 150 includes a first pair of side tabs 176 at the front end 152 and a second pair of side tabs 176 at the rear end 154. In the example shown in FIG. 9, the first pair of side tabs 176 are mounted to the front end portion 124 of the tray 122 and the second pair of side tabs 176 are mounted to the rear end portion 126 of the tray 122. In certain examples, an example guide 150 includes a third pair of side tabs 176 extending outwardly from an intermediate position along the length GL of the guide 150. In an example, the third pair of side tabs 176 align with the notch 166.

Figure 13:
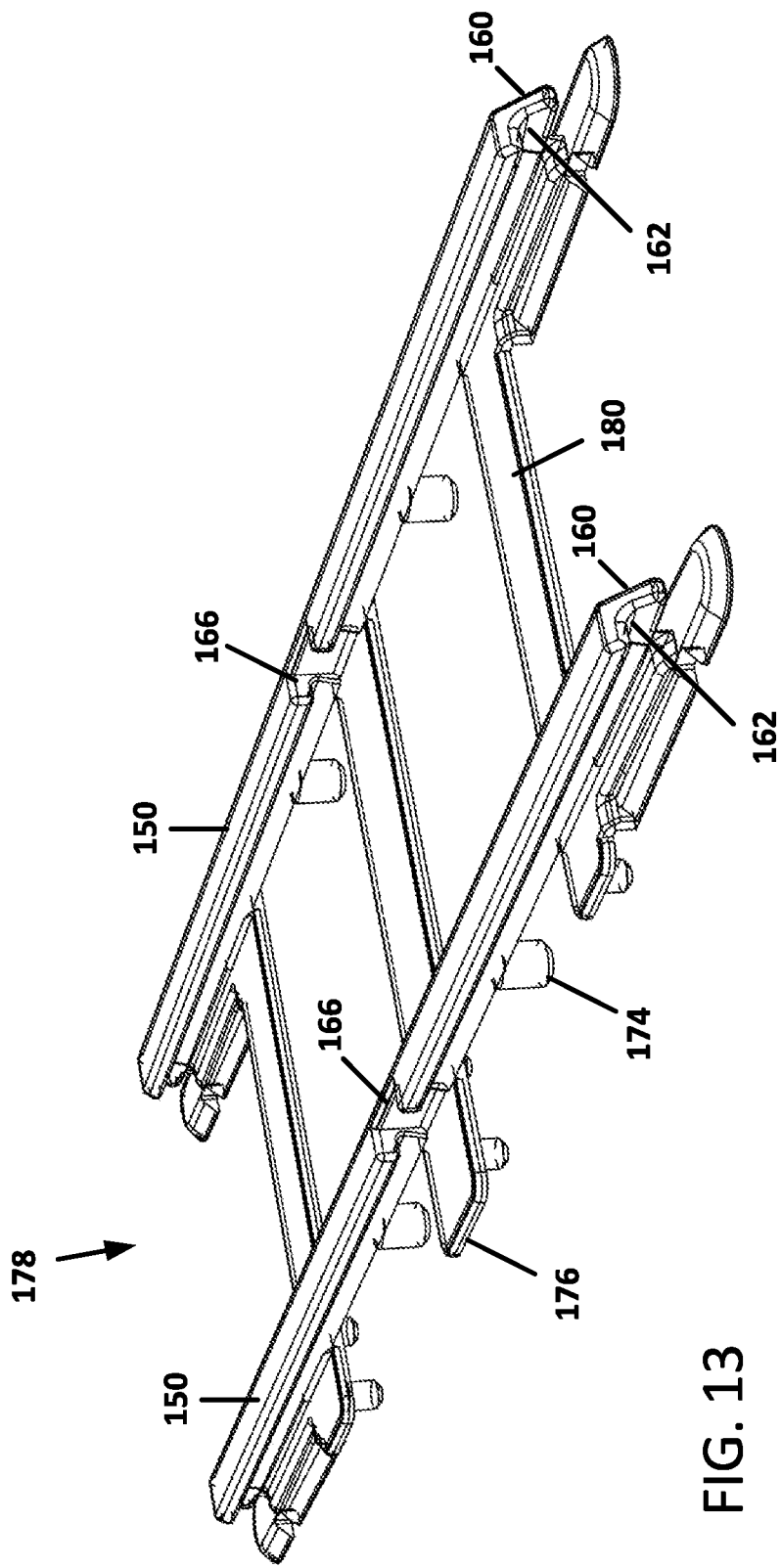
FIG. 13 is a perspective view of an alternative guide unit suitable for use with the tray arrangement of FIG. 2, the guide unit including two guides coupled together as a unit.

FIG. 13 shows an alternative guide unit 178 including a plurality of guides 150 connected together with webbing 180. In the example shown, the webbing 180 connects two guides. In other examples, the webbing 180 can connect three, four, six, twelve, or any desired number of guides 150. The guide unit 178 enables multiple guides 150 to be mounted to the main region 112 of the tray arrangement 110 simultaneously. In certain implementations, the guide unit 178 also may include pegs 174 for heat staking, ultrasonically welding, or otherwise securing the guide unit 178 to the tray arrangement 110. In certain implementations, the guide unit 178 also may include side tabs 176.

Figure 14:
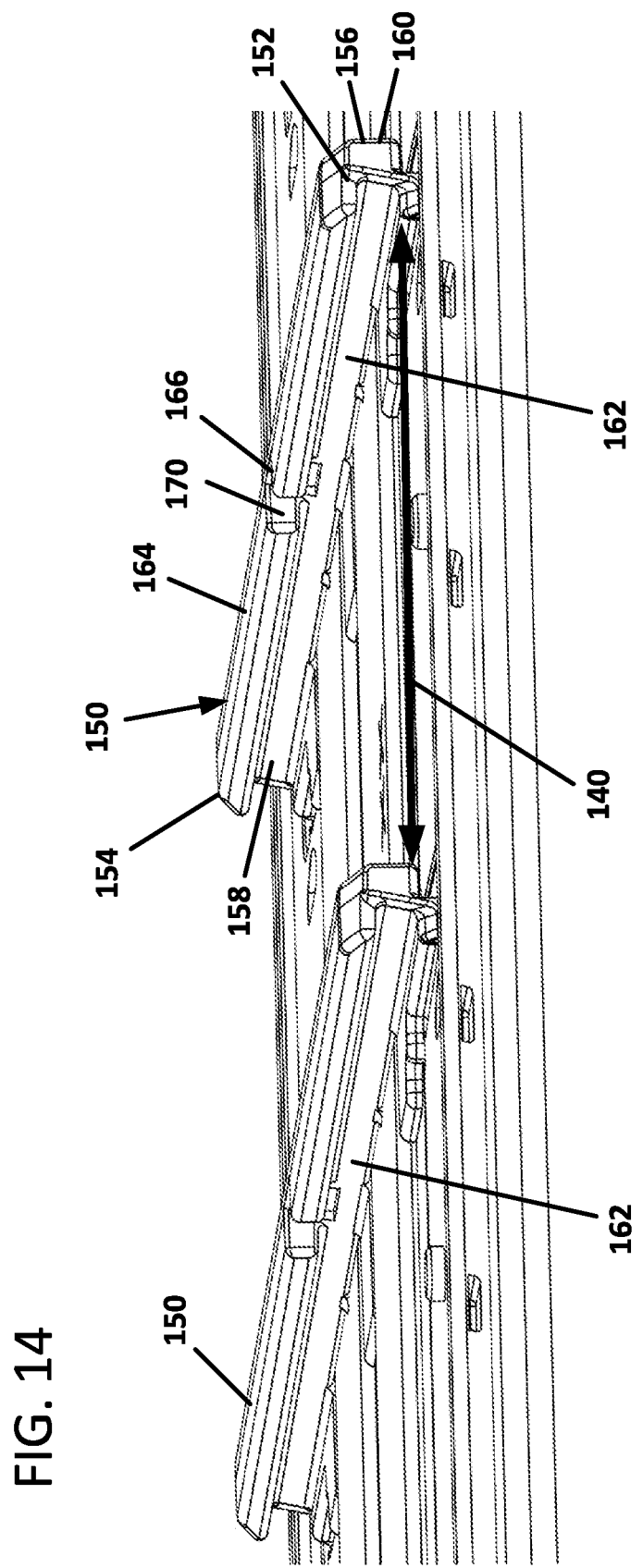
FIG. 14 is a front perspective of a portion of the tray arrangement of FIG. 9.
Figure 16:
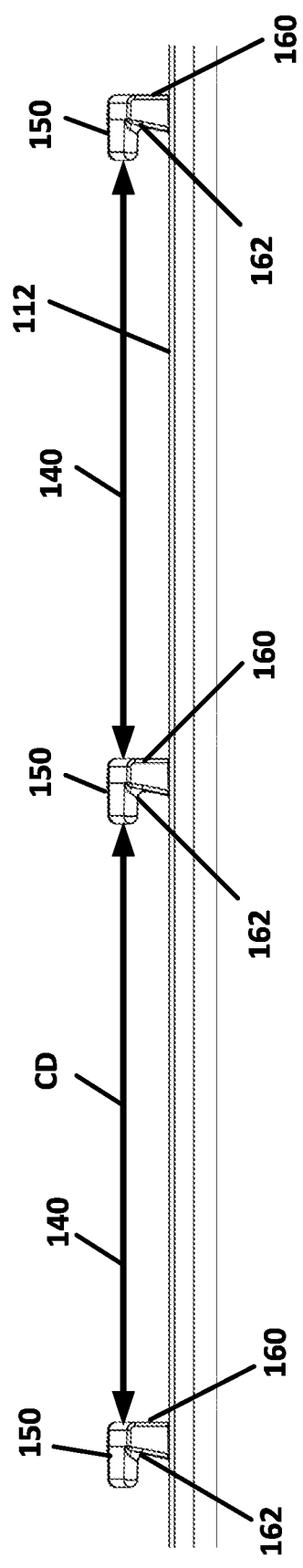
FIG. 16 is an enlarged view of a portion of FIG. 15.

The guides 150, 350 extend across the main region 112, 312 of the tray arrangement 110, 310 along the lateral axis LA. In certain implementations, the guides 150, 350 are spaced a common distance CD apart from each other along the lateral axis LA (e.g., see FIGS. 14-16). A bay 140, 340 is a space extending outwardly from the second side 158, 358 of a guide 150, 350 by the common distance CD. In most cases, the bay 140, 340 extends to the first side 156, 356 of an adjacent guide 150, 350. In certain cases, a bay 140, 340 is bordered by only one guide 150, 350 (e.g., see the left-most bay 140, 340 of FIGS. 15 and 50). In such a case, the bay 140, 340 extends towards a sidewall of the chassis 105.

Figure 49:
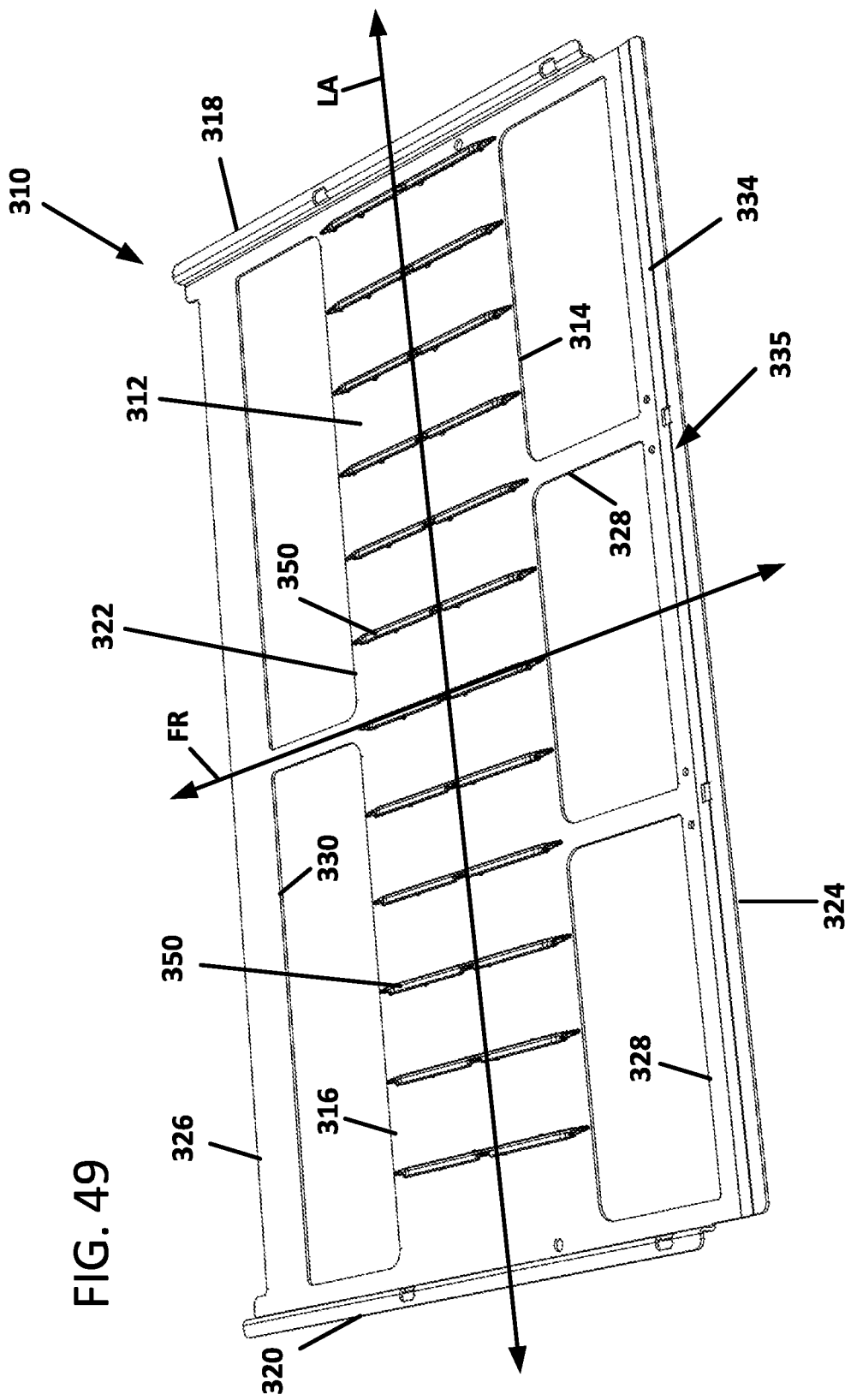
FIG. 49 is a perspective view of a second example tray arrangement configured to be mounted within the chassis of FIG. 1, the tray arrangement including a tray carrying a plurality of guides.
Figure 50:
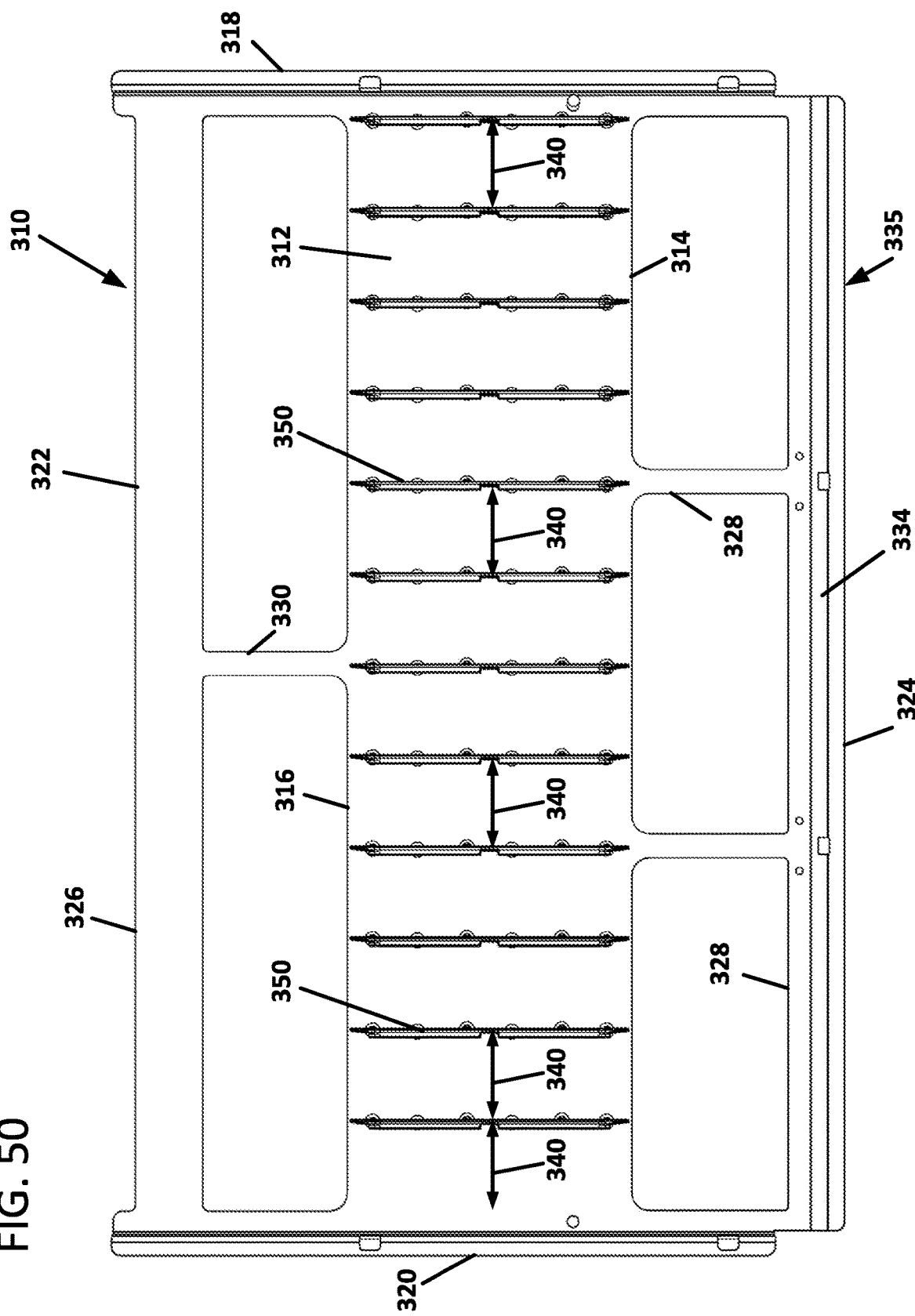
FIG. 50 is a top plan view of the tray arrangement of FIG. 49.
Figure 51:
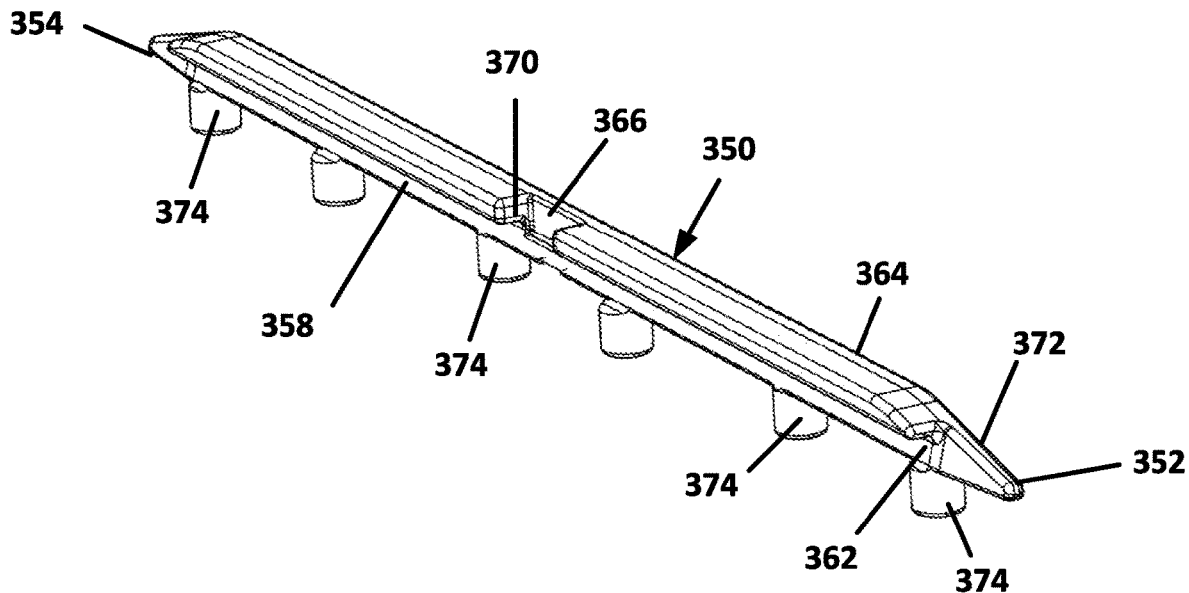
FIG. 51 is a first perspective view of an example guide suitable for use with the tray arrangement of FIG. 49.

FIGS. 49-51 illustrate another example implementation of a tray arrangement 310 suitable for use in receiving any of the cassettes 200 disclosed herein. FIG. 49 shows the example tray arrangement 310 including a planar tray 322 onto which various components (e.g., guides 350) are mounted to form the tray arrangement 310. In certain implementations, the tray 322 extends along the lateral axis LA between the first and second ends 318, 320 of the tray arrangement 310. In the example shown, the tray 322 defines the main region 312 of the tray arrangement 310 at which the guides 350 mount.

In certain implementations, the tray 322 defines a front cable management region 324 and a rear cable management region 326. In certain examples, the front cable management region 324 and rear cable management region 326 are monolithically formed with the tray 322. In certain implementations, the front cable management region 324 includes a cable support arrangement 335. The cable support arrangement 335 includes a cable support bar 334 that extends parallel to the lateral axis LA of the tray arrangement 310 to support cables routed to the front ports of the cassettes 200 mounted to the tray arrangement 310. In certain implementations, the rear cable management region 326 defines a cable support surface for cables routed to the rear ends 206 of the cassettes 200.

One or more front finger access apertures 328 are defined between the main region 312 and the front cable management region 324. One or more rear finger access apertures 330 are defined between the main region 312 and the rear cable management region 326. In some examples, the tray 322 defines a different number of front finger access apertures 328 than rear finger access apertures 330. The finger access apertures 328, 330 provide finger access to the front and/or rear ports carried by any cassettes 200 mounted to the tray arrangement 310.

Figure 52:
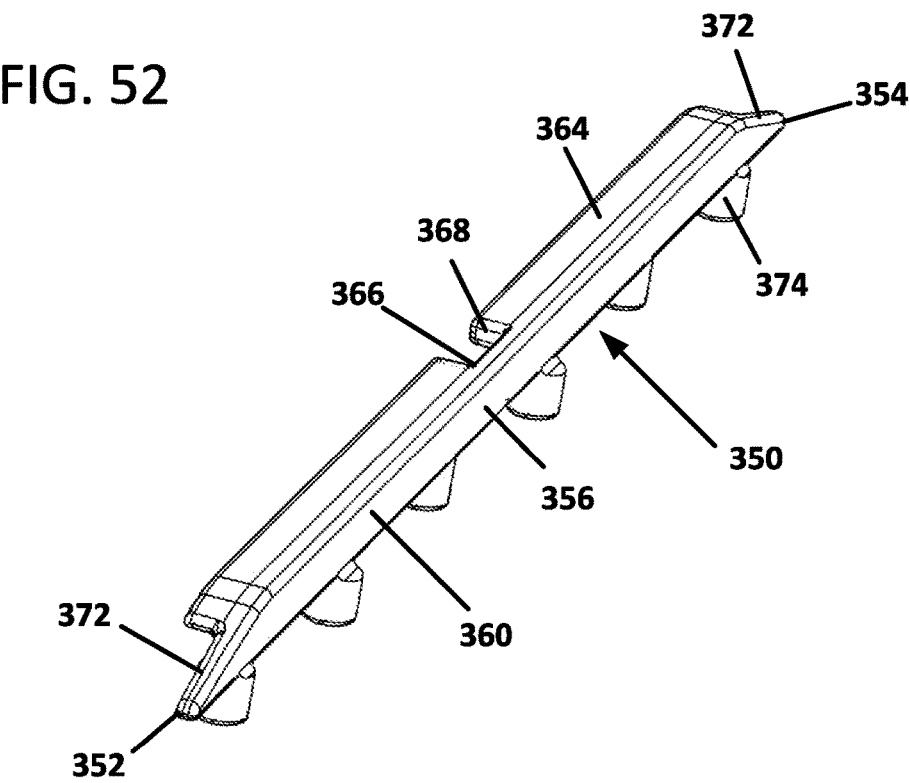
FIG. 52 is a second perspective view of the guide of FIG. 51.

FIGS. 51 and 52 illustrate another example guide 350 suitable for use with the tray arrangement 310. The guide 350 extends along a length between a front end 352 and a rear end 354 and along a height between a bottom and a top surface 364. The guide 350 also has opposite first and second sides 356, 358 facing orthogonally to length and the height. In certain implementations, the guide 350 is substantially similar to the guide 150 of FIGS. 11 and 12, except that the guide 350 does not include side tabs 176.

The guide 350 is configured to engage (e.g., interconnect) with a cassette from only the second side 358. For example, the second side 358 defines cassette engagement structure and the first side 356 does not. In the example shown, the first side 356 defines a closed surface 360 and the second side 358 defines a groove 362 that extends along the length between opposite open ends. In some examples, the guide 350 has an L-shaped cross-sectional profile (e.g., see FIG. 54).

The guides 350 each define a top surface 364 extending along the length of the guide 350. In certain examples, the top surface 364 of a guide 350 defines a ramped surface 372 at the first and second open ends of the groove 362. The top surface 364 defines a notch 366 at an intermediate position between the first and second open ends of the groove 362. In certain examples, the notch 366 provides access to the groove 362 through the top surface 364. In certain implementations, the notch 366 provides access to a forward-facing catch surface 368 and a rearward-facing catch surface 370 at opposite ends of the notch 366.

In certain implementations, the guides 350 are configured to be mounted to the main region 312 of the tray arrangement 310 (e.g., to the tray 322). In some examples, the guides 350 are individually mounted to the tray 322. In other examples, the guides 350 are mounted to the tray 322 in one or more units with each unit including two or more guides 350.

In some examples, the guides 350 include pegs 374 that can be inserted into apertures 355 defined through the main region 312 and heated to attach the guides 350 to the tray arrangement 310. In other examples, the guides 350 can be attached to the main region 312 by fasteners, latches, friction-fit pegs, welding, soldering, or other attachment mechanisms.

Figure 53:
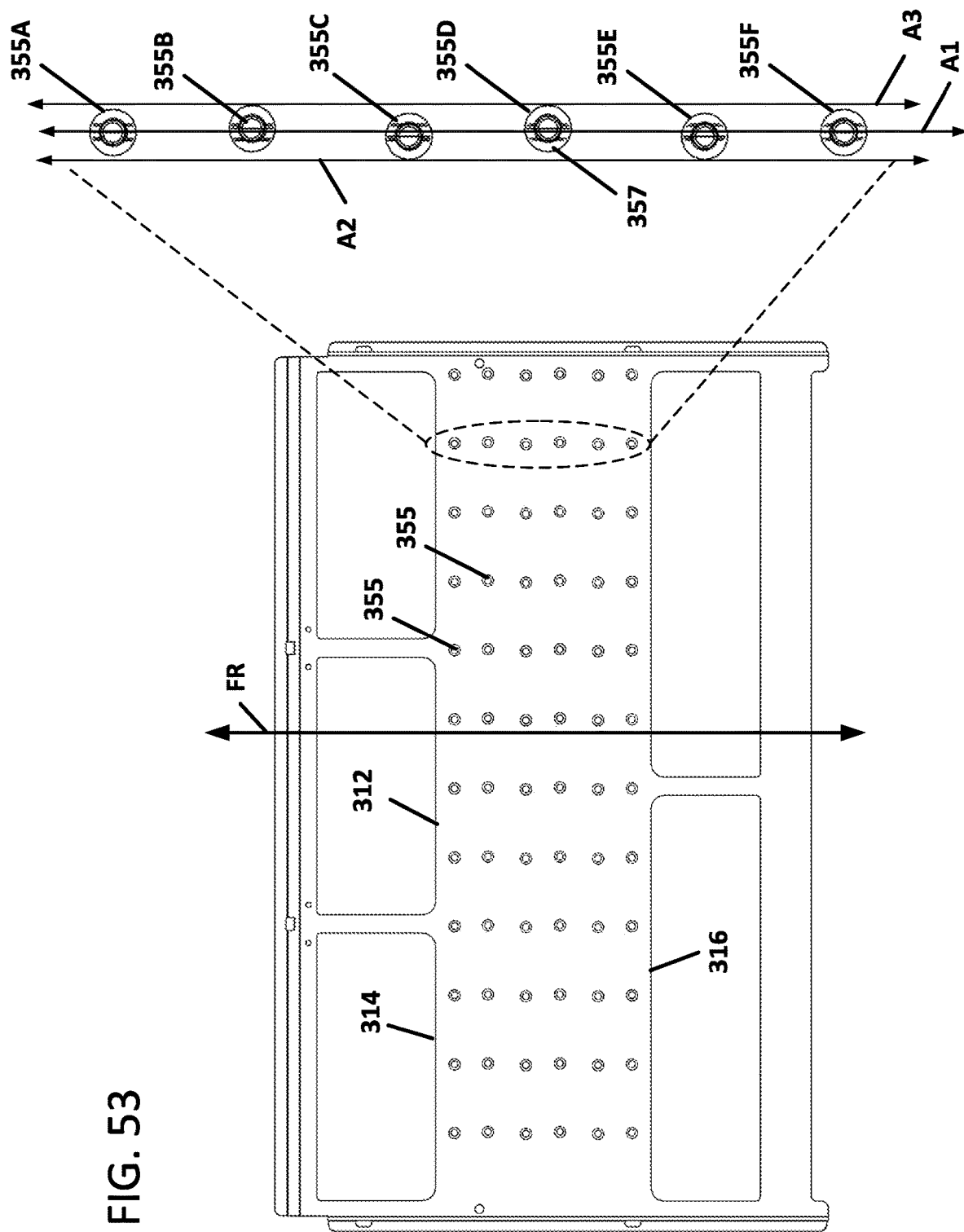
FIG. 53 is a bottom plan view of the tray of FIG. 49 with a portion of the tray enlarged for ease in viewing.

As shown in FIG. 50, the guides 350 are mounted to the main region 312 of the tray 322 so that each guide 350 terminates before reaching the finger access apertures 328, 330. As shown in FIG. 53, the apertures 355 may lead to countersinks or pockets 357 at the bottom of the tray 322. For example, the countersinks 357 may be sized to receive material melted or otherwise liquefied from the pegs of the guides 350. In an example, the countersinks 357 are sized so that the flowable material is flush with the bottom of the tray 322 when the guides 350 are attached to the tray 322.

In certain implementations, the main region 312 defines rows of apertures 355 through which the guides 350 can be staked, fastened, or otherwise coupled to the tray 322. In some implementations, the apertures 355 of each row are aligned along respective axes A1. In other implementations, one or more of the apertures 355 in a row may be laterally offset from each other. For example, as shown in FIG. 53, front and rear apertures 355A, 355F of each row may be aligned along the axis A1 while intermediate apertures 355B-355E are offset along the lateral axis A relative to the axis A1. In the example shown, apertures 355C and 355E are offset to be tangent to a second axis A2 spaced in a first direction from the first axis A1 and apertures 355B and 355D are offset to be tangent to a third axis A3 spaced in an opposite second direction from the first axis A1. Offsetting the apertures 355 in a row may increase the stability of the guide 350. In certain implementations, the apertures 355 may be positioned in a configuration to add a poke-yoke to inhibit installing the guides 350 backwards. For example, the guide 358 shown in FIG. 53 may be modified to have an odd number of pegs.

Figure 54:
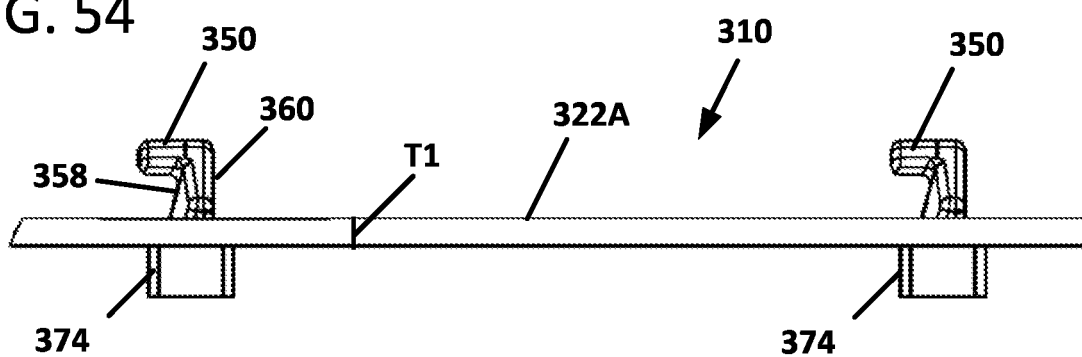
FIG. 54 is a front elevational view of a portion of the main region of the tray arrangement of FIG. 49.
Figure 55:
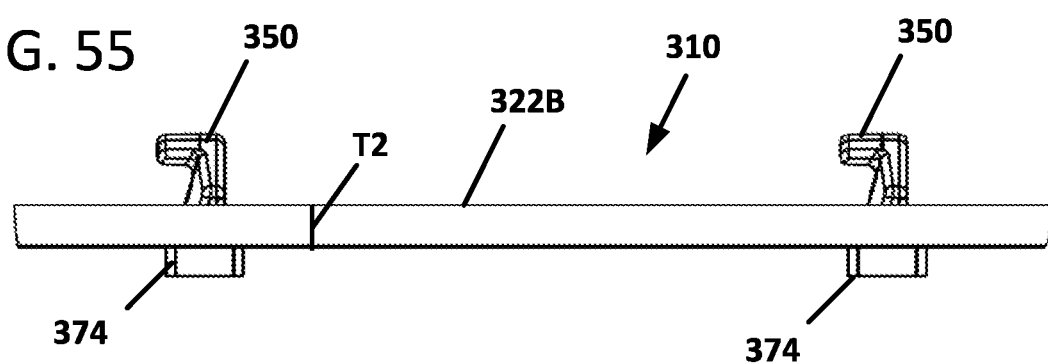
FIG. 55 shows the guides of FIG. 54 mounted to a thicker tray.

As shown in FIGS. 54 and 55, a thickness of the tray arrangement 310 may vary. For example, FIG. 54 illustrates two example guides 350 mounted to a first tray 322A having a first thickness T1 and the same two guides 350 mounted to a second tray 322B having a second thickness T2. In other examples, additional components can be mounted to the tray 322A to create a thickness of T2.

In some implementations, different guides 350 with different sizes of pegs 374 are used with each tray 322A, 322B. For example, the guide 350 used with the thicker tray 322B may have a longer peg 374. In other implementations, the same guides 350 can be utilized with trays 322A, 322B of different thicknesses T1, T2. For example, each of the trays 322A, 322B may have a respective countersink 357 sized based on the length of the peg 374 extend through the aperture 355. In still other examples, the same countersink 357 may be used with both trays 322A, 322B.

Figure 56:
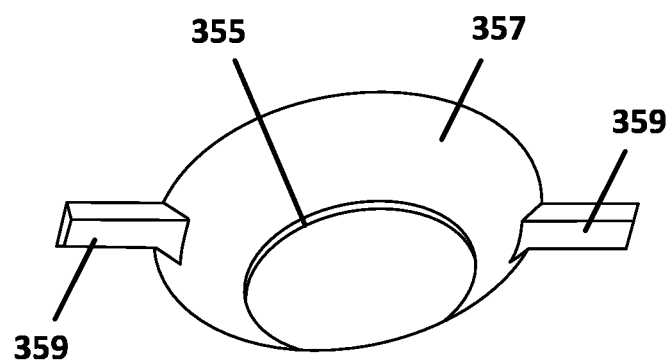
FIG. 56 is a perspective view of an example countersink disposed at the main region of the tray arrangement of FIG. 53.

In some such examples, the each tray 322A, 322B may have a common countersink 357 that is configured to accommodate different amounts of peg material. For example, FIG. 56 illustrates a countersink 357 sized to receive the flowable material from a peg 374 extending through the thicker tray 322B so that the flowable material is about flush with the bottom of the tray 322B. The countersink 357 of FIG. 56 defines channels or wells 359 to accommodate additional flowable material when the peg 374 is utilized with the thinner tray 322A. It will be understood that a greater or lesser number of channels or wells 359 can be provided at the countersink 357 and in other configurations.

In other such examples, the countersink 357 may be sized so that the flowable material is flush with a bottom of the tray 322A for the thinner tray 322A, but fills only a portion of the countersink 357 for the thicker tray 322B. In certain implementations, a tool that melts or otherwise liquefies the pegs 374 may include a protrusion that extends partially into the countersink 357 to press or displace the flowable material towards the periphery of the countersink 357 for better adhesion.

Referring now to FIGS. 17-20, the cassettes 200 (e.g., cassettes 200A, 200B, 200C, and 200D) are configured to slidingly mount to the tray arrangement 110 using the guides 150, 350. A cassette 200 includes a cassette body 202 that extends along a width W2 between opposite first and second ends 208, 210, along a length L2 between front and rear ends 204, 206, and along a height H2 (FIG. 19) between a bottom and a top. The length L2, width W2, and height H2 are orthogonal to each other. The cassette 200 includes a bottom rail 220 (FIG. 19) that is configured to fit (i.e., inter-connect) within the groove 162, 362 of a respective one of the guides 150, 350. The bottom rail 220 is configured to slide along the groove 162, 362 from either the open front end or the open rear end of the groove 162, 362.

Figure 23:
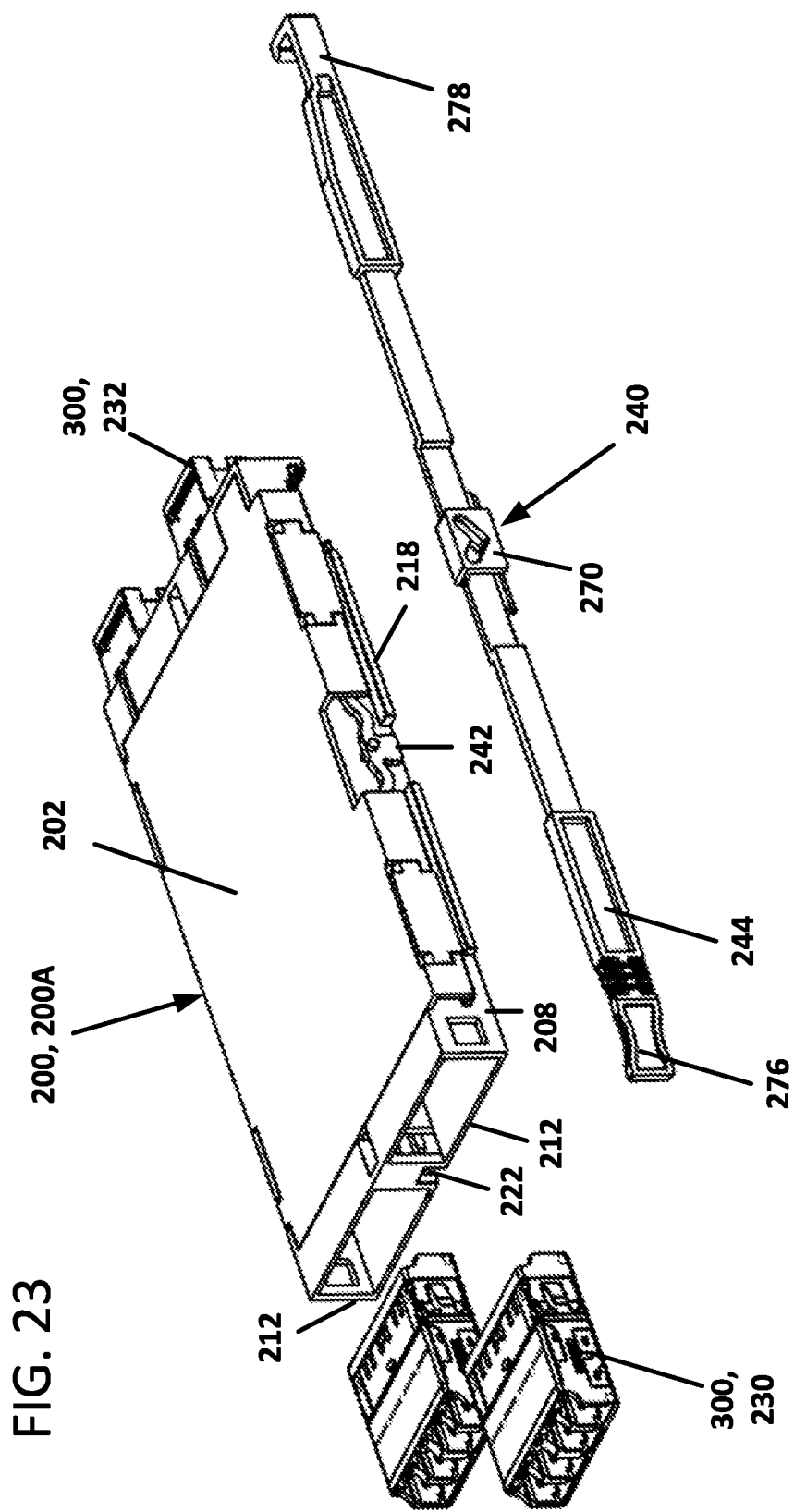
FIG. 23 is a perspective view of the first cassette of FIG. 17 with the front and rear port members exploded outwardly from the cassette body to show the front and rear apertures and a release handle exploded outwardly from a cassette body to show a stop member carried by the cassette body.
Figure 37:
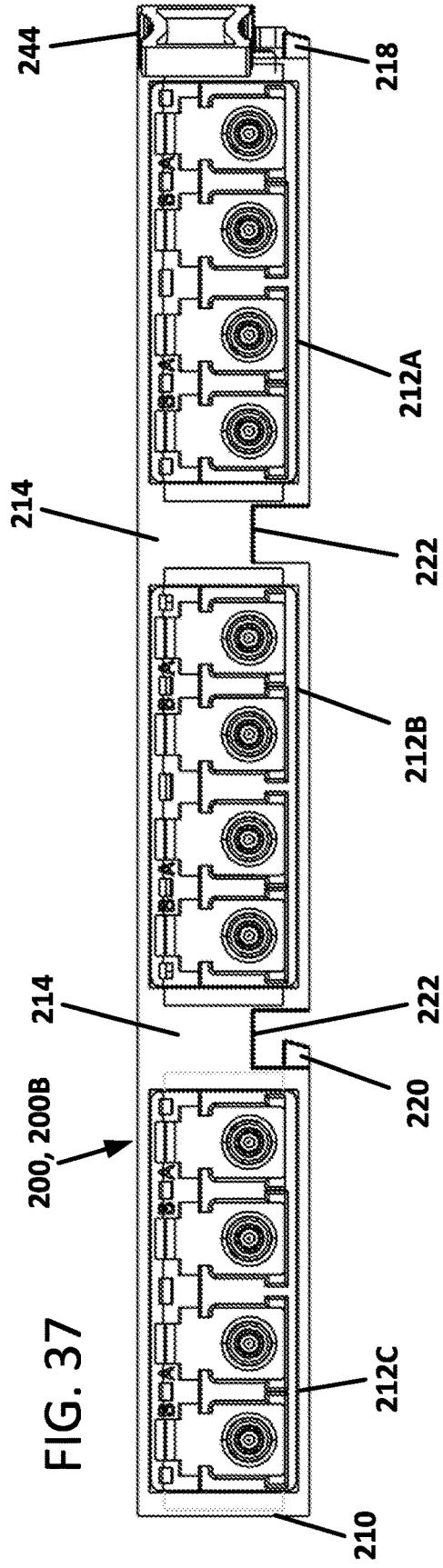
FIG. 37 is a front elevational view of the second cassette of FIG. 35.
Figure 38:
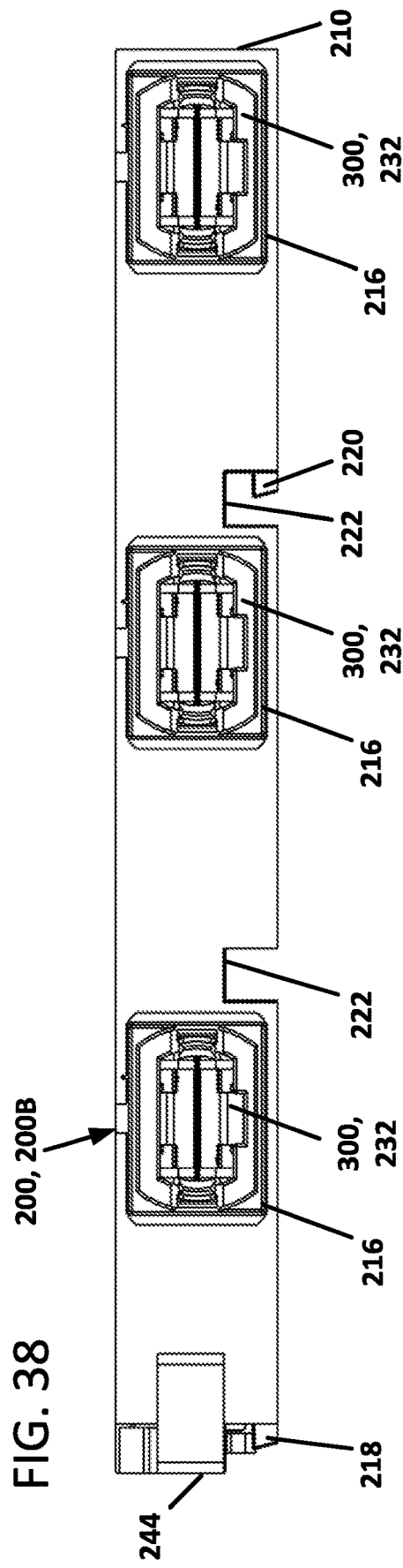
FIG. 38 is a rear elevational view of the second cassette of FIG. 36.
Figure 39:
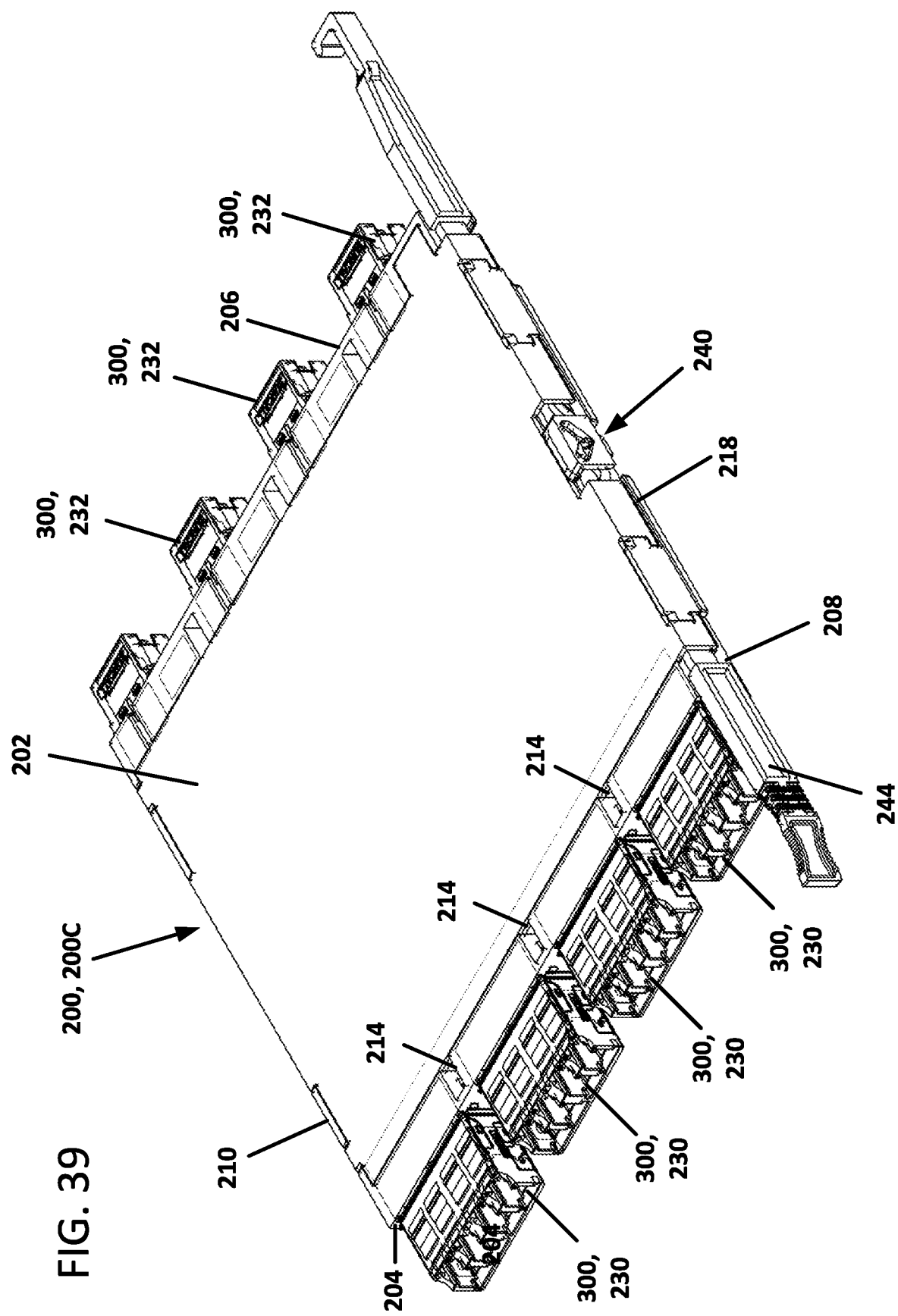
FIG. 39 is a front, first side perspective view of a third example cassette suitable for use with the tray arrangement of FIG. 2, the third cassette carrying four groups of front ports separated by intermediate regions at a front end of the third cassette.
Figure 40:
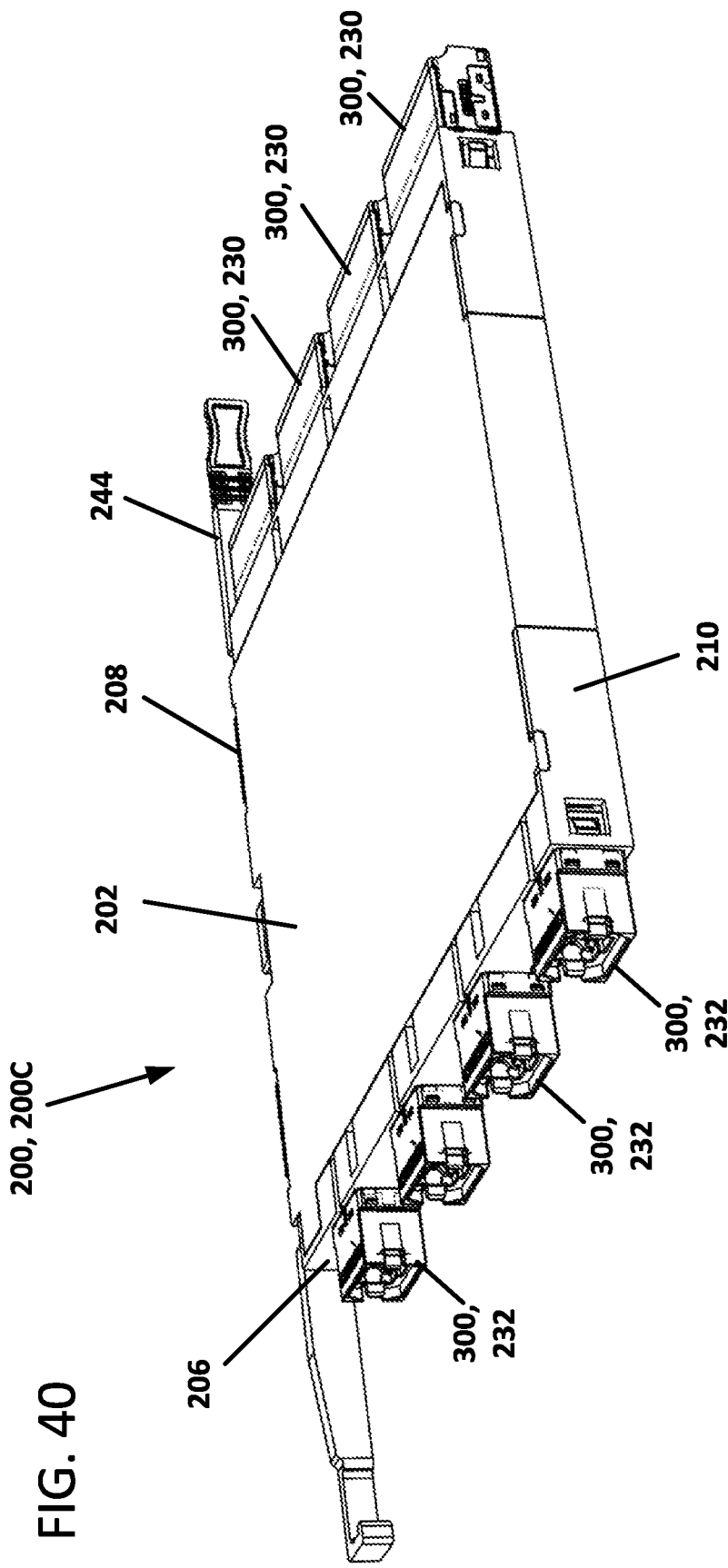
FIG. 40 is a front, second side perspective view of the third cassette of FIG. 39, the second side being opposite the first side.

In certain implementations, the cassette body 202 includes an end rail 218 (FIGS. 19 and 23) at the first end 208 of the cassette body 202. The end rail 218 is configured to fit within the groove 162, 362 of a respective one of the guides 150, 350. The end rail 218 is configured to slide along the groove 162, 362 from either the open front end or the open rear end of the groove 162, 362. In the example shown in FIGS. 19 and 20, the bottom rail 220 and the end rail 218 would slide along adjacent guides 150, 350. In other examples, however, the bottom rail 220 and the end rail 218 are configured to slide along non-adjacent guides 150, 350 (e.g., see FIG. 37). In certain examples, each guide 150, 350 is configured to inter-connect with no more than one cassette 200.

In certain examples, the end rail 218 and the bottom rail 220 of each cassette body 202 extend in a common direction from a base end 218a, 220a attached to the cassette body 202 to a free end 218b, 220b. In an example, the common direction extends along the width W2 of the cassette body 202. In some examples, the free ends 218b, 220b of the rails 218, 220 extend parallel with the height H2 of the cassette body 202. In other examples, the free ends 218b, 220b of the rails 218, 220 are angled relative to the height H2 of the cassette body 202 (e.g., see FIGS. 19 and 20).

Figure 64:
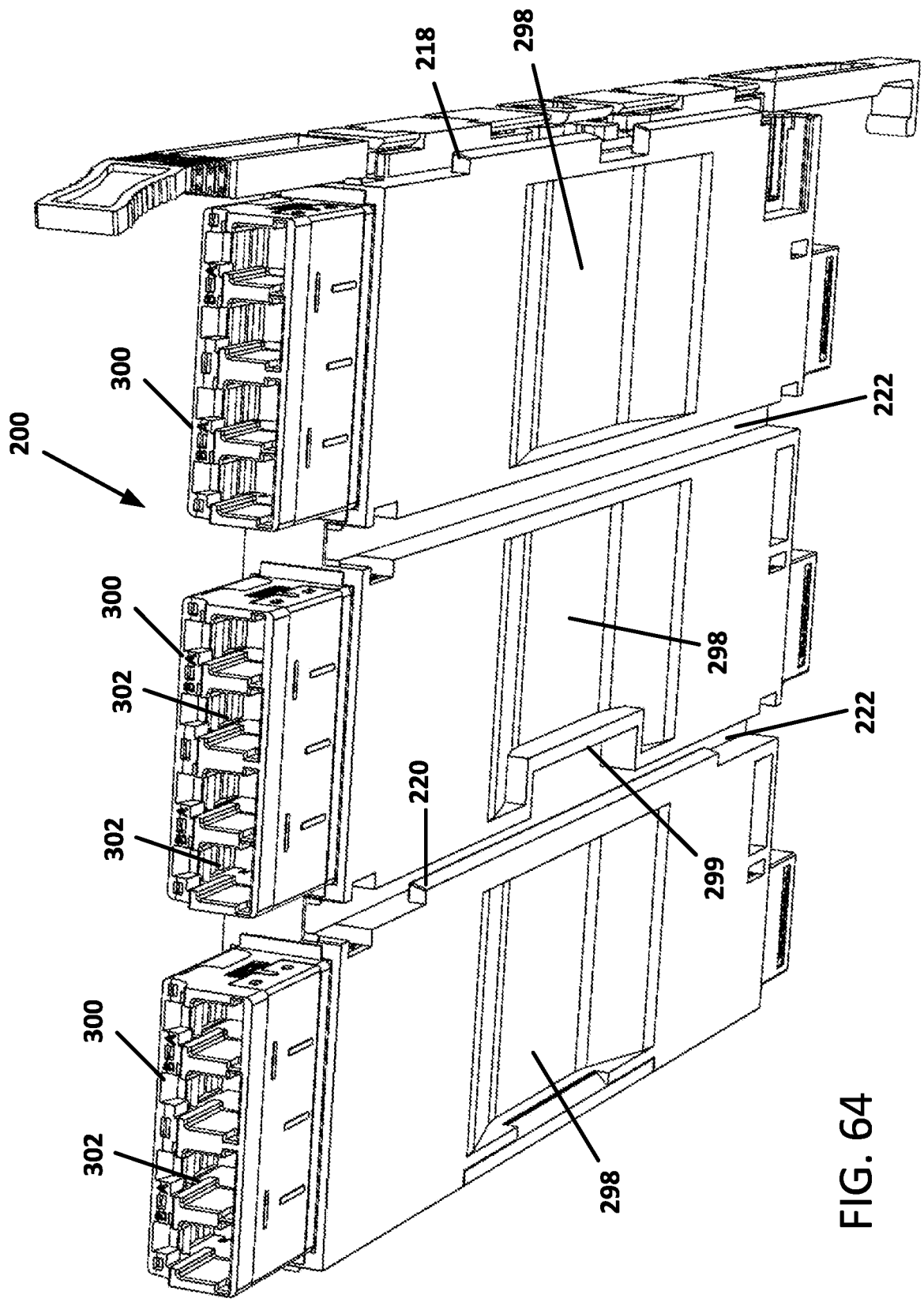
FIG. 64 is a bottom perspective view of an example cassette.
Figure 65:
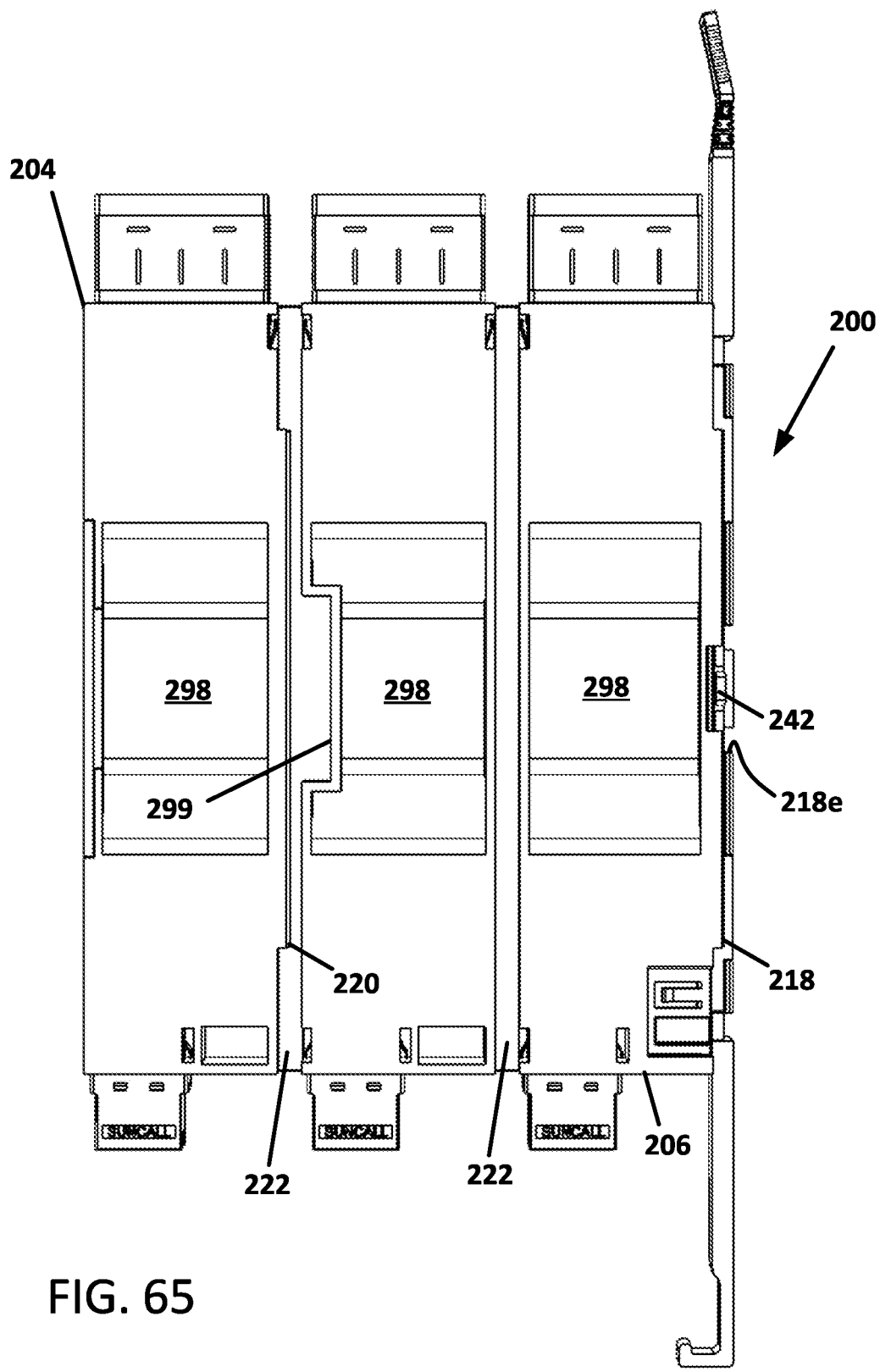
FIG. 65 is a bottom plan view of the cassette of FIG. 64.
Figure 66:
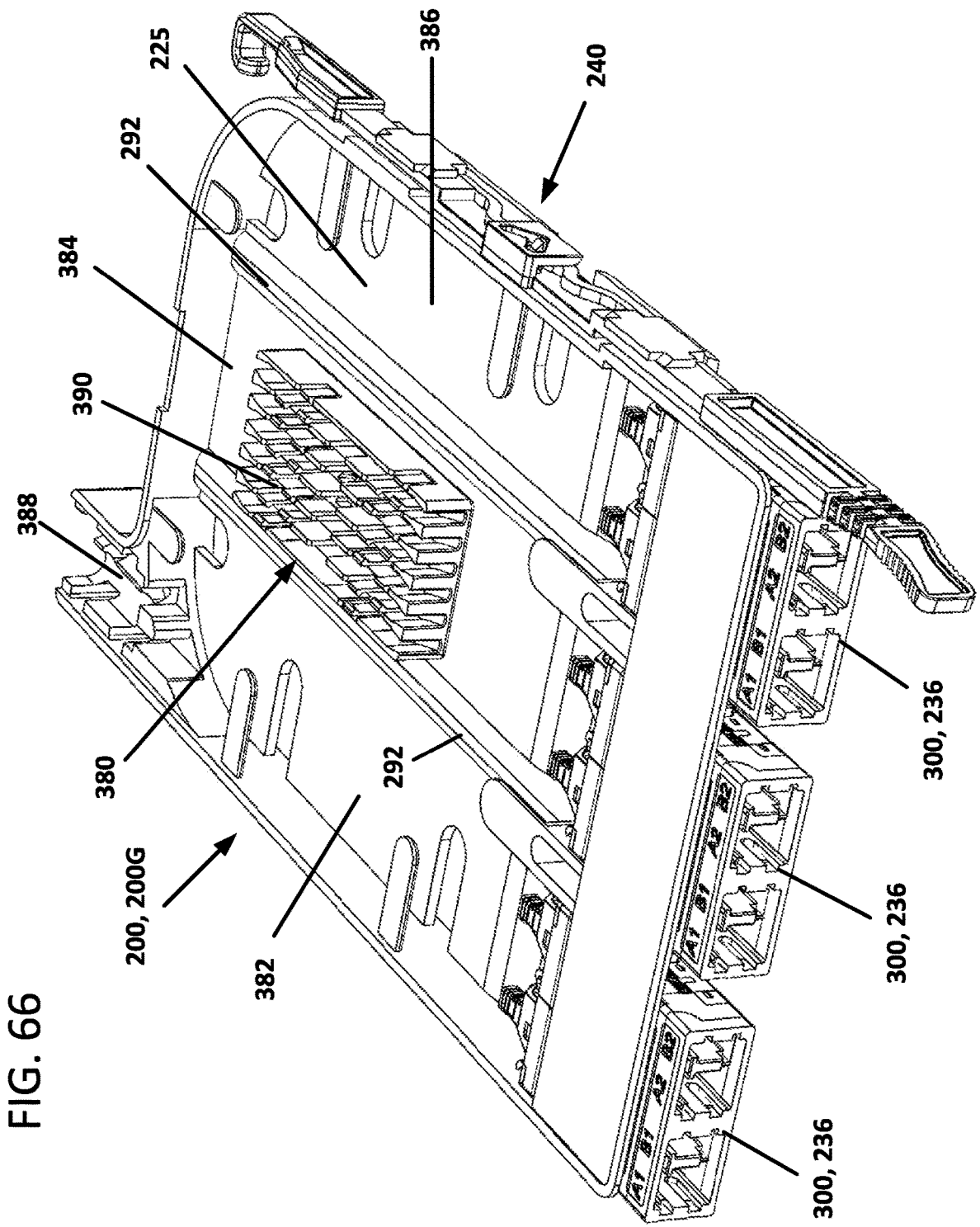
FIG. 66 is a top perspective view of an example splice cassette configured in accordance with the principles of the present disclosure, the splice cassette including a first type of splice holder disposed at a splice region of the cassette.
Figure 67:
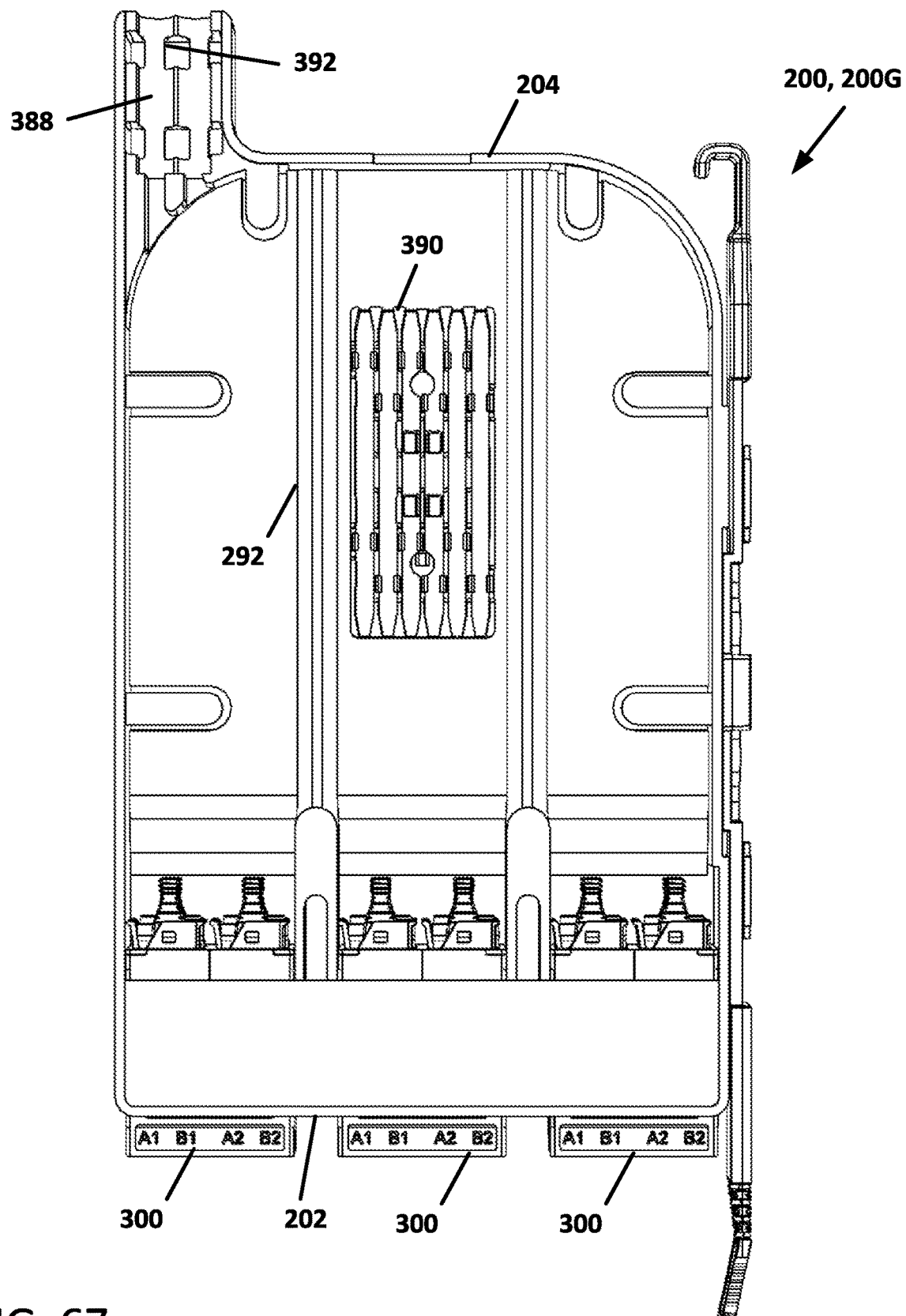
FIG. 67 is a top plan view of the splice cassette of FIG. 66.

In certain implementations, front and/or rear ends of the end rail 218 and the bottom rail 220 are offset inwardly from the front 204 and rear 206 of the cassette body 202 (e.g., see FIG. 64). For example, the front and rear of the bottom rail 220 are disposed within a respective bottom channel 222. Offsetting the front and/or rear ends of the rails 218, 220 may facilitate positioning of the cassette 200 on the tray arrangement 110 by first roughly aligning the guides 150, 350 with the bottom channel 222 and then further aligning the rails 118, 220 with the grooves 162, 362 of the guides 150, 350. In certain examples, molding of the bottom rail 220 can be facilitated by including a recess 299 facing the free end of the bottom rail 220 along at least an intermediate portion of the bottom rail 220.

The second end 210 of the cassette body 202 is not configured to engage a guide 150, 350. In certain examples, the cassette body 202 is devoid of rails (i.e., does not include any rails) at the second end 210 (e.g., see FIG. 18). Rather, the second end 210 of the cassette body 202 directly opposes the first side 156, 356 (e.g., the closed surface 160, 360) of the guide 150, 350. In certain examples, the second end 210 of the cassette body 202 defines a generally flat surface. In certain examples, the second end 210 of the cassette body 202 is spaced from the first side 156, 356 of the guide 150, 350 sufficient to avoid contacting the guide 150, 350.

The cassette body 202 defines a two or more front apertures (e.g., three front apertures, four front apertures, six front apertures, etc.) 212 at the front end 204. Each of the front apertures 212 is configured to hold one or more optical adapters 230, 232, 234, 236. In certain implementations, the front apertures 212 are separated from each other by respective intermediate regions 214. For example, in FIG. 19, the cassette body 202 defines a first front aperture 212A separated from a second front aperture 212B by an intermediate region 214.

Figure 58:
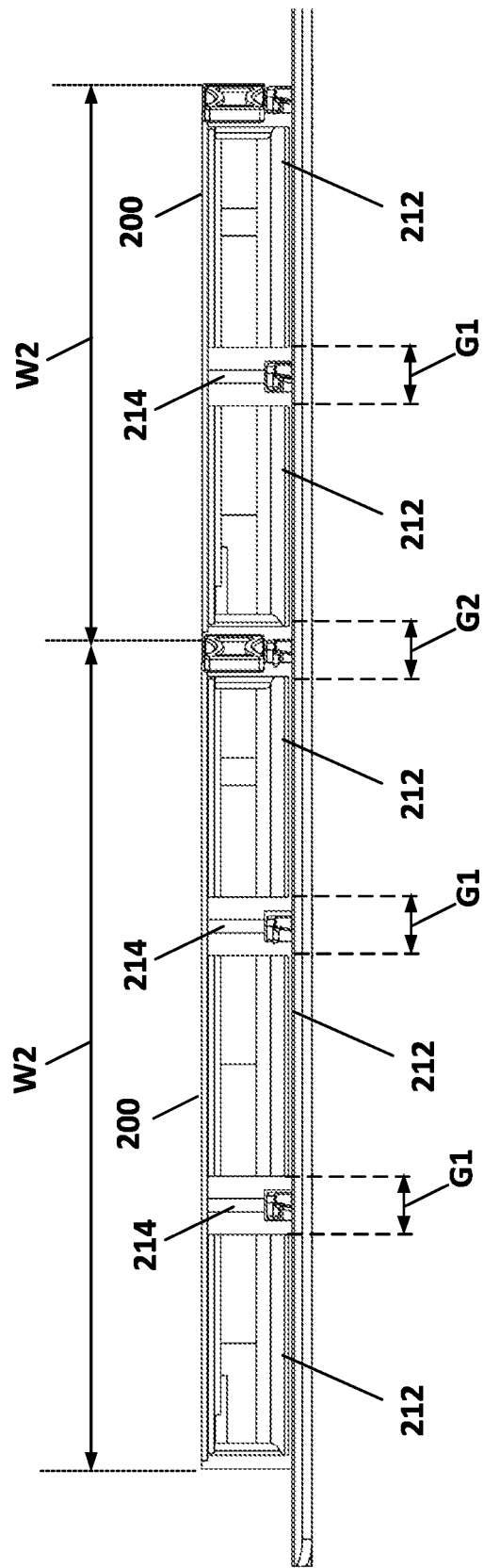
FIG. 58 is a front elevational view of a portion of a communications arrangement including first and second cassettes mounted to the tray arrangement of FIG. 2, the first and second cassettes having the port members removed for ease in viewing the front apertures to show the even spacing between the front apertures.

As shown in FIG. 58, the intermediate regions 214 of a cassette 200 have a consistent size so that adjacent front apertures 212 of a cassette 200 are spaced from each other by a gap G1 that extends along the width W2 of the cassette 200. In certain examples, the front apertures 212 of a cassette 200 also have a consistent size extending along the width W2 of the cassette 200. In certain examples, all cassettes 200 that fit on the tray arrangement 110 have equally sized front apertures 212. In certain examples, the cassettes 200 are configured so that adjacent front apertures 212 of adjacent cassettes 200 (e.g., the right-most front aperture 212 of a first cassette 200 and the left-most front aperture 212 of a second cassette 200) are spaced from each other by a spacing G2 that is the same (within manufacturing tolerances) as the spacing G1 of the adjacent front apertures 212 of the same cassette 200 (e.g., see FIG. 58). Making the spacing between adjacent front apertures 212 of adjacent cassettes 200 consistent with the spacing between adjacent front apertures 212 of the same cassette 200 facilitates mixing different sizes of cassettes 200 on the tray arrangement 110 at a discretion of the user.

As shown in FIGS. 19 and 20, the cassette body 202 defines a bottom channel 222 extending along the length L2 of the cassette body 202. The bottom channels 222 are sized to receive guides 150, 350 to enable a cassette 200 to extend over one or more guides 150, 350. In some implementations, the channels 222 are sized so that a top of the channel 222 is spaced from the top surface 164, 364 of the guide 150, 350 received therein. In other implementations, the channels 222 are sized so that a top of the channel 222 rests on and slides along the top 164, 364 of the guide 150, 350. Each cassette 200 spans at least two bays 140, 340 of the tray arrangement 110, 310. In certain examples, the bottom channel 222 is disposed at an intermediate region 214 of the cassette 200 between two front apertures 212.

Figure 41:
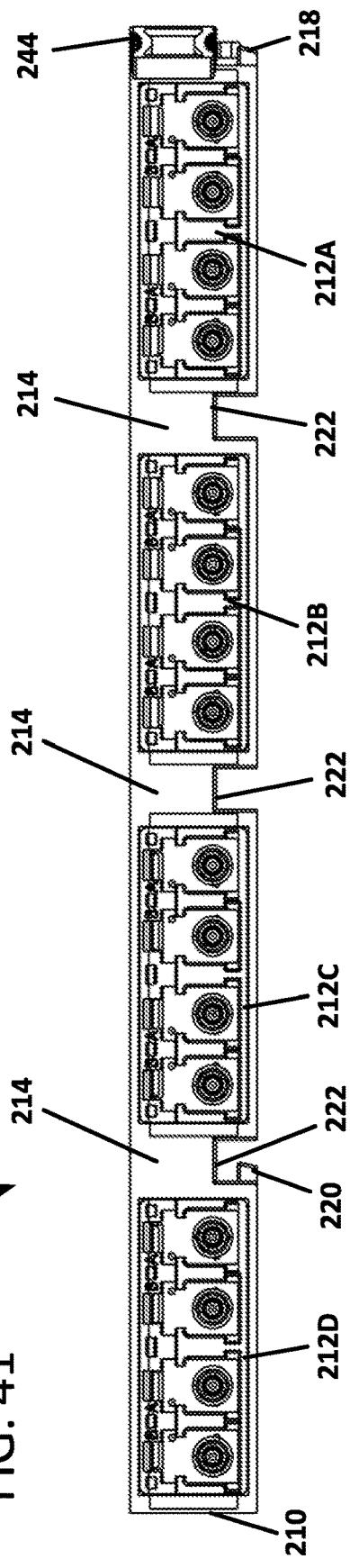
FIG. 41 is a front elevational view of the third cassette of FIG. 39.
Figure 42:
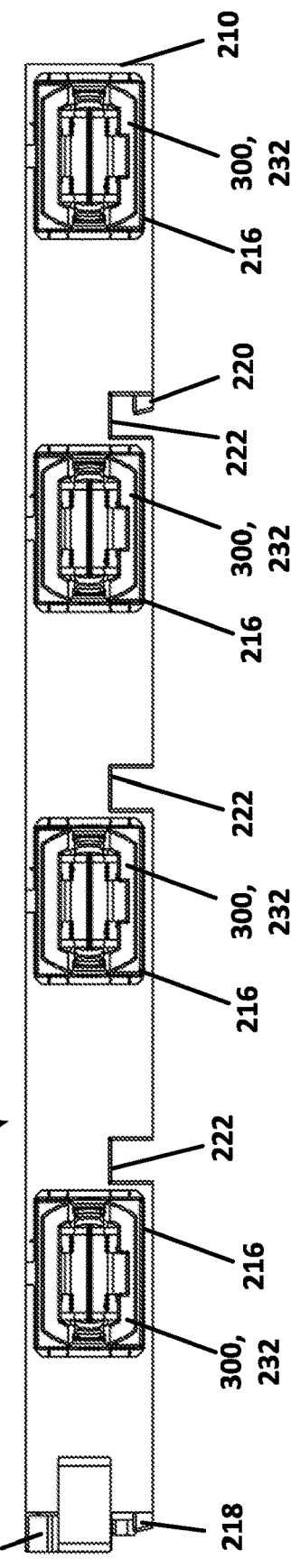
FIG. 42 is a rear elevational view of the third cassette of FIG. 39.
Figure 43:
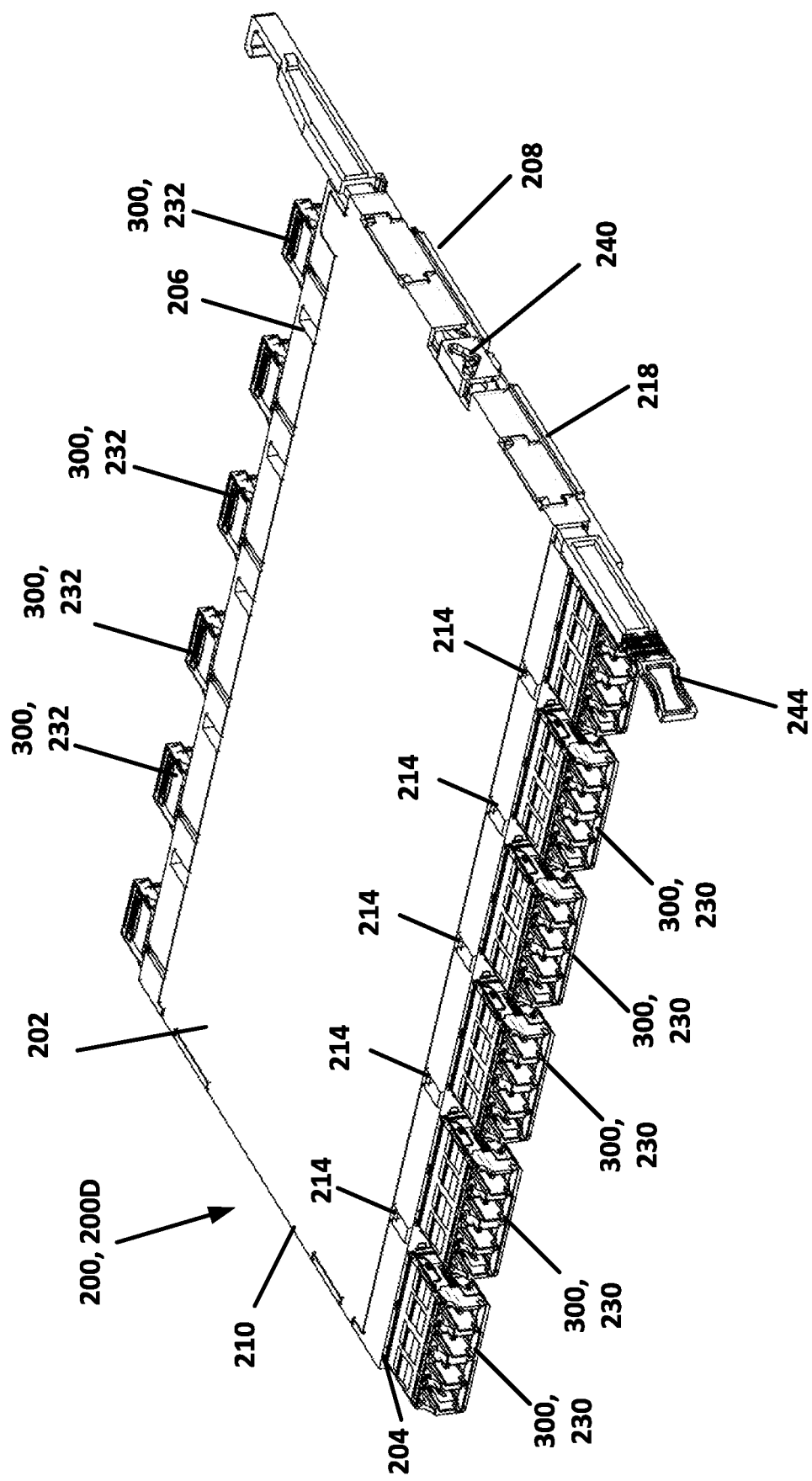
FIG. 43 is a front, first side perspective view of a fourth example cassette suitable for use with the tray arrangement of FIG. 2, the fourth cassette carrying six groups of front ports separated by intermediate regions at a front end of the fourth cassette.
Figure 44:
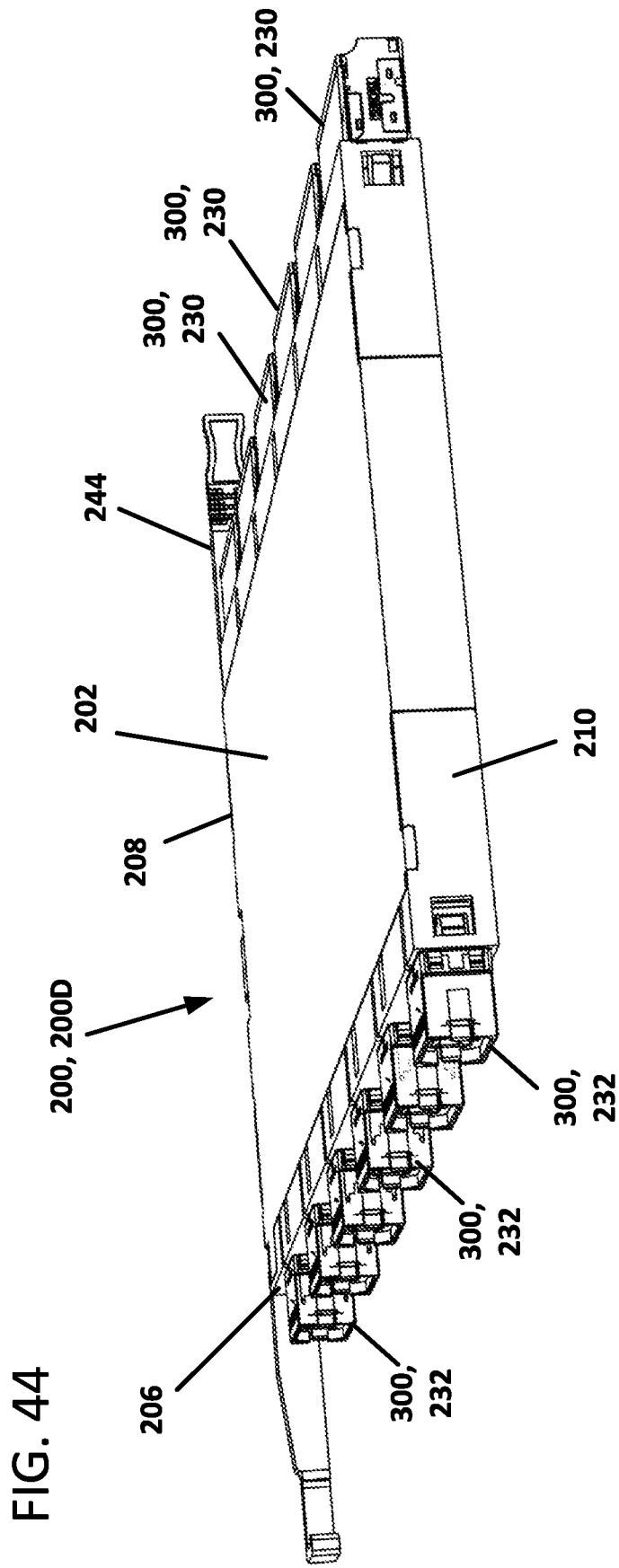
FIG. 44 is a front, second side perspective view of the fourth cassette of FIG. 43, the second side being opposite the first side.
Figure 45:
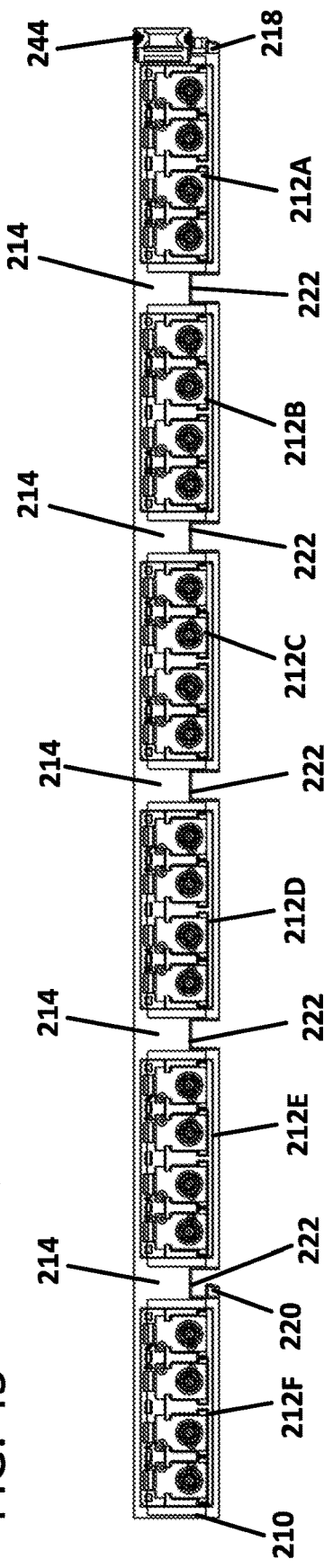
FIG. 45 is a front elevational view of the fourth cassette of FIG. 43.
Figure 46:
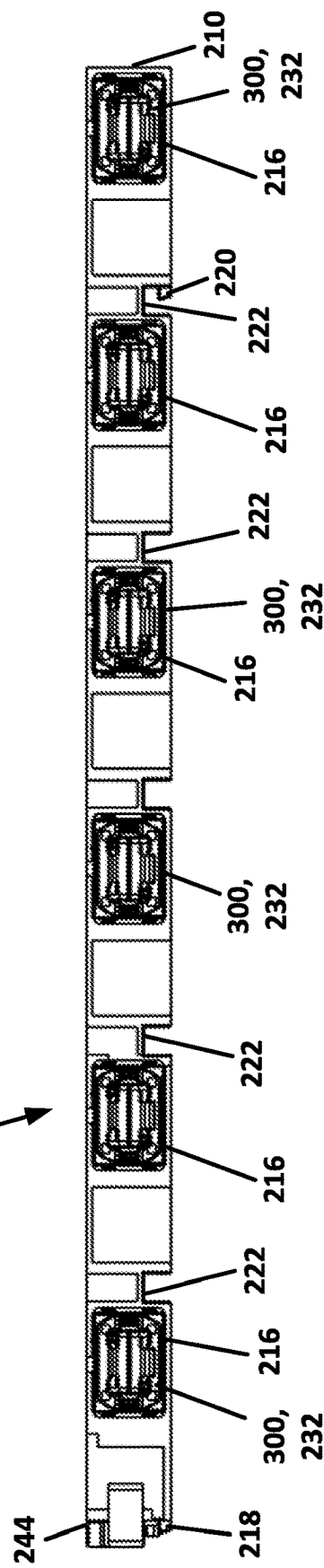
FIG. 46 is a rear elevational view of the fourth cassette of FIG. 43.

In certain implementations, each intermediate region 214 defines a bottom channel 222. Accordingly, a cassette 200 having two front apertures 212A, 212B defines a single bottom channel 222. A cassette 200 having three front apertures 212 defines two bottom channels 222—a first bottom channel 222 disposed between the first front aperture 212A and the second front aperture 212B and a second bottom channel 222 disposed between the second front aperture 212B and a third front aperture 212 (e.g., see FIG. 37). A cassette 200 having four front apertures 212 defines three bottom channels 222 (e.g., see FIG. 41). A cassette 200 having six front apertures 212 defines five bottom channels 222 (e.g., see FIG. 45).

In certain implementations, a punch-out cover may be initially provided at one or more of the front apertures 212 so a respective optical adapter is mounted at fewer than all of the front apertures 212. In such cases, a user has the flexibility to select a position for a front optical adapter to facilitate cable routing.

In certain implementations, the bottom rail 220 of the cassette body 202 is disposed within the bottom channel 222. The bottom rail 220 extends less than a width of the bottom channel 222 to accommodate the guide 150, 350 within the bottom channel 222 (e.g., see FIG. 48). In certain examples, the bottom rail 220 is flush with a bottom of the cassette body 202. In certain examples, the bottom rail 220 and the end rail 218 are coplanar with each other.

Figure 48:
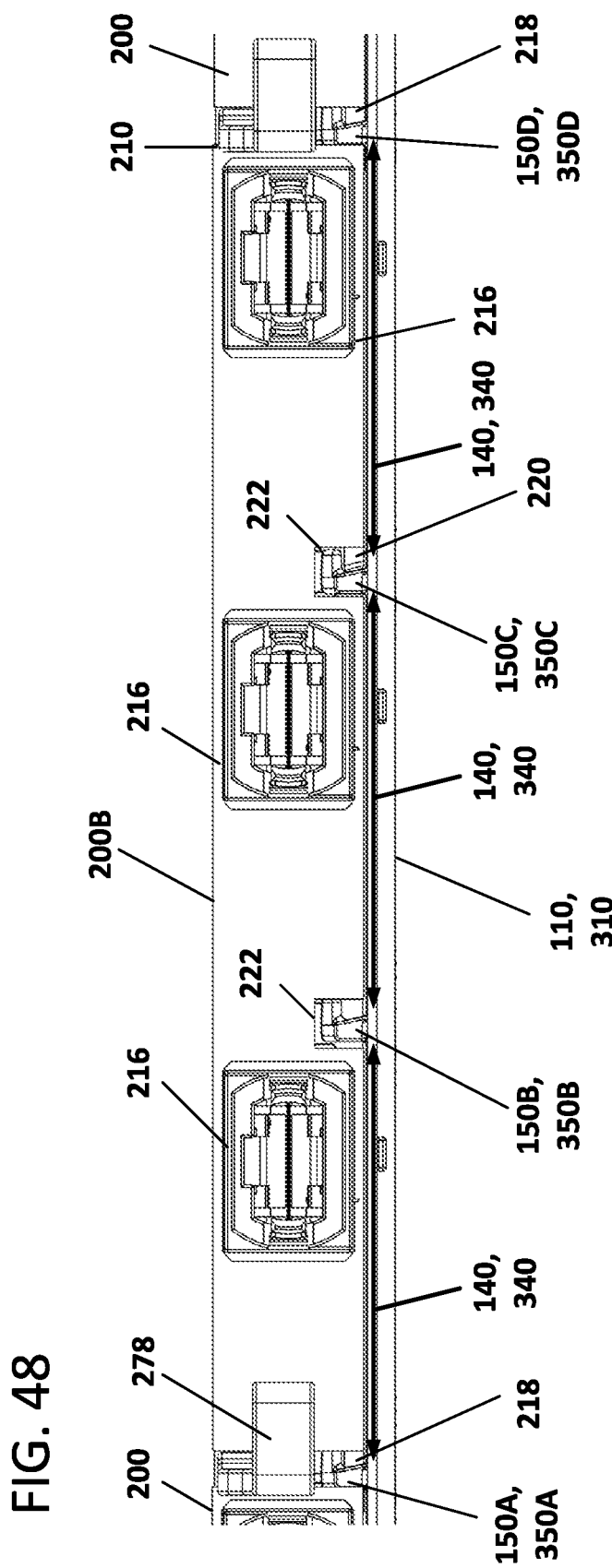
FIG. 48 is a rear elevational view of a portion of a tray arrangement including a cassette mounted to guides carried by the tray arrangement.

In the example shown in FIG. 48, a cassette 200B is mounted to guides 150, 350 of a tray arrangement 110. The cassette 200B spans three bays 140, 340—a first bay 140, 340 disposed between the first guide 150A, 350A and the second guide 150B, 350B, a second bay 140, 340 disposed between the second and third guides 150B, 350B, 150C, 350C and a third bay 140, 340 disposed between the third guide 150C, 350C and a fourth guide 150D, 350D. The cassette 200B defines bottom channels 222 that receive the second and third guides 150B, 350B, 150C, 350C. The first guide 150A, 350A inter-connects with the end rail 218 of the cassette 200B. The second guide 150B, 350B does not inter-connect with any structure of the cassette 200B, but rather slides within one of the bottom channels 222. In an example, the cassette 200B may slide along a top 164, 364 of the second guide 150B, 350B. The third guide 150C, 350C inter-connects with the bottom rail 220 of the cassette 200B within the other bottom channel 222. In the example shown, the cassette 200B extends towards, but does not engage a fourth guide 150D, 350D at an opposite side of the third bay 140, 340. Rather, the fourth guide 150D, 350D receives the end rail 218 of an adjacent cassette 200. In other implementations, the tray arrangement 110, 310 may not include a fourth guide 150D, 350D. Similarly, the first guide 150, 350 does not engage the cassette 200 disposed at an opposite side of the first guide 150A, 350A from the cassette 200B.

Figure 17:
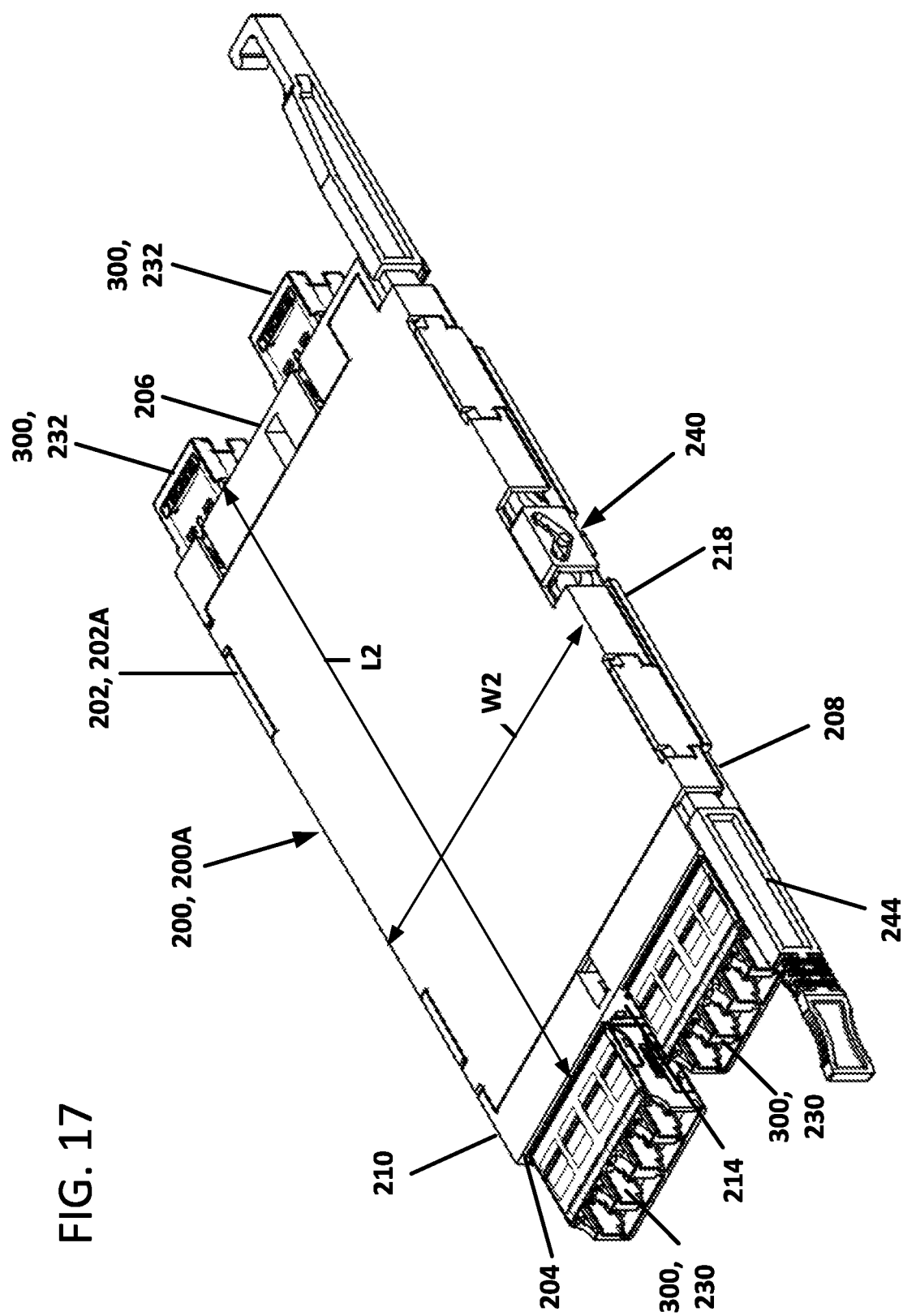
FIG. 17 is a front, first side perspective view of a first example cassette suitable for use with the tray arrangement of FIG. 2, the first cassette carrying two groups of LC ports separated by an intermediate region at a front end of the first cassette.
Figure 21:
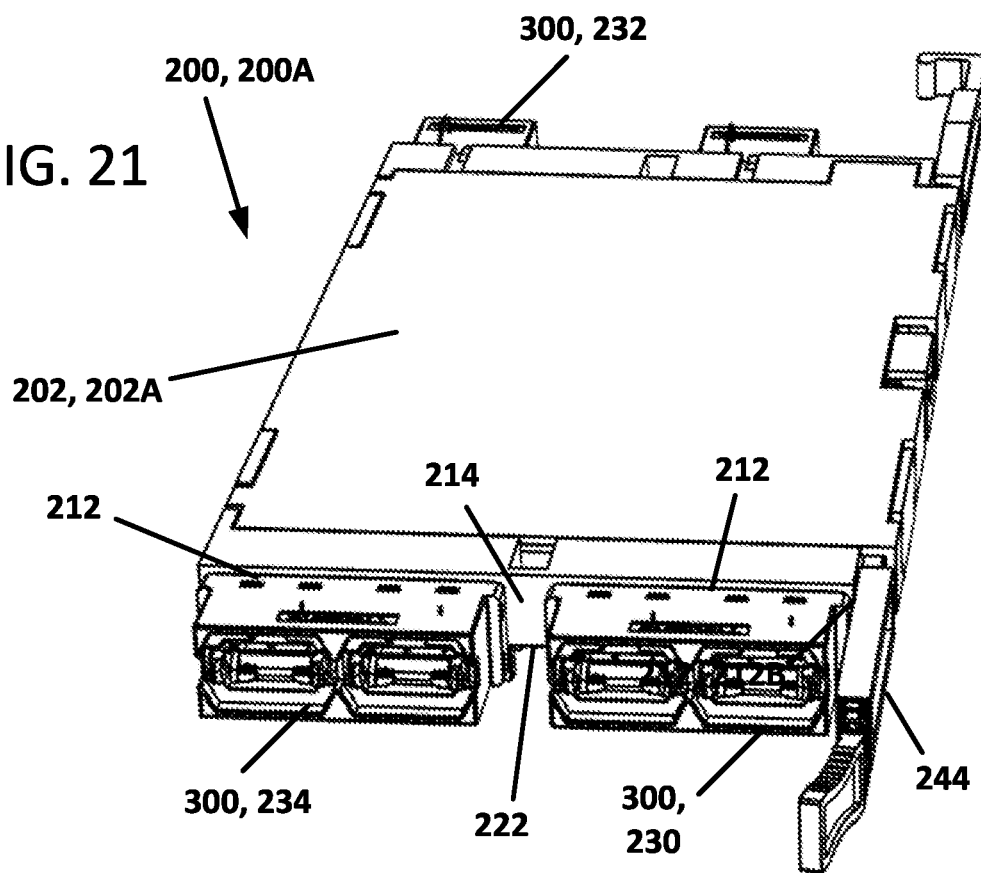
FIG. 21 is a front perspective view of the first cassette of FIG. 17 carrying two groups of MPO ports separated by the intermediate region at the front end of the first cassette.
Figure 22:
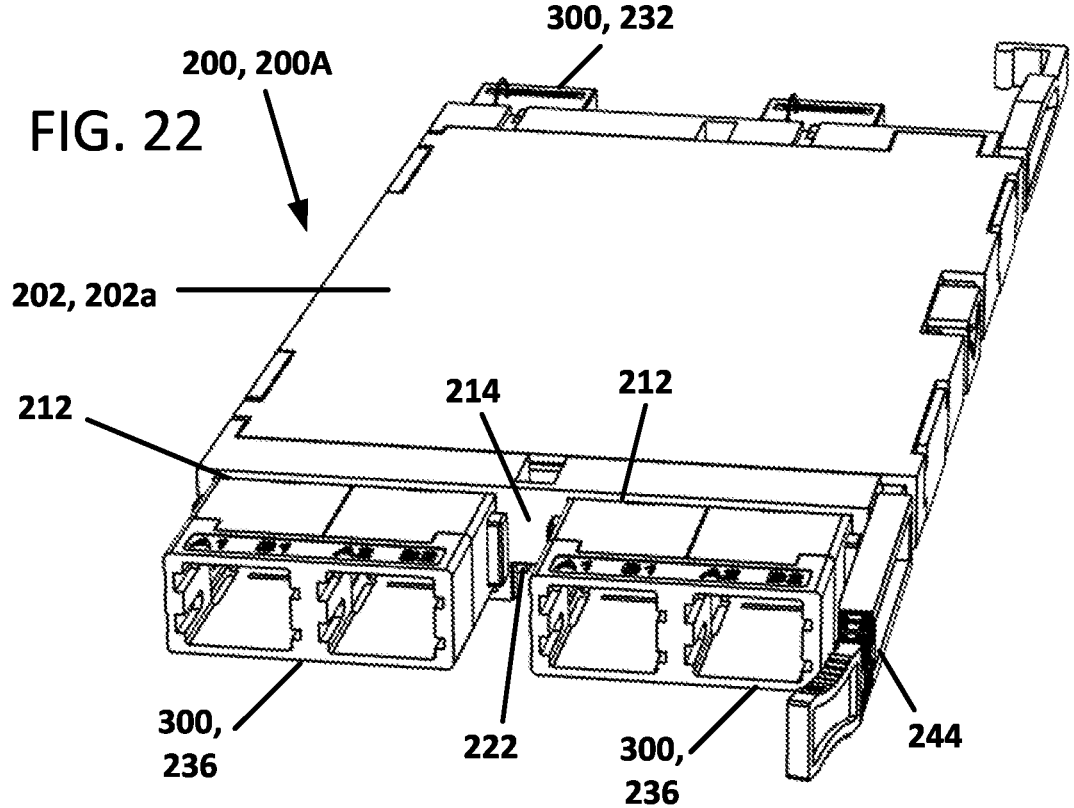
FIG. 22 is a front perspective view of the first cassette of FIG. 17 carrying two groups of SN ports separated by the intermediate region at the front end of the first cassette.

In certain implementations, each front aperture 212 of a cassette 200 has a common size. In certain examples, each of the front apertures 212 has a footprint sized to two standardized ports. As the term is used herein, a standardized port refers to a sufficient spacing to accommodate an MPO port or a duplex-LC port at a discretion of the user. In FIG. 17, the cassette body 202 is shown carrying a quadruplex LC adapter 230 at each of the front apertures 212. Each quadruplex LC adapter 230 defines two duplex-LC ports (i.e., four LC ports). In other examples, the cassette body 202 may carry a duplex MPO adapter 234 (e.g., see FIG. 21), two quadruplex SN adapters 236 (e.g., see FIG. 22), two SC adapters, or any desired adapter type that fits in a quadruplex LC adapter footprint. In still other implementations, the front apertures 212 may be sized to handle other port footprints.

In certain examples, cassette 200 is configured to fit one front aperture 212 per bay 140. In certain examples, each tray arrangement 110 defines at least twelve bays 140. In certain examples, each front aperture 212 is configured to fit four LC ports. In such examples, each tray arrangement 110 is configured to hold forty-eight LC ports. In certain examples, each front aperture 212 is configured to hold four SN ports. In such examples, each tray arrangement 110 is configured to hold forty-eight SN ports (or ninety-six fibers). In certain examples, each front aperture 212 is configured to hold a duplex MPO ports—each receiving eight, twelve, sixteen, or twenty-four live fibers. In such examples, each tray arrangement 110 is configured to hold twenty-four MPO ports.

In certain implementations, three tray arrangements 110 fit within a 1 RU chassis. In certain examples, each 1 RU chassis may hold at least 144 LC ports. In certain examples, each 1 RU chassis may hold at least 144 SN ports (or 288 fiber connections). In certain examples, each 1 RU chassis may hold at least 72 MPO ports (for 576 fiber connections, 864 fiber connections, 1,152 fiber connections, and 1,728 fiber connections depending on the number of live fibers received).

In certain implementations, the cassettes 200 are configured to lock to the guides 150, 350 in at least one discrete position. Each cassette 200 includes a latching arrangement 240 that rides over the top 164, 364 of a respective one of the guides 150, 350. The latching arrangement 240 includes a stop member 242 that drops into the notch 166, 366 of the respective guide 150, 350 to lock the cassette 200 to the guide 150, 350. The latching arrangement 240 also includes a release handle 244 to raise the stop member 242 out of the notch 166, 366.

The stop member 242 is carried by the cassette body 202 at the first end 208. The stop member 242 is movable relative to the cassette body 202 along a movement axis SM that extends parallel to the height H2 of the cassette 200. In certain implementations, the stop member 242 is movable along the movement axis SM between a lock position and a release position. In certain examples, the stop member 242 is biased to the lock position.

In certain implementations, the stop member 242 rides over the ramped surface 172, 372 at the front end 152, 352 or rear end 154, 354 of the guide 150, 350 when the cassette 200 is first mounted to the guides 150, 350. The ramped surfaces 172, 372 transition the stop member 242 from the lock position to the release position. The top 164, 364 of the guide 150, 350 maintains the stop member 242 in the release position until the stop member 242 vertically aligns with the notch 166, 366. The notch 166, 366 allows the stop member 242 to transition to the lock position.

Figure 29A:
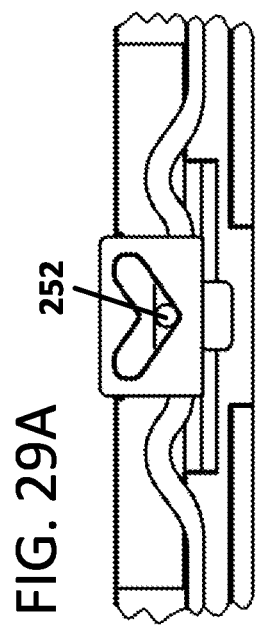
FIG. 29A is an enlarged view of a portion of FIG. 29 showing a camming member disposed along the camming groove of the release handle.
Figure 29:
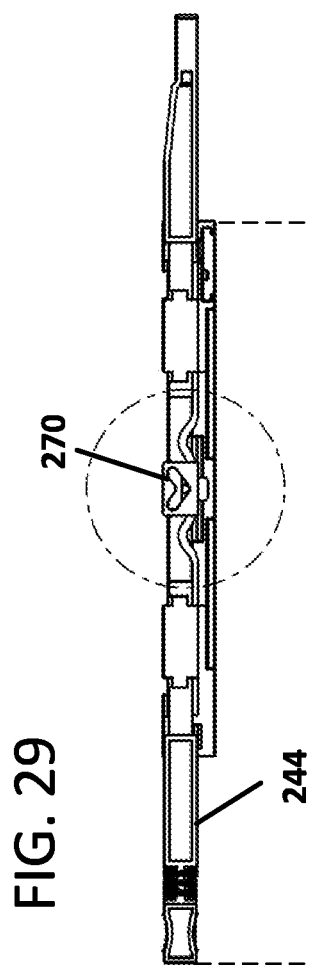
FIG. 29 is a side elevational view of the cassette of FIG. 17 shown with the release handle in a neutral position relative to the cassette body.
Figure 30:
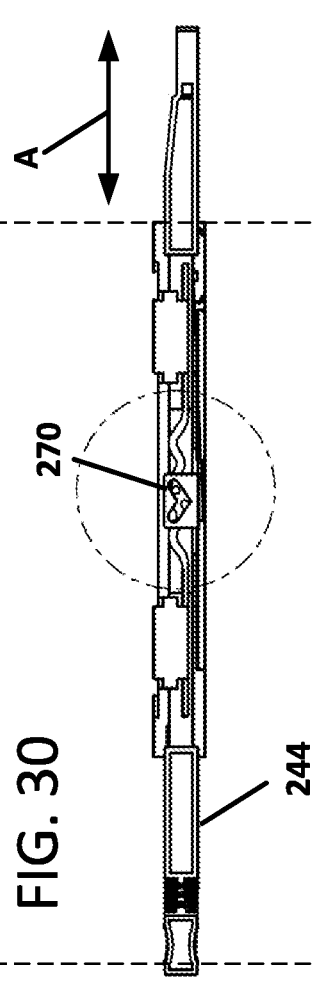
FIG. 30 is a side elevational view of the cassette of FIG. 17 shown with the release handle in a forwardly-extended position relative to the cassette body.
Figure 31:
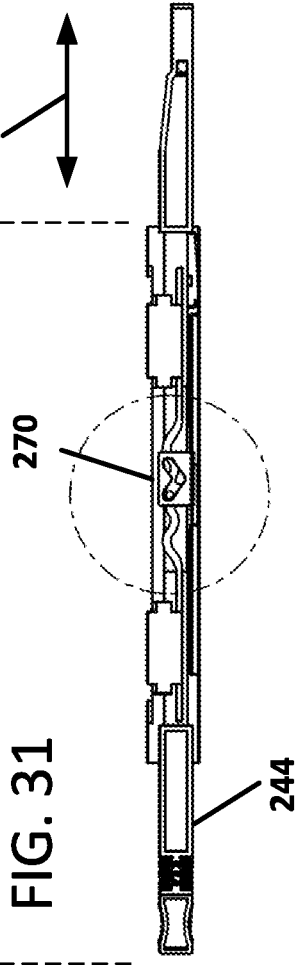
FIG. 31 is a side elevational view of the cassette of FIG. 17 shown with the release handle in a rearwardly-extended position relative to the cassette body.

The release handle 244 is configured to move relative to the cassette body 202 along an actuation axis A between a neutral position (FIG. 29) and a forward extended position (FIG. 30). When in the neutral position, the release handle 244 enables the stop member 242 is be in the lock position. When disposed in the forward extended position, the release handle 244 transitions the stop member 242 to the release position. In certain implementations, the release handle 244 also can be moved relative to the cassette body 202 along the actuation axis A to a rearward extended position (FIG. 31). When disposed in the rearward extended position, the release handle 244 transitions the stop member 242 to the release position.

When in the lock position, engagement surfaces 246, 248 of the stop member 242 extend at least partially through a recess or gap 218e in the end rail 218. The first engagement surface 246 is configured to oppose the first catch surface 168, 368 within the notch 166, 366 of the guide 150, 350 and the second engagement surface 248 is configured to oppose the second catch surface 170, 370 when the stop member 242 is engaged with the notch 166, 366. Abutment between the first engagement surface 246 and the first catch surface 168, 368 inhibits forward movement of the cassette 200 along the guides 150, 350. Abutment between the second engagement surface 248 and the second catch surface 170, 370 inhibits rearward movement of the cassette 200 along the guides 150, 350. When in the release position, the engagement surfaces 246, 248 of the stop member 242 are raised out of the notch 166, 366 sufficient so that the engagement surfaces 246, 248 do not abut the catch surfaces 168, 368, 170, 370 upon movement of the cassette 200 relative to the guides 150, 350.

Figure 24:
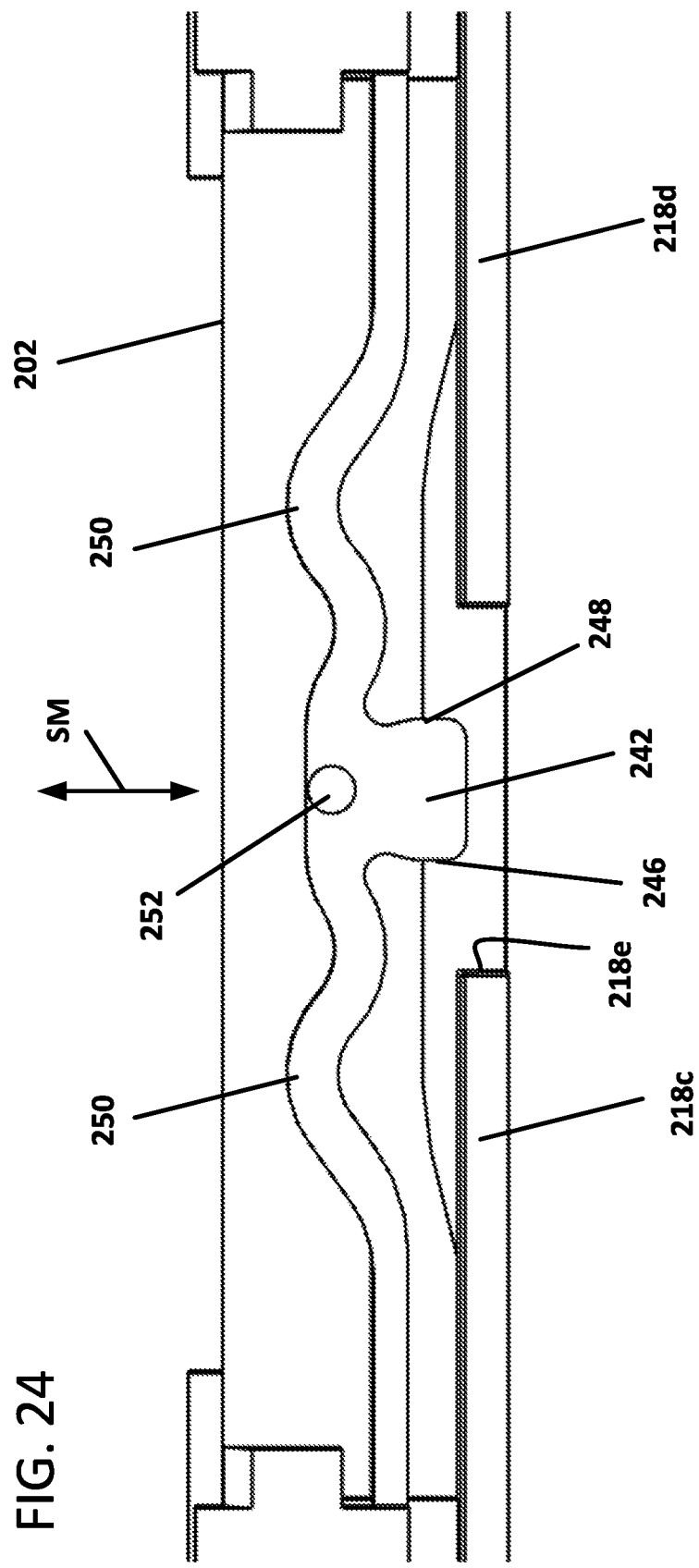
FIG. 24 is a side elevational view of the stop member and a portion of the cassette body of FIG. 23.

In certain examples, the end rail 218 includes a front end rail 218c and a rear end rail 218d aligned along the length L2 of the cassette 200 (e.g., FIG. 24). The rear end rail 218d is spaced from the front end rail 218c along the length L2 of the cassette 200 to provide the gap 218e. In other implementations, a recess can be provided in a continuous end rail 218. When in the lock position, the stop member 242 extends at least partially into the recess or gap 218e (e.g., see FIG. 24). When in the release position, the engagement surfaces 246, 248 of the stop member 242 are raised out of the recess or gap 218e.

In certain implementations, the stop member 242 is coupled to the cassette body 202 using one or more spring members 250. In the example shown, first and second spring members 250 extend from opposite sides of the stop member 242. In certain examples, the spring members 250 limit the movement of the stop member 242 to the movement axis SM. The spring members 250 bias the stop member 242 to the lock position.

The release handle 244 is actuated by moving the release handle 244 in a different direction than the stop member 242 moves. In certain examples, the release handle 244 is moved orthogonally to the movement of the stop member 242. In an example, the release handle 244 is moved along the forward-rearward axis FR of the tray arrangement 110 while the stop member 242 moves along the height H2 of the cassette 200.

Figure 25:
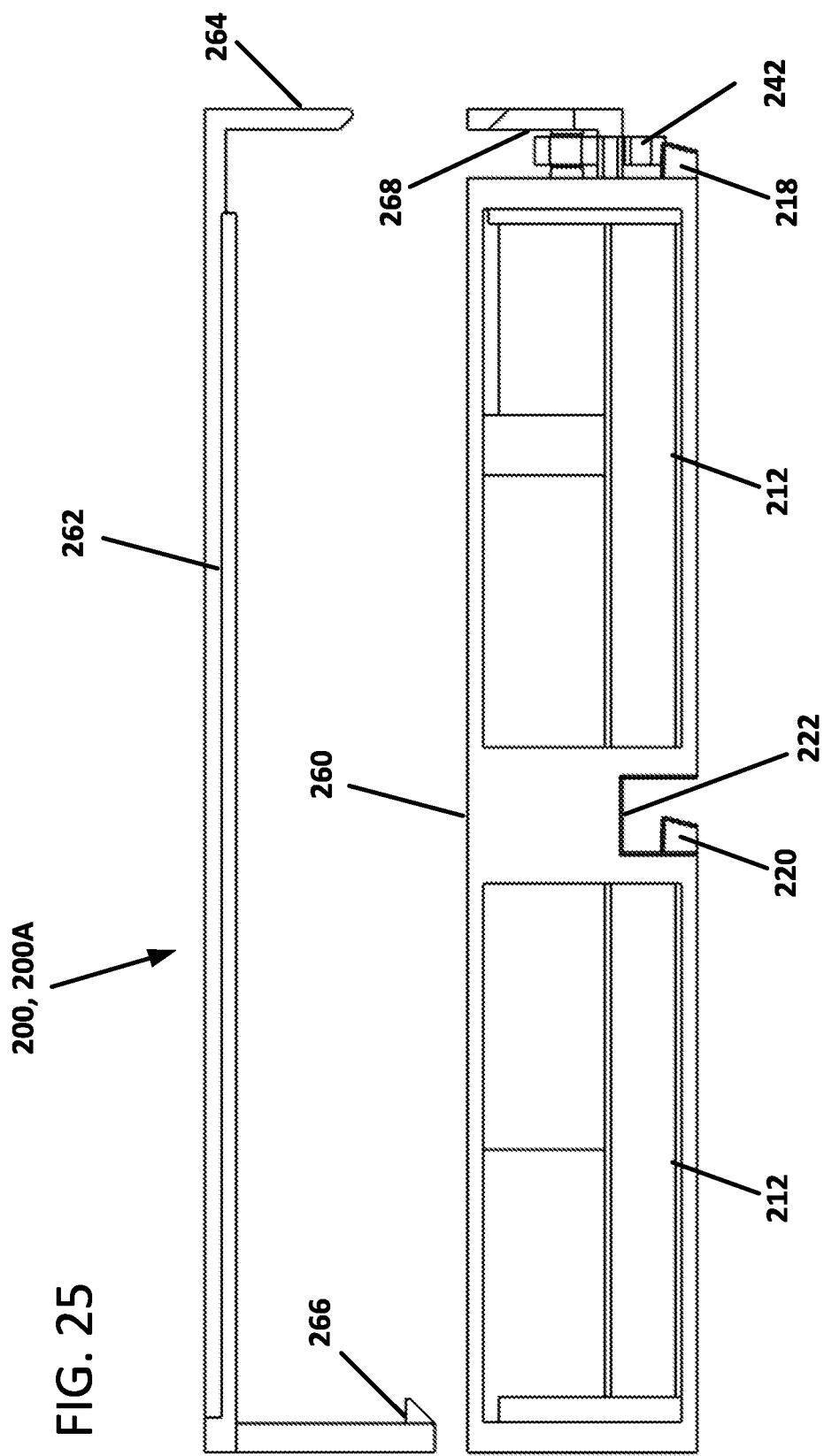
FIG. 25 is a front elevational view of the cassette body of the first cassette of FIG. 17.

In certain implementations, the stop member 242 is carried outside a main interior of the cassette body 202. Accordingly, movement of the stop member 242 does not affect the optical fibers or other connections disposed within the main interior of the cassette body 202. In certain examples, the cassette body 202 includes a base 260 and a cover 262 that cooperate to define the main interior. In certain examples, the stop member 242 is carried at an exterior of the base 260, but is at least partially covered by the cover 262. For example, the cover 262 may include an overhang portion 264 that extends over the stop member 242 (e.g., see FIGS. 20 and 25). In some implementations, the cover 262 may include one or more latching members 266 to secure the cover 262 to the base 260. In other implementations, the cover 262 may be secured to the base 260 by fasteners, welding, or other securement mechanisms.

In certain implementations, the stop member 242 includes a camming member 252 that engages the release handle 244. Interaction between the camming member 252 and the release handle 244 transitions the stop member 242 between the lock and release positions as will be described in more detail herein. In certain examples, the camming member 252 is disposed at an opposite end of the stop member 242 from the engagement surfaces 246, 248. For example, the camming member 252 may be disposed at a top of the stop member 242 while the engagement surfaces 246, 248 are disposed at a bottom of the stop member 242. In certain examples, the camming member 252 extends outwardly from the stop member 242 along the width W2 of the cassette 200. In an example, the camming member 252 extends from the stop member 242 away from the cassette body 202 (e.g., see FIG. 23). In another example, the camming member 252 extends from the stop member 242 towards the cassette body 202.

In certain implementations, the base 260 defines a channel 268 along the exterior of the cassette 200 at the first end 208. The channel 268 is sized to hold the release handle 244. The channel 268 extends along the length L2 of the cassette 200 past the stop member 242. At least a portion of the stop member 242 is disposed within the channel 268. In certain implementations, the overhang portion 264 of the cover 262 extends over the release handle 244.

Figure 26:
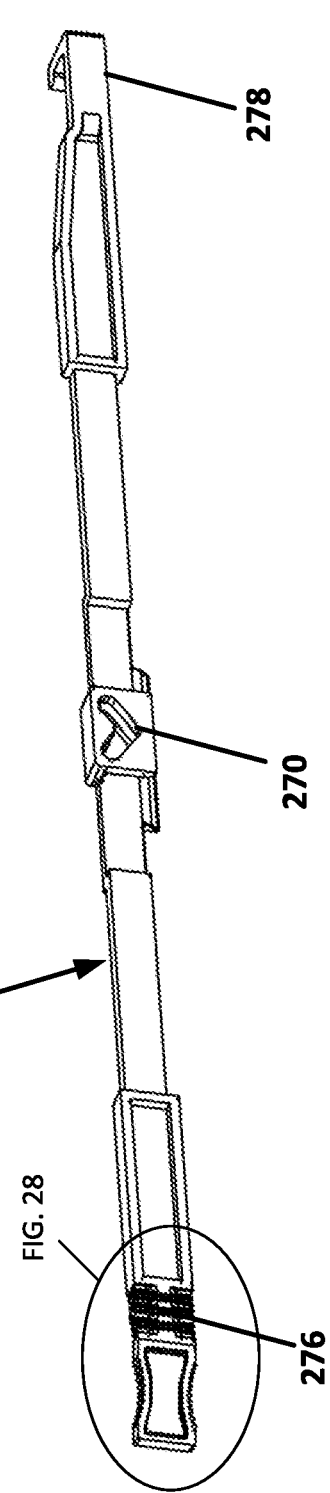
FIG. 26 is a perspective view of the release handle of FIG. 23 showing an externally-facing side of the release handle, the release handle defining a camming groove having first and second ramped surfaces.
Figure 27:
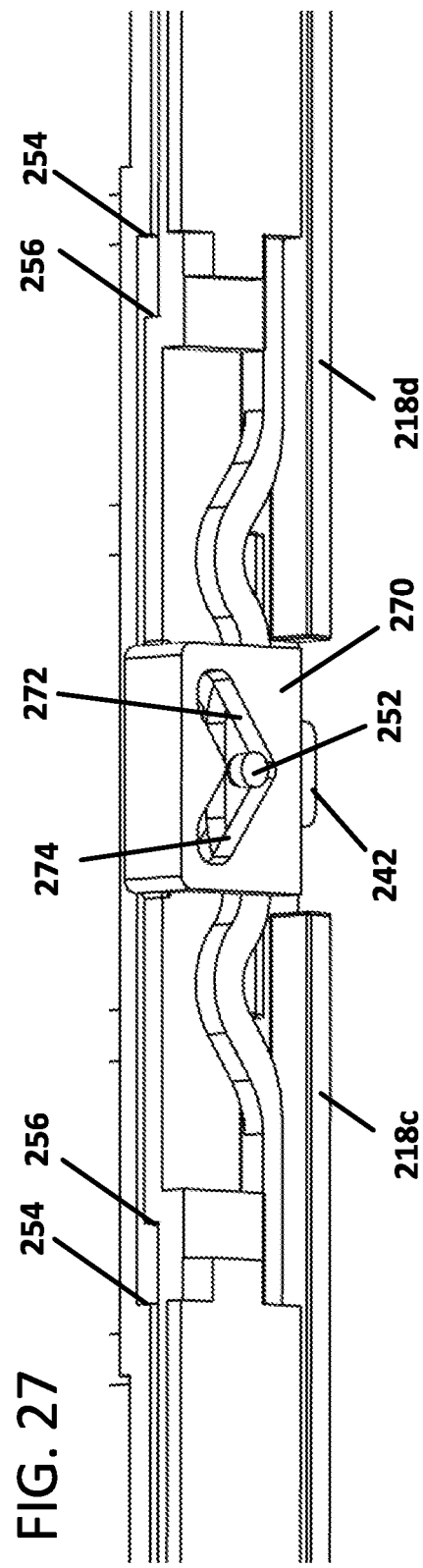
FIG. 27 is an enlarged view of the camming groove of the release handle and stop surfaces of the cassette body of FIG. 26.
Figure 28:
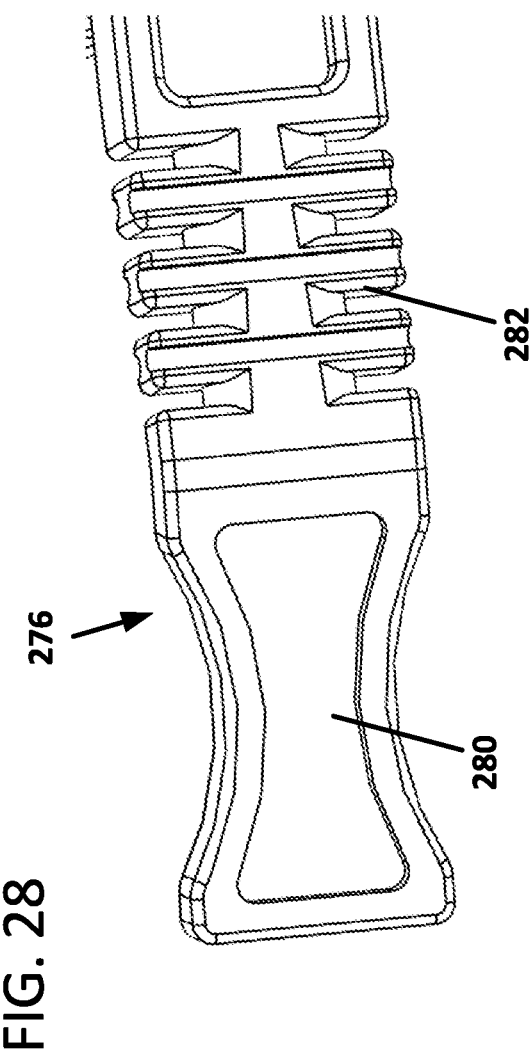
FIG. 28 is an enlarged view of the forward grip portion of the release handle.
Figure 30A:
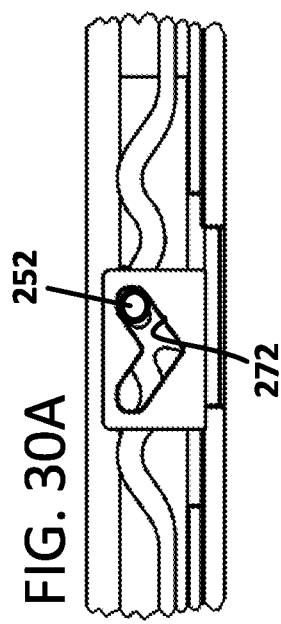
FIG. 30A is an enlarged view of a portion of FIG. 30 showing the camming member disposed along the camming groove of the release handle.
Figure 31A:
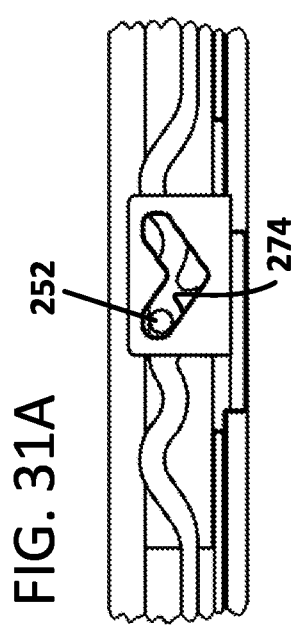
FIG. 31A is an enlarged view of a portion of FIG. 31 showing the camming member disposed along the camming groove of the release handle.
Figure 57:
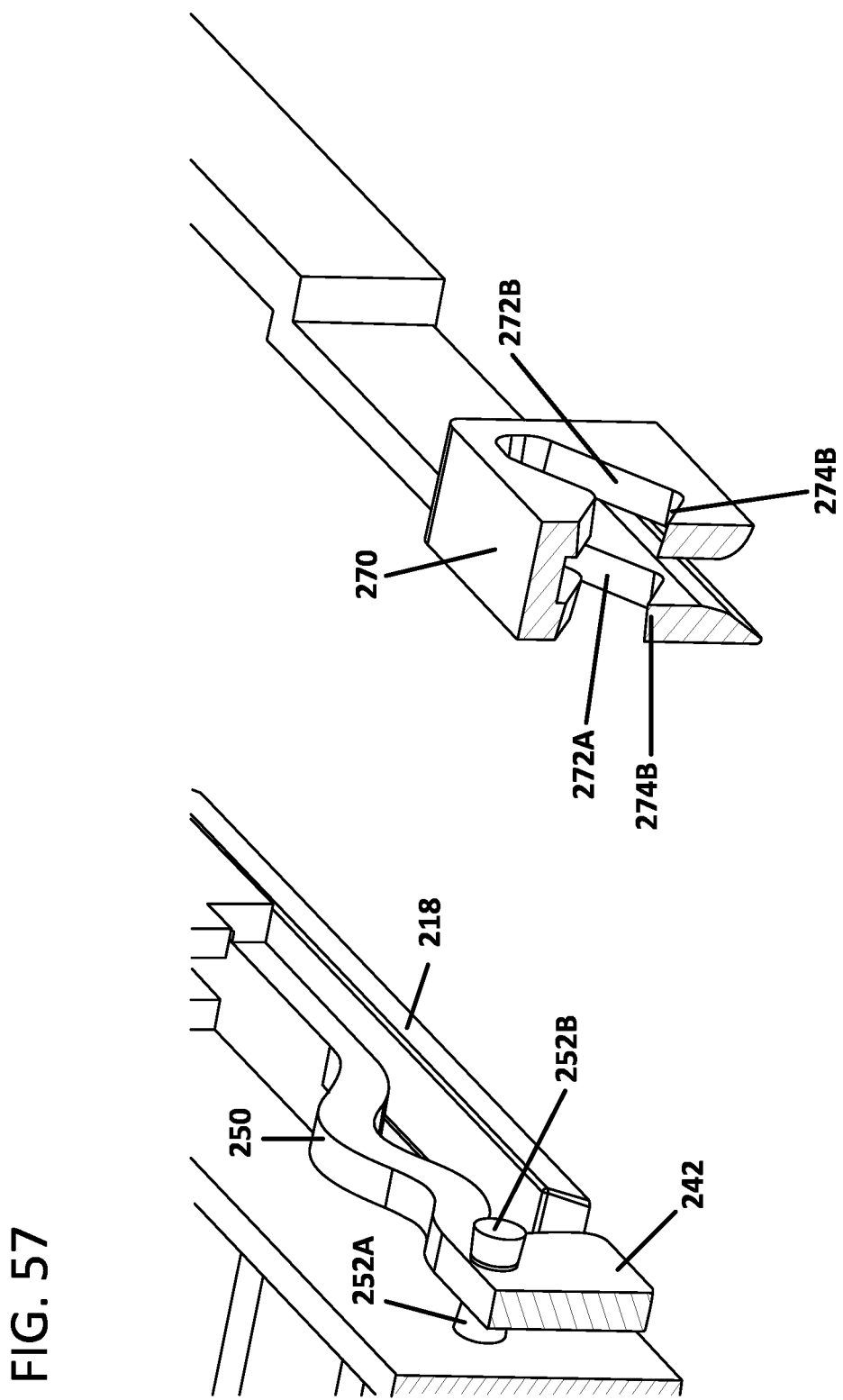
FIG. 57 shows a portion of an example transition arrangement of an example release handle shown exploded from an example stop member of an example latching arrangement of any of the cassettes shown herein.

As shown in FIGS. 26, 27, and 57, the release handle 244 includes a transition arrangement 270 and a forward grip portion 276. As best seen in FIG. 28A, the transition arrangement 270 includes a ramped surface 272 along which the camming member 252 rides as the release handle 244 is moved along the actuation axis A between the neutral position and the forwardly extended position (e.g., see FIGS. 29 and 30). As the camming member 252 rides along the ramped surface 272, the stop member 242 moves with the camming member 252 along the movement axis SM (compare FIGS. 29 and 30).

In certain implementations, the ramped surface 272 is a first ramped surface and the transition arrangement 270 also includes a second ramped surface 274 extending in an opposite direction from the first ramped surface 272. As the camming member 252 rides along the second ramped surface 274, the stop member 242 moves with the camming member 252 along the movement axis SM. The camming member 252 rides along the second ramped surface 274 when the release handle 244 moves along the actuation axis A in a rearward direction relative to the cassette body 202 to the rearward extended position (FIG. 31).

In certain implementations, the transition arrangement 270 straddles the stop member 242. For example, the transition arrangement 270 may defines a first pair of inner and outer ramped surfaces 272A, 272B disposed on opposite sides of the stop member 242 from each other and a second pair of ramped surfaces 274A, 274B disposed on opposite sides of the stop member 242 from each other. The stop member 242 may include a first camming member 252A extending towards the cassette body 202 and a second camming member 252B extending outwardly away from the cassette body 202. The first camming member 252A is configured to ride along the inner first and second ramped surfaces 272A, 274A and the second camming member 252B is configured to ride along the outer first and second ramped surfaces 272B, 274B. By straddling the stop member 242, the transition member 270 provides more stability to the movement of the stop member 242.

In other implementations, the stop member 242 may define a single camming member 252 and the transition arrangement 270 may define a single first ramped surface and a single second ramped surface along which the camming member 252 rides. In the example shown in FIG. 47, the stop member 242 includes a single camming member extending towards the cassette body 202. In the example shown in FIG. 47, the first and second ramped surfaces define part of a triangular shaped aperture in the transition arrangement 270.

In certain implementations, the cassette body 202 and the release handle 244 are configured to limit movement of the release handle 244 relative to the cassette body 202 along the actuation axis A to between the forwardly extended position and the rearwardly extended position. For example, the cassette body 202 may define forward and rearward stop surfaces 254 that oppose forward and rearward abutment surfaces 256 on the release handle 244 (e.g., see FIG. 27). When the release handle 244 is moved to the forwardly extended position, the forward abutment surface 256 engages or is close to engaging the forward stop surface 254 of the cassette body 202. When the release handle 244 is moved to the rearwardly extended position, the rearward abutment surface 256 engages or is close to engaging the rearward stop surface 254 of the cassette body 202.

Accordingly, pulling the release handle 244 forwardly relative to the cassette body 202 releases the cassette 200 from the guide 150, 350. Continuing to pull forwardly on the release handle 244 causes the release handle 244 to entrain the cassette body 202 in the forward direction, thereby sliding the cassette body 202 along the guides 150, 350 in the forward direction. Pushing the release handle 244 rearwardly relative to the cassette body 202 also releases the cassette 200 from the guide 150, 350. Continuing to push rearwardly on the release handle 244 causes the release handle 244 to entrain the cassette body 202 in the rearward direction, thereby sliding the cassette body 202 along the guides 150, 350 in the rearward direction.

In certain implementations, the first and second ramped surfaces 272, 274 are defined by a cutout or aperture in the release handle 244. In the example shown in FIG. 28A, the first and second ramped surfaces 272, 274 are defined by a V-shaped groove. In other examples, the first and second ramped surface 272, 274 may be defined by a triangular aperture in the transition arrangement 270. In still other examples, the cutout or aperture may have any desired shape including the ramped surface 272, 274.

Figure 18:
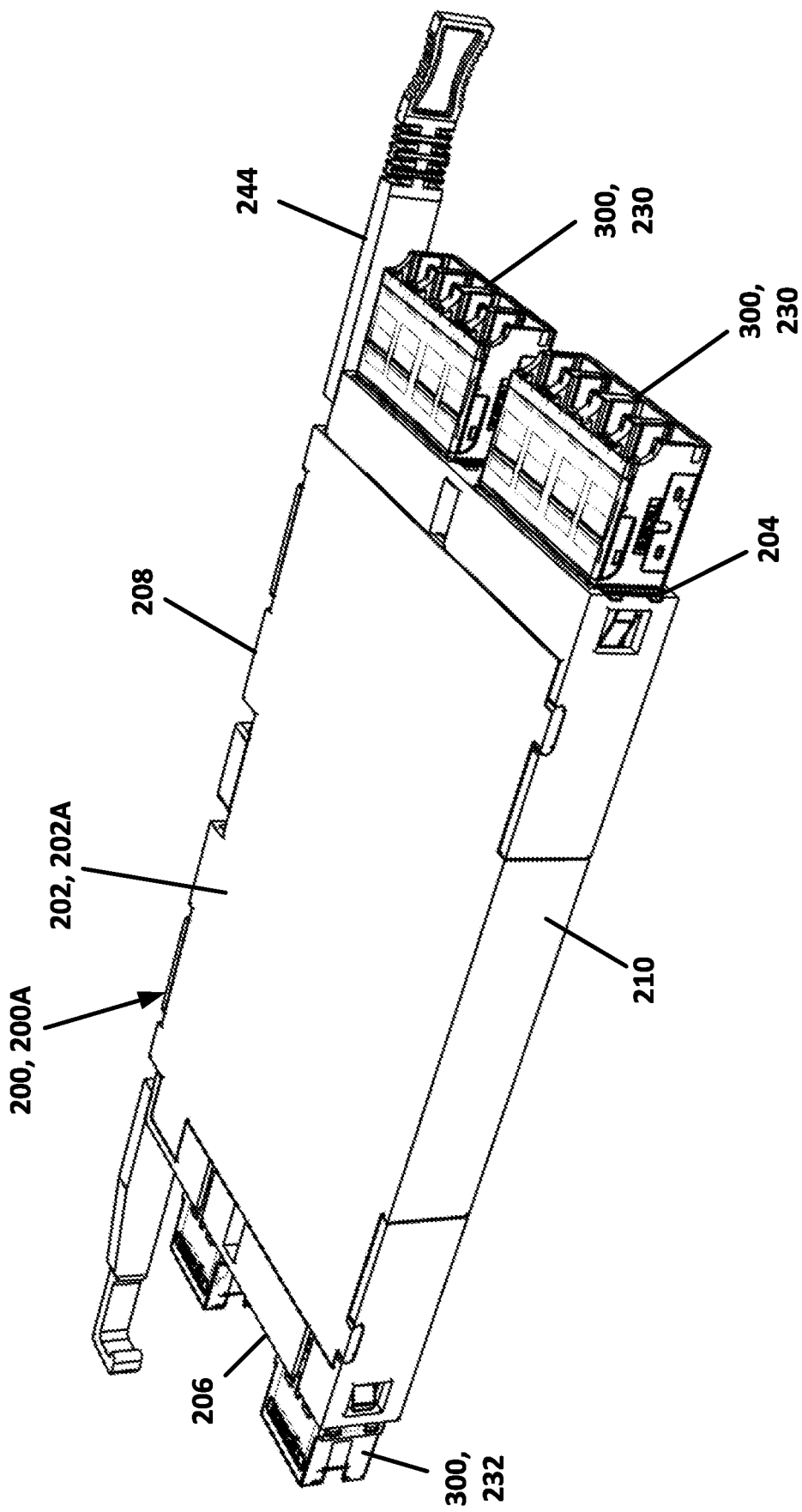
FIG. 18 is a front, second side perspective view of the first cassette of FIG. 17, the second side being opposite the first side.

The release handle 244 extends forwardly of the cassette body 202 so that the forward grip portion 276 is disposed forwardly of the front end 204 of the cassette 200 (e.g., see FIGS. 17 and 18). In certain implementations, the forward grip portion 276 is angled relative to a majority of the release handle 244 to facilitate grasping of the forward grip portion 276. In certain examples, the forward grip portion 276 may be angled along the lateral axis LA. In an example, the forward grip portion 276 is angled away from the first end 118 of the tray arrangement 110 to facilitate grasping the grip portion 276 without interference from the chassis 105 of any components mounted at the first end 118 of the tray arrangement 110.

In certain implementations, the forward grip portion 276 is configured to flex or deflect relative to a remainder of the release handle 244. In certain examples, the forward grip portion 276 may include a grip member 280 attached to a remainder of the release handle 244 by a flexible section 282. In certain examples, the flexible section 282 enables the grip member 280 to deflect along the width W2 of the cassette 200. This deflection ability facilitates grasping of the grip member 280 when the cassettes 200 are densely packed on the tray arrangement 110, especially when cables are routed to the front ports. In some examples, the flexible section 282 enables deflection of the grip member 280 along the height H2 of the cassette 200. In certain examples, the flexible section 282 enables a reduced amount of deflection along the height H2 compared to along the width W2. In other examples, the flexible section 282 inhibits deflection of the grip member 280 along the height H2 of the cassette 200.

In certain implementations, the handle 244 also includes a rearward grip portion 278. The release handle 244 extends rearwardly of the cassette body 202 so that the rearward grip portion 276 is disposed rearwardly of the rear end 206 of the cassette 200 (e.g., see FIGS. 17 and 18). In certain examples, the rearward grip portion 278 has a different shape than the forward grip portion 276. In certain examples, the rearward grip portion 278 is hook shaped. In certain examples, the rearward grip portion 278 is not deflectable relative to the transition arrangement 270.

Figure 32:
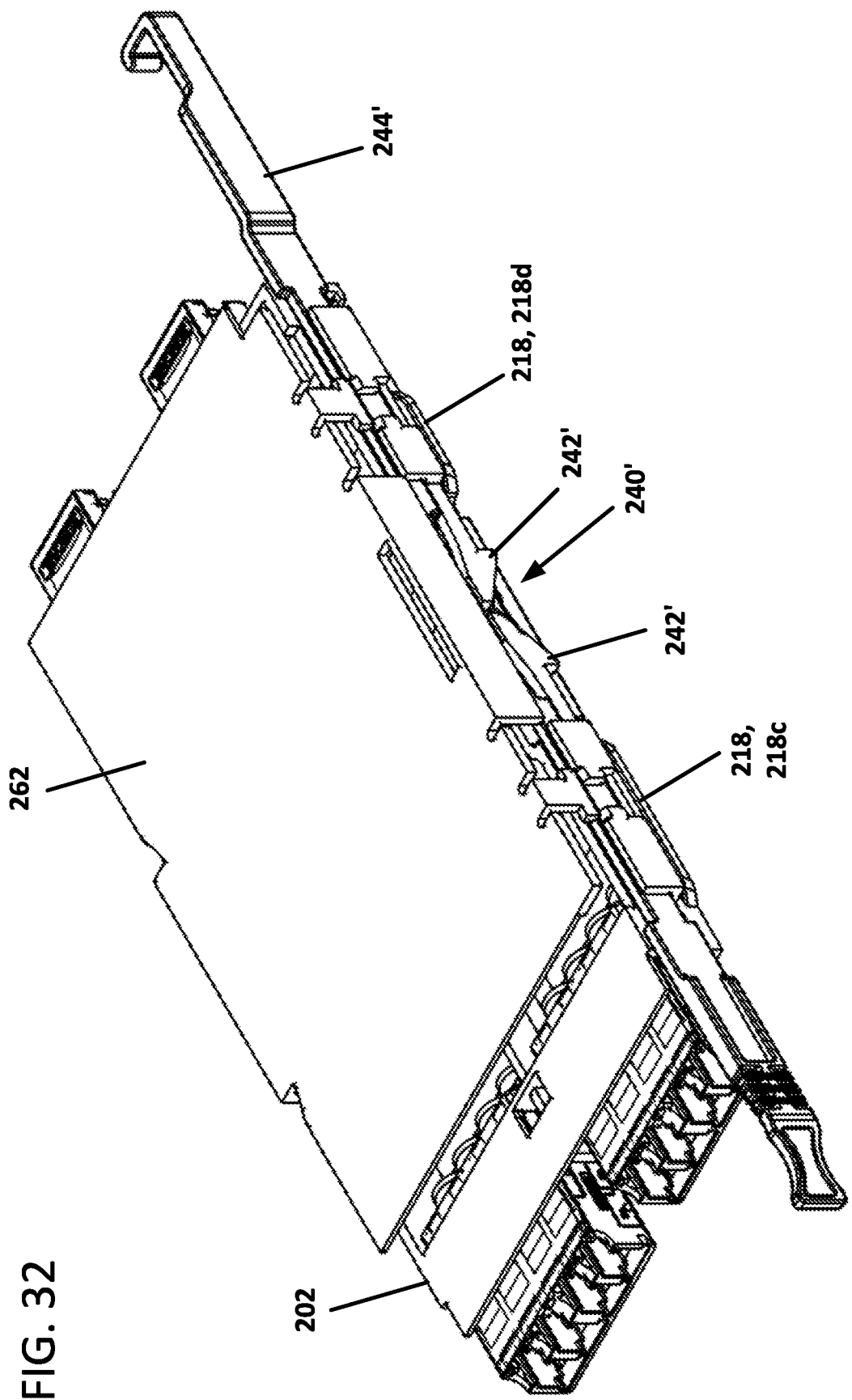
FIG. 32 is front perspective view of the first cassette of FIG. 17 having an alternative latching arrangement and alternative cover, the cover being raised relative to the cassette body sufficient to expose the alternative stop members.
Figure 33:
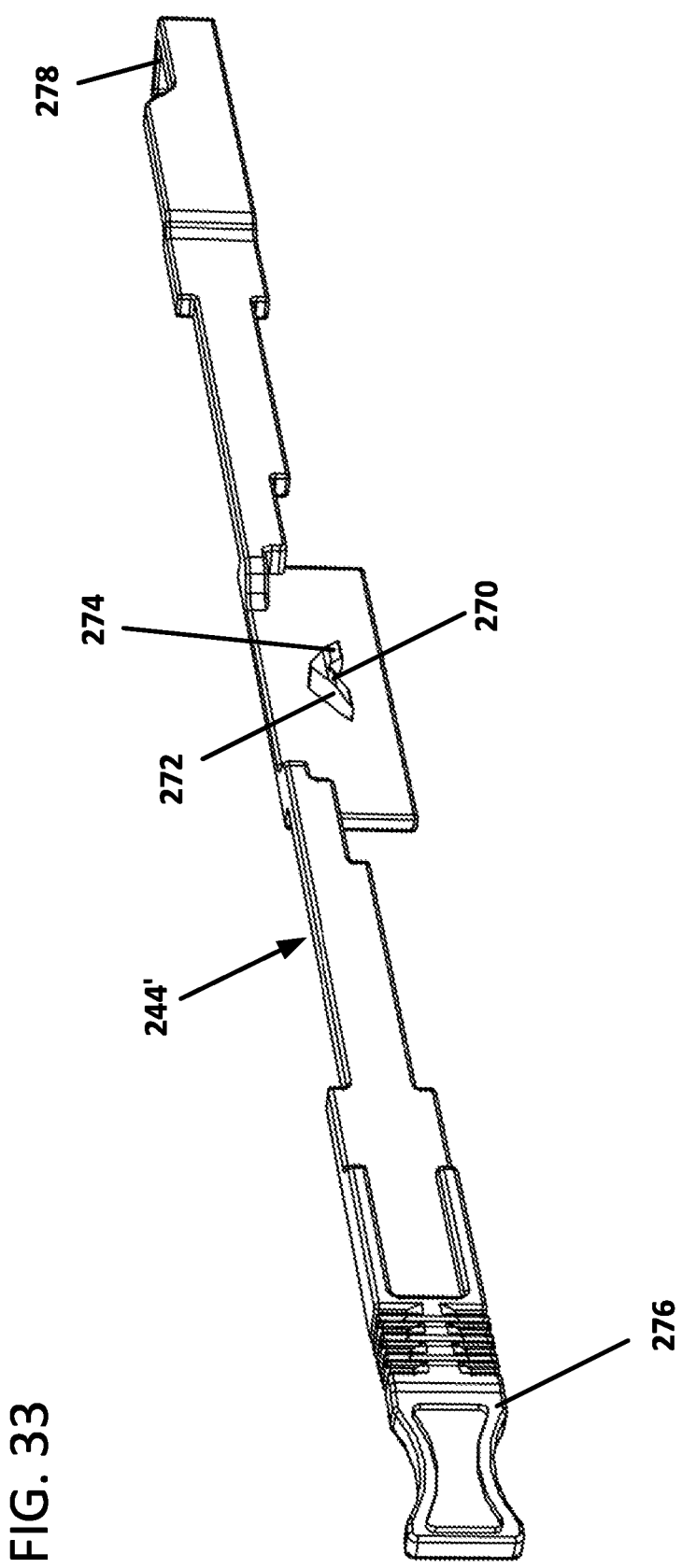
FIG. 33 is a perspective view of an alternative release handle for use with the alternative latching arrangement of FIG. 32.
Figure 34:
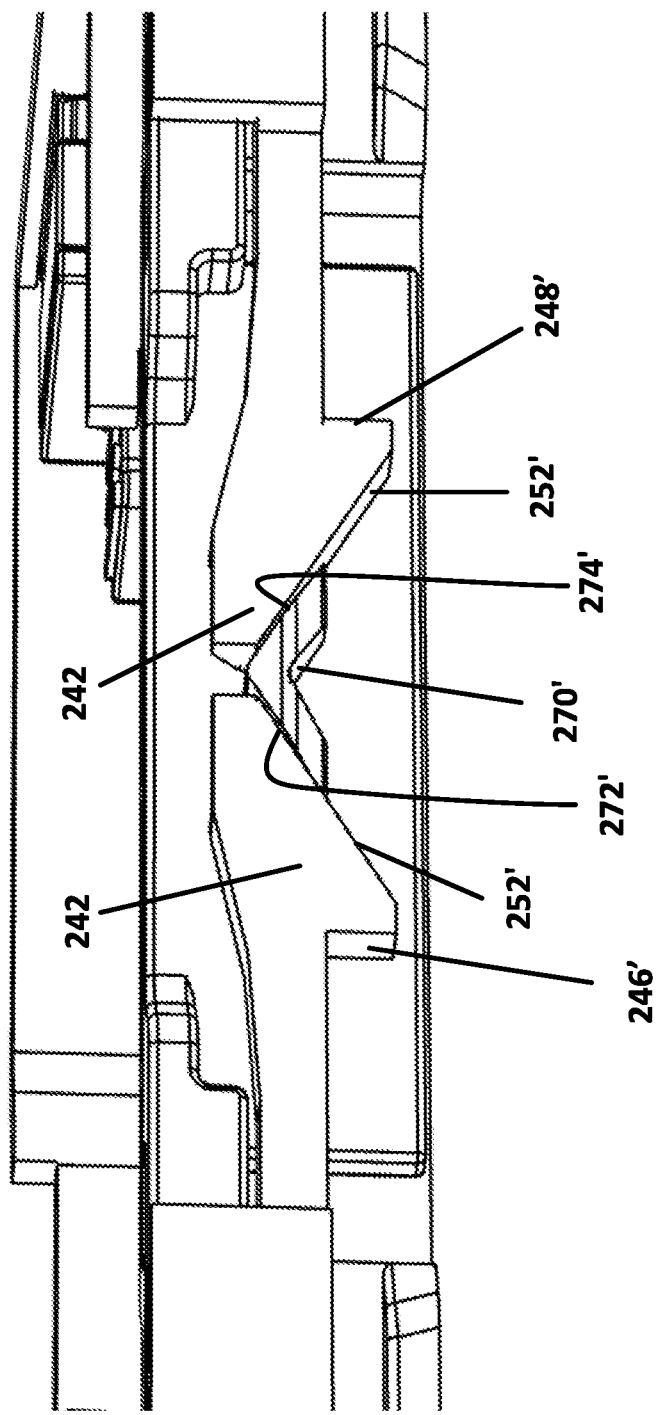
FIG. 34 is an enlarged view of the alternative latching arrangement of FIG. 32 showing the stop members resting on the camming member of the release handle when the release handle is disposed in the neutral position.
Figure 35:
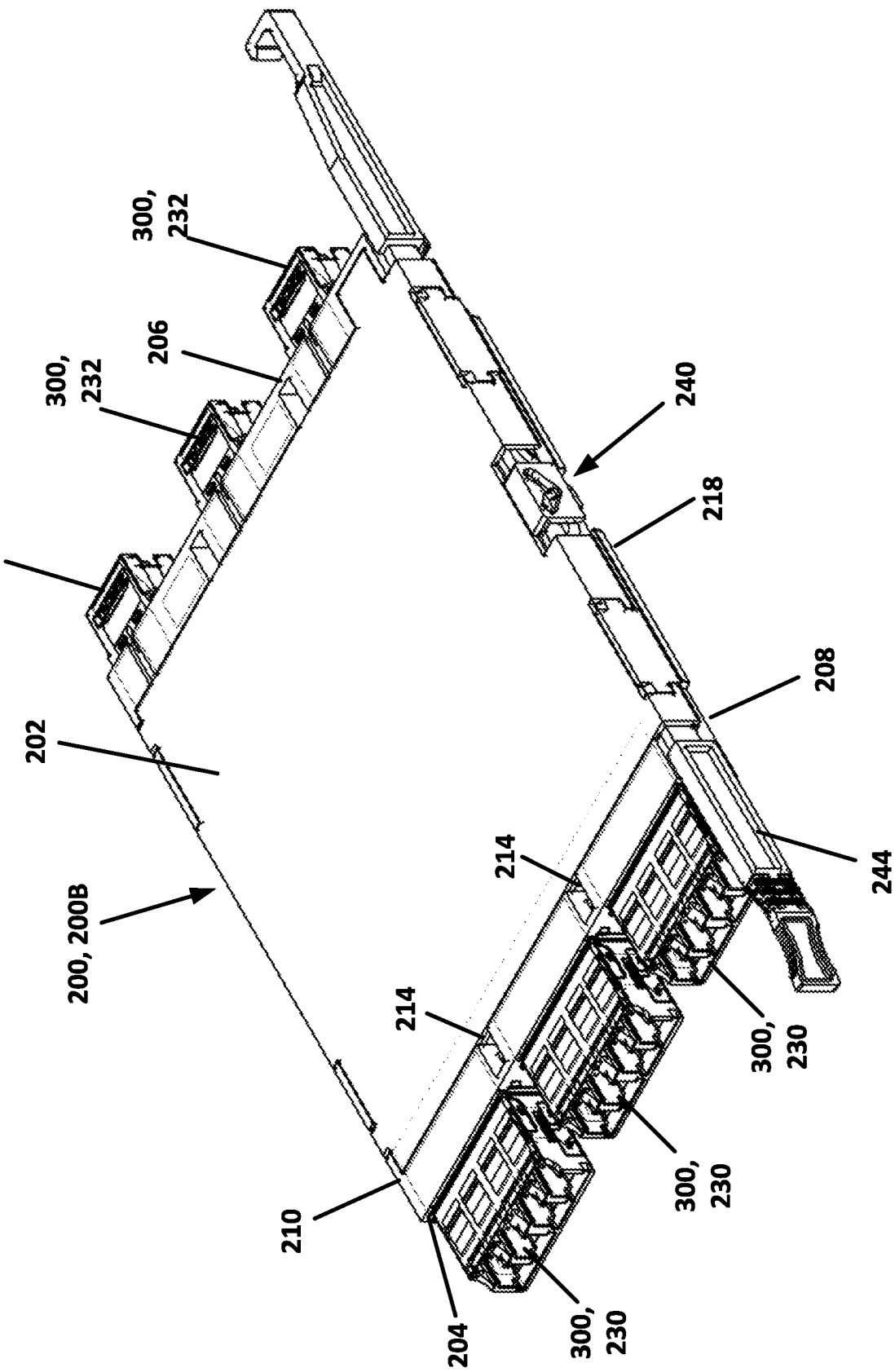
FIG. 35 is a front, first side perspective view of a second example cassette suitable for use with the tray arrangement of FIG. 2, the second cassette carrying three groups of front ports separated by intermediate regions at a front end of the second cassette.
Figure 36:
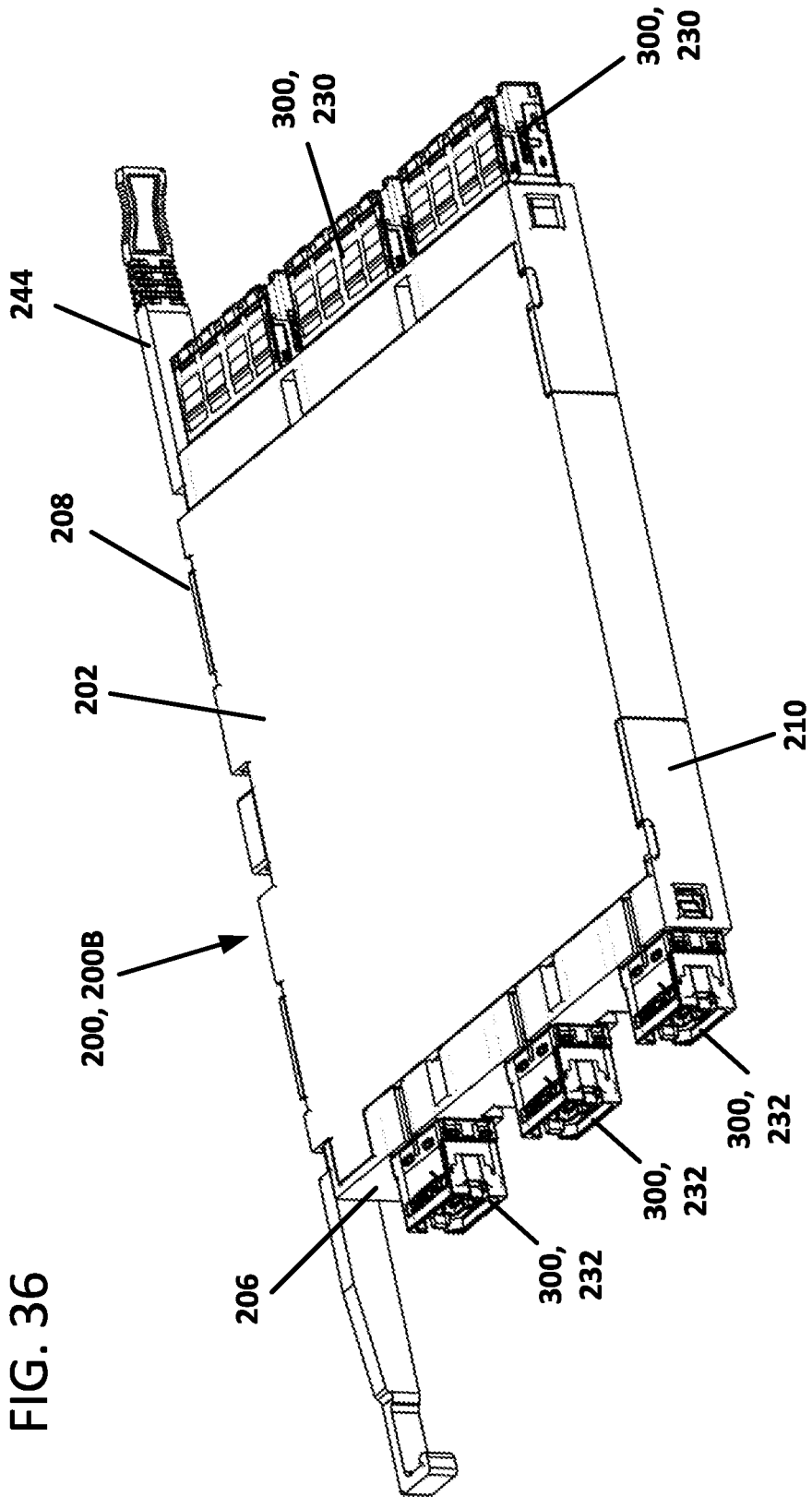
FIG. 36 is a front, second side perspective view of the second cassette of FIG. 35, the second side being opposite the first side.

FIGS. 32-34 illustrate an alternative latching arrangement 240' suitable for use in locking the cassette 200 to a guide 150, 350. The latching arrangement 240' includes first stop member 242'and second stop members 242' extending along the channel 268 at the first end 208 of the cassette body 202. The latching arrangement 240' also includes a release handle 244' that defines first and second ramped surfaces 272', 274' that transition the stop members 242' from lock positions to release positions.

Each stop member 242' includes a latching hook deflectable along the height H2 of the cassette body 202. The first stop member 242' extends rearwardly and defines a first engagement surface 246' facing in the forwardly direction and the second stop member 242' extends forwardly and defines a second engagement surface 248' facing in the rearward direction. When the stop members 242' align with the notch 166, 366 through the top 164, 364 of the guide 150, 350, the first engagement surface 246' abuts against the rearward-facing catch surface 170, 370 to inhibit movement of the cassette 200 relative to the guide 150, 350 in the forward direction. The second engagement surface 248' abuts against the forward-facing catch surface 168, 368 to inhibit movement of the cassette 200 relative to the guide 150, 350 in the rearward direction.

The release handle 244' includes a transition arrangement 270' that defines the first and second ramped surfaces 272', 274'. In the example shown, the transition arrangement 270' includes a protrusion extending outwardly from the release handle 244 away from the cassette body 202. In other implementations, the protrusion may extend from the release handle 244 towards the cassette body 202.

Each latching hook defines a camming surface 252' that seats on a respective one of the first and second ramped surfaces 272', 274'. In the example shown, the tips of the latching hooks seat on the ramped surfaces 272', 274'. When the release handle 244 is moved along the actuation axis A in the forward direction, the transition arrangement 270' moves towards the first latching hook so that the camming surface 252' of the first latching hook rides over the first ramped surface 272', thereby deflecting the first engagement surface 246' to the release position. As the cassette body 202 begins to move forwardly relative to the guide 150, 350, the camming surface 252' of the second latching hook rides over the rearward-facing catch surface 170, 370 of the guide 150, 350. Both latching hooks ride over the top 164, 364 of the guide 150, 350 in the release position as the cassette 200 is slid along the guide 150, 350.

Similarly, when the release handle 244 is moved along the actuation axis A in the rearward direction, the transition arrangement 270' moves towards the second latching hook so that the camming surface 252' of the second latching hook rides over the second ramped surface 274', thereby deflecting the second engagement surface 248' to the release position. As the cassette body 202 begins to move rearwardly relative to the guide 150, 350, the camming surface 252' of the first latching hook rides over the forward-facing catch surface 168 of the guide 150, 350. Both latching hooks ride over the top 164, 364 of the guide 150 in the release position as the cassette 200 is slid along the guide 150, 350.

Figure 47:
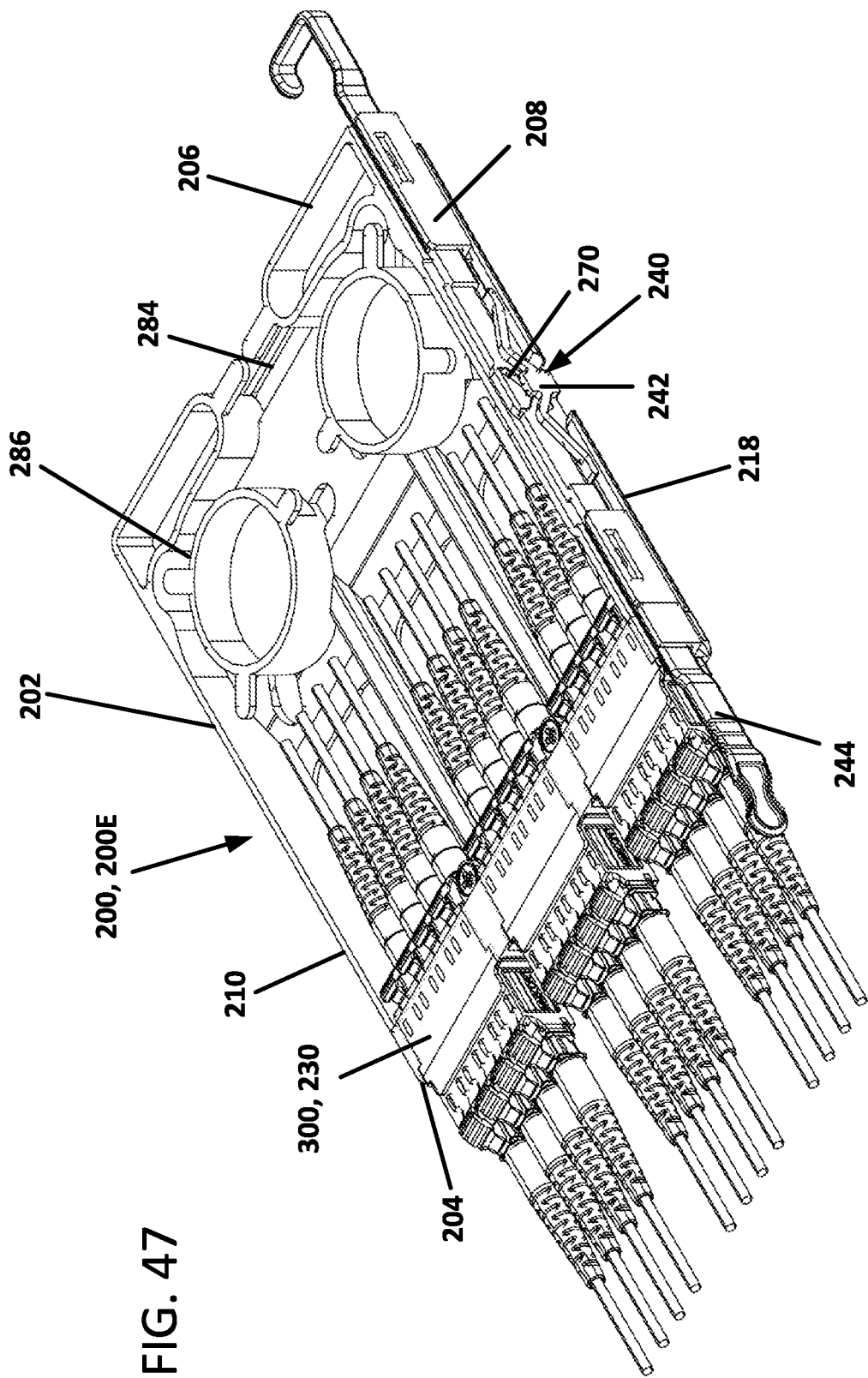
FIG. 47 is a perspective view of a fifth example cassette configured to connect a like number of front and rear plug connectors, the fifth cassette being shown with an open top.
Figure 59:
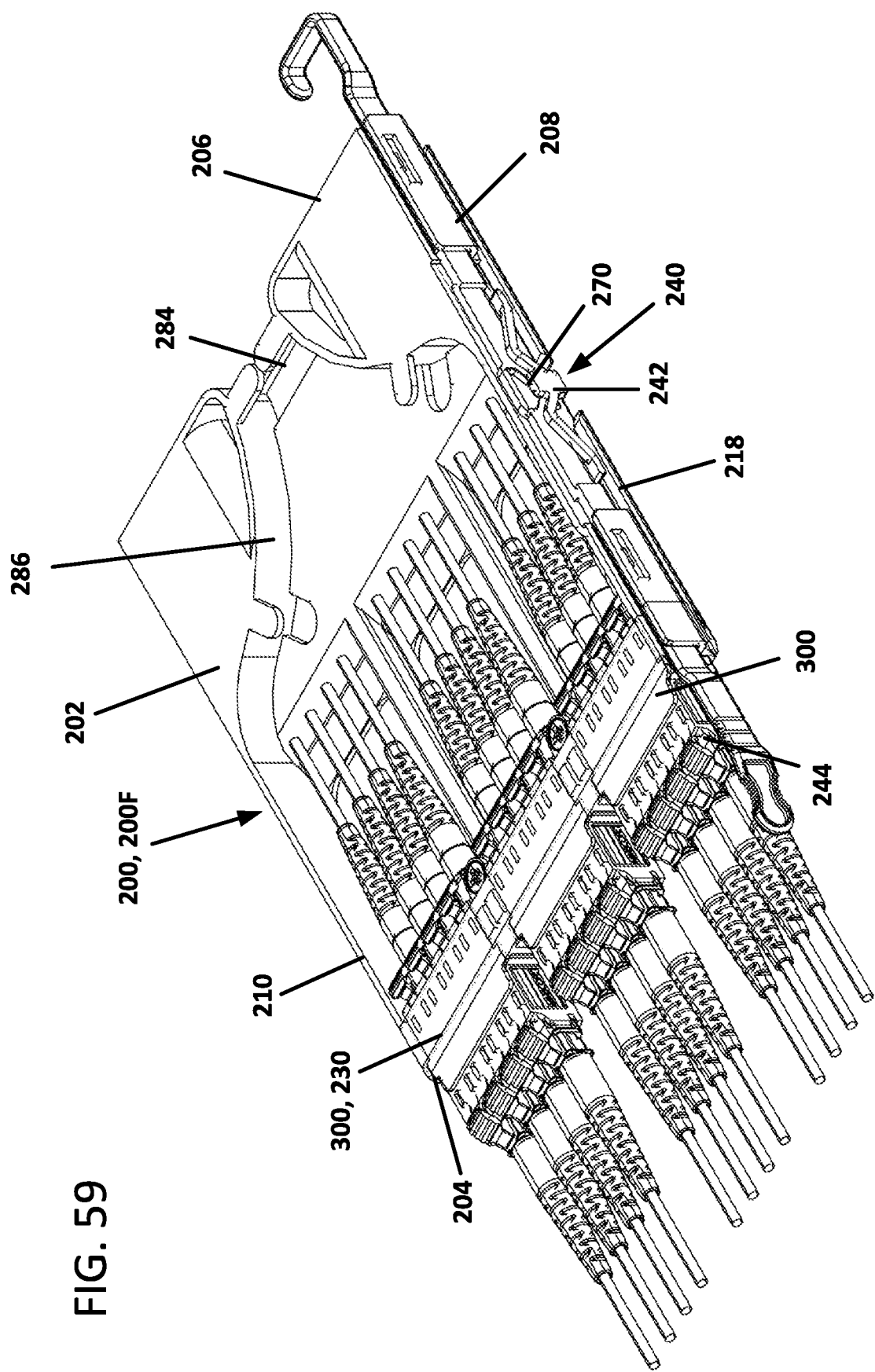
FIG. 59 is a perspective view of a sixth example cassette configured to connect a like number of front and rear plug connectors, the sixth cassette being shown with an open top.
Figure 60:
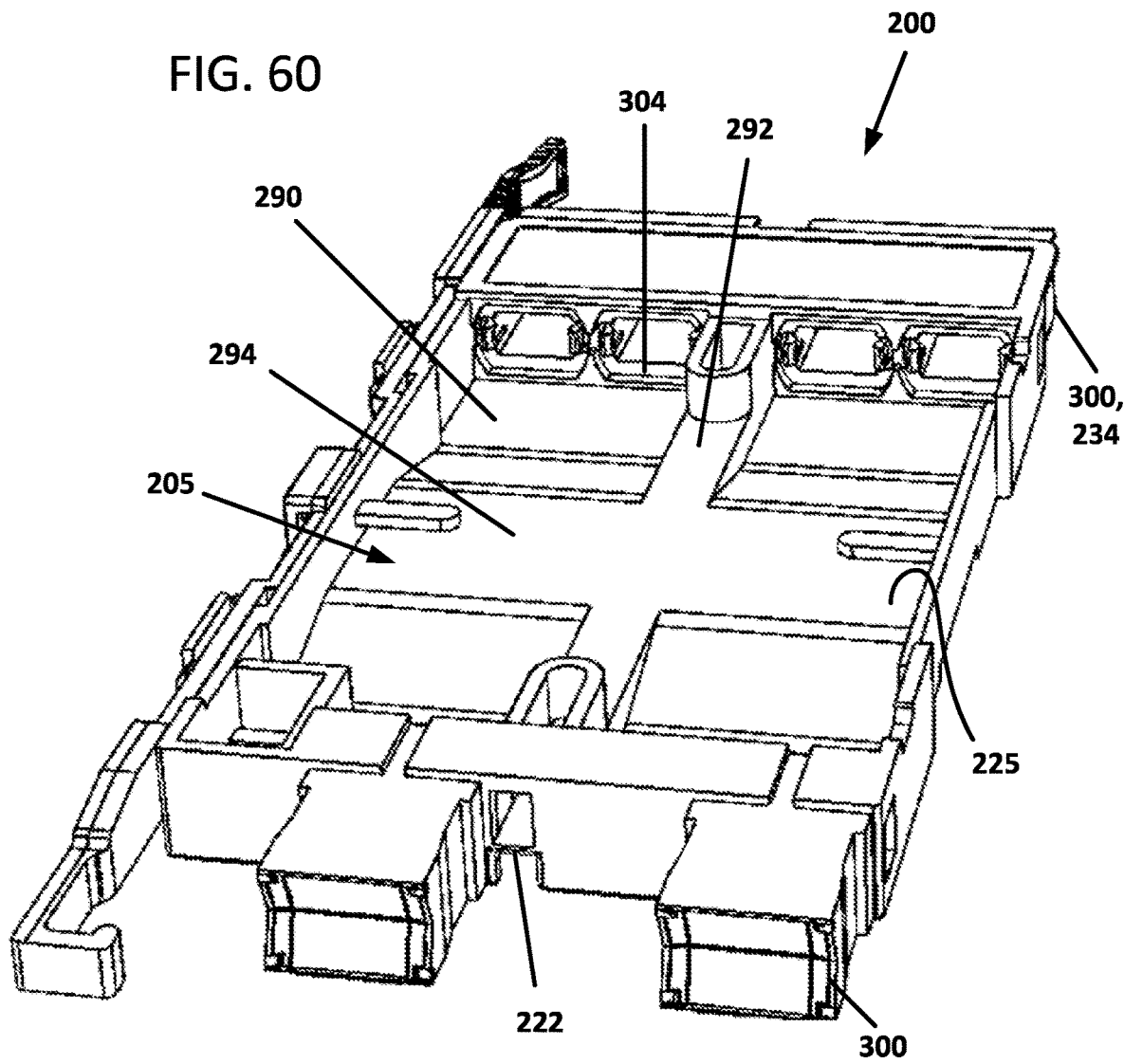
FIG. 60 is a top perspective view of an example cassette having the cover removed for ease in viewing an interior of the cassette.
Figure 61:
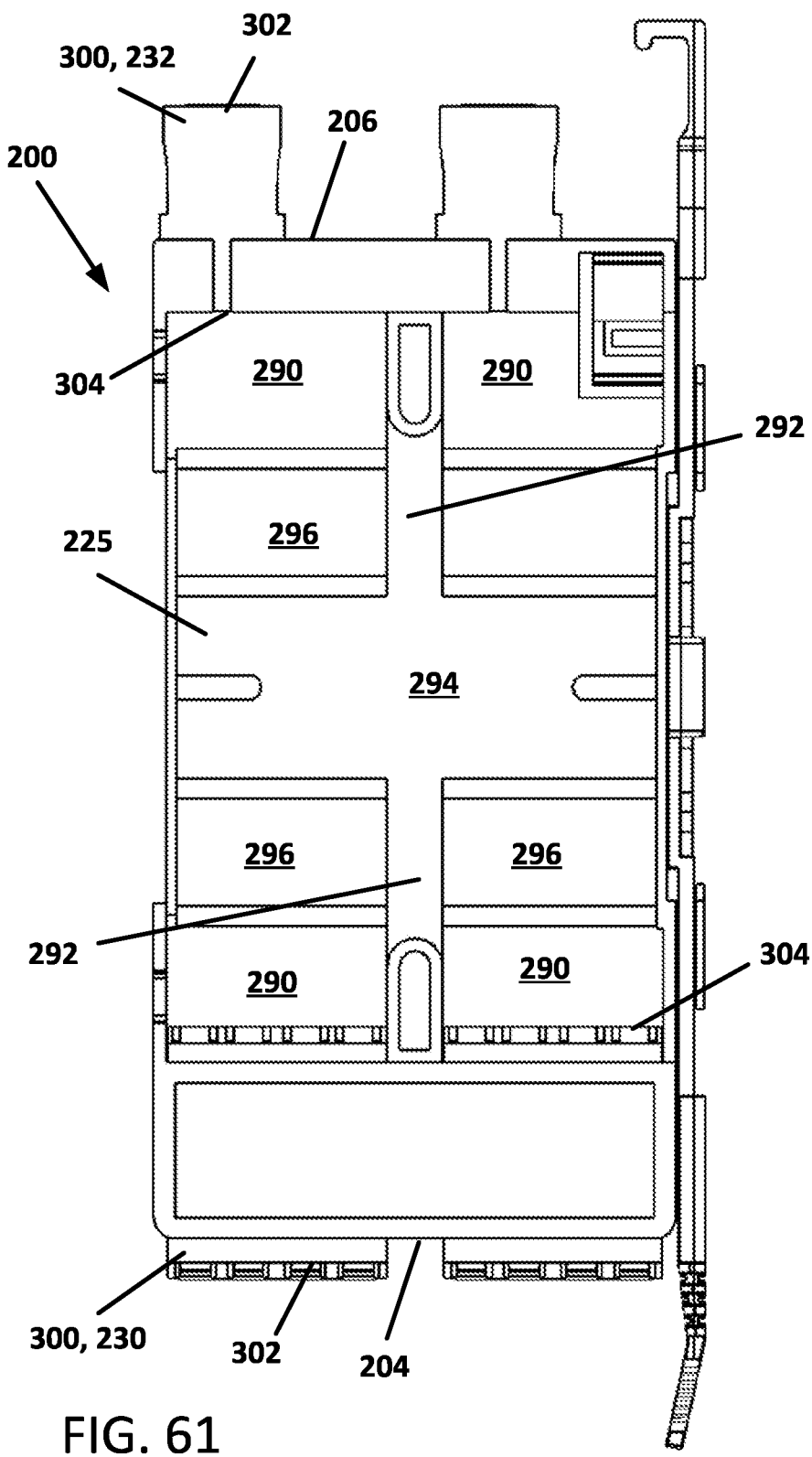
FIG. 61 is a top plan view of the cassette of FIG. 60.
Figure 62:
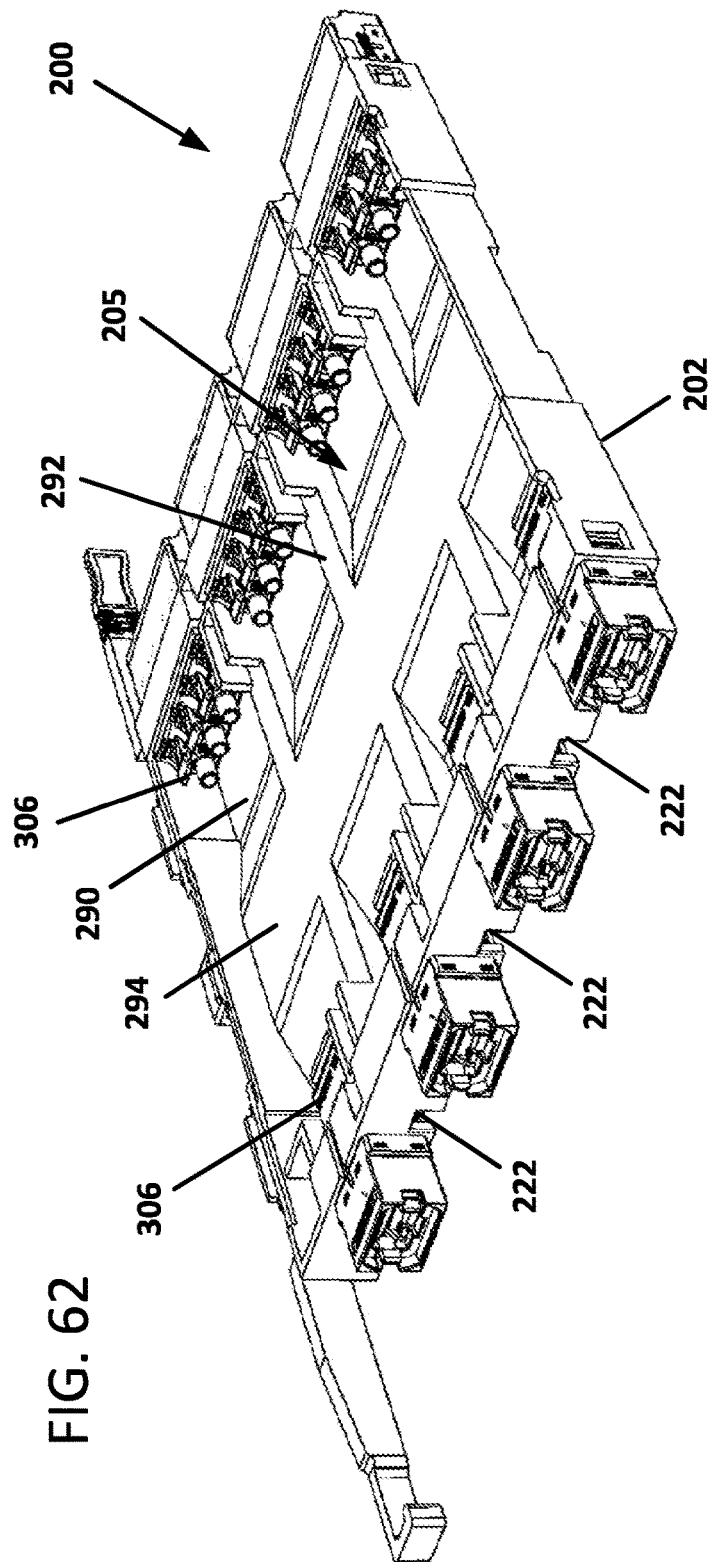
FIG. 62 is a top perspective view of another example cassette having the cover removed for ease in viewing an interior of the cassette.
Figure 63:
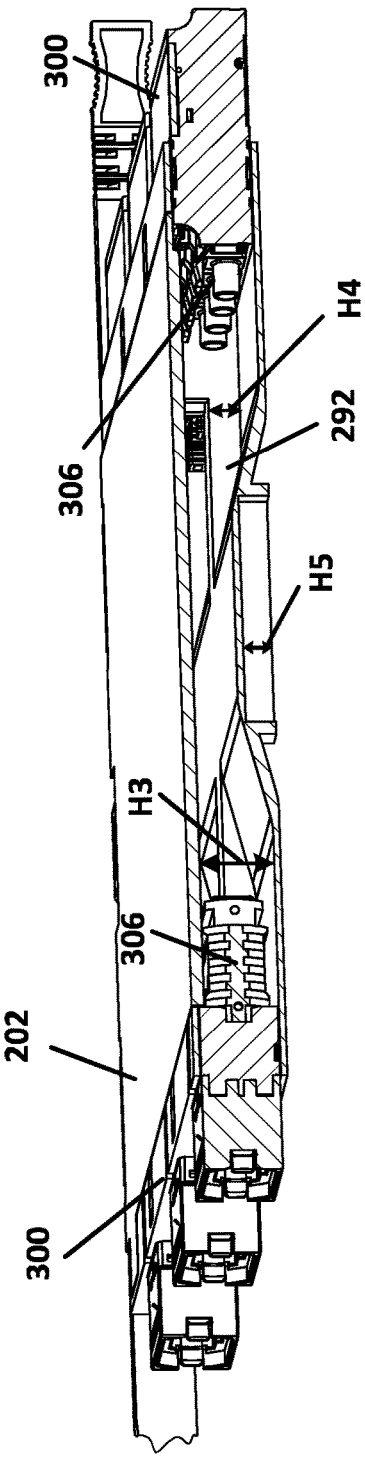
FIG. 63 is a longitudinal cross-sectional view of the cassette of FIG. 62 including the cover.

Referring to the figures in general, some implementations of a cassette 200 are configured to receive a like number of plug connectors from the front and from the rear. Such cassettes 200 carry port members 300 (e.g., optical adapters) only at the front end 204 of the cassette body 202. Examples of such cassettes 200 are shown in FIG. 47 as cassette 200E, in FIG. 59 as cassette 200F, and in FIGS. 97-98 as cassette 200j. The rear end 206 of the cassette body 202 defines a fiber port or cable port 284 through which fibers or one or more cables may extend into the cassette 200E, 200F, 200j. In some examples, the fiber port or cable port 284 is disposed at a center of the rear end 206 of the cassette 200 (e.g., see FIGS. 47 and 59). In other examples, the fiber port or cable port 284 is offset along the rear end 206 towards one side of the cassette body 202 (e.g., see FIG. 97). The cassette 200E, 200F, 200j may carry fiber management members 286 (e.g., a spool, a bend radius limiter, a retention finger, etc.) to facilitate routing fibers or cables between the front port members 300 and the rear port 284. The cassette 200E of FIG. 47 includes a spool about which excess length of the fibers can be stored. The cassette 200F of FIG. 59 is not configured to store excess length of the fibers. The cassette 200j of FIGS. 97 and 98 defines apertures 203 through the floor 225 in alignment with the front port members 300. In certain examples, the cassette 200j still includes an elongate section 292 protruding into the cassette interior 205 to define the bottom channel 222.

Connectorized ends of the fibers or cables routed into the cassette 200 can be plugged into rear ports 304 defined by the forward port members 300. For example, a plurality of connectorized optical fibers can be plugged into rear ports of LC optical adapters 230 disposed at the front end 204 of the cassette 200 to mate with connectorized optical fibers plugged into front ports of the LC optical adapters 230. In another example, a connectorized end of a multi-fiber cable can be plugged into a rear port of an MPO optical adapter disposed at the front end 204 of the cassette to mate with an MPO plug connector received at the front port.

In some implementations, cassettes 200 connecting like numbers of plug connectors include a cover 262. For example, a stub length of fibers or cable may be pre-terminated at the rear ports 304 of the front port members 300 and then routed out of the cassette 200 through the fiber or cable port 284. In such examples, access to the rear ports 304 of the front port members 300 is not needed. The opposite end of the stub can be unterminated to facilitate splicing to one or more network cables. In other implementations, cassettes 200 connecting like numbers of plug connectors may have an open top that does not receive a cover (e.g., FIG. 47). The open top may facilitate access to the rear ports 304 of the front port members 300 when stub fibers are not included with the cassette 200. Rather, terminated ends of the network cables are routed directly to the front port members.

In other implementations, the cassettes 200 are configured to connect unlike numbers of plug connectors. For example, a cassette 200 may carry one or more port members 300 (e.g., single MPO adapters 232) at the rear end 206 of the cassette body 202. Media segments (e.g., optical fibers) extend between the rear port members and the front port members to form connections therebetween. In some implementations, the rear port members include multi-fiber optical adapters (e.g., MPO adapters) and the front port members include single-fiber optical adapters (e.g., LC adapters). In other implementations, the cassette 200 is configured to receive higher fiber count cables at the rear than at the front. For example, a twenty-four fiber MPO plug connector received at the rear end 206 of the cassette 200 may connect through the cassette 200 to three eight-fiber MPO plug connectors at the front, to twenty-four single-fiber LC plug connectors at the front, or to twelve dual-fiber SN plug connectors at the front.

In certain implementations, the cassette body 202 defines one or more rear apertures 216 at the rear end 206 at which to receive the rear port members. In certain examples, each rear aperture 216 is configured to hold one or more multi-fiber optical adapters. In certain examples, each of the rear apertures 216 has a footprint sized to one standardized port. For example, each rear aperture 216 may receive an MPO optical adapter. In certain examples, the rear apertures 216 are sized smaller than the front apertures 212. In an example, each cassette 200 has a single rear aperture 216. In another example, each cassette 200 has two rear apertures 216. In another example, each cassette 200 has three rear apertures 216. In certain examples, each rear aperture 216 is sized to hold one standardized port. In certain implementations, a punch-out cover may be initially provided at each of the rear apertures 216 so a respective optical adapter is mounted at fewer than all of the rear apertures 216. In such cases, a user has the flexibility to select a position for a rear optical adapter to facilitate cable routing.

Referring now to FIGS. 60-63, the interior 205 of certain types of cassette 200 is configured to accommodate the bottom channel 222 extending between the front 204 and rear 206 of the cassette body 202. The cassette interior 205 also provides access to interior ports 304 of port members 300 carried at the front 204 and/or rear 206 of the cassette body 202. In certain implementations, the plug connectors 306 (e.g., optical fibers connectors, electrical connectors, hybrid connectors, etc.) are received in any of the interior ports 304 (e.g., see FIG. 62). Media segments terminated by the plug connectors 306 can be routed along the width W2 of the cassette 200 without obstruction by the bottom channel 222.

In certain implementations, the front 204 and/or rear 206 of the cassette body 202 has sufficient height H3 between a floor 225 and a top of the cassette body 202 to enable mounting of one or more port members 300 and to enable insertion of plug connectors 306 into interior ports 304 of the port members 300. For example, the floor 225 of the cassette body 202 defines first regions 290 at the interior ports 304 of the port members 300.

To define the bottom channel 222, the cassette body 202 includes an elongate section 292 protruding into the cassette interior 205 and extending between the front 204 and the rear 206 of the cassette body 204. The bottom channel 222 is defined along the elongate section 292. The elongate section protrudes into the cassette interior at a height H4 above the first regions 290 of the floor 225.

In certain implementations, the floor 225 of the cassette body 202 also has a second section 294 intermediate the front 204 and rear 206 of the cassette 200. Each second floor section 294 is aligned with one of the first floor sections 290. Each second floor section 294 is raised relative to the first section 290. For example, the second floor section 294 may be raised above the first floor section 290 by a height H5. In certain examples, the height H5 is at least as tall as the height H4. In certain examples, the height H5 is no more tall than the height H4. In certain examples, the height H5 is the same as the height H4. In certain examples, the second floor section 294 and the elongate sections 292 cooperate to define a raised intermediate surface that extends fully across the width of the interior 205 of the cassette 200.

In certain examples, the floor 225 transitions between the first and second floor sections 290, 294 via ramped floor sections 296. In other examples, the transitional sections 296 may be contoured or otherwise transition between the first and second floor sections 290, 294. Media segments (e.g., optical fibers, electrical conductors, hybrid cables, etc.) extending inwardly from the interior ports 304 of the port members 300 can be routed from the first floor sections 290, over the transitional sections 296, to the raised sections 294. At the raised section, the media segments can be routed along the width of the cassette over the raised section 294 without being obstructed by the elongate section 292.

In certain implementations, the cassette 200 defines multiple bottom channels 222. In such implementations, multiple elongate sections 292 protrude into the cassette interior 205 at spaced intervals along the width (e.g., see FIG. 62). The second floor section 294 may extend along the width of the cassette 200 to connect all of the elongate sections 292 to form a combined raised surface over which media segments can be routed. Accordingly, a media segment having a first end received at the interior port 304 of a rear port member 300 at a first side of the cassette body 202 can have a second end received at the interior port 304 of a front port member 300 at a second side or middle of the cassette body 202 without routing the media segment over a sharp corner.

In certain implementations, the elongate section(s) 292 within the cassette interior 205 define lanes extending between respective front and rear port members 300. Each lane has first floor sections 290 at the front and rear port members 300 and a second floor section 294 therebetween. Each elongate section 292 separates adjacent ones of the first floor sections 290. In certain examples, the second floor sections 294 are continuous with each other to facilitate routing of media segments amongst the lanes.

In certain implementations, the bottom of the cassette body 202 is contoured to define one or more recesses 298 at intermediate locations between the front 204 and rear 206 of the cassette 200. In certain examples, the recesses 298 align with the raised second floor sections 294. In the example shown in FIG. 64, the recess 298 contours upwardly to follows the transition sections 296 and the raised second floor section 294 within the cassette 200.

FIGS. 66-71 illustrate another example implementation 200G of a cassette 200 suitable for use with the tray arrangement 120. The cassette 200G is a splice cassette defining a splice region 380 at which a splice holder 390, 394 can be mounted, The splice cassette 200G defines a cable entrance 388 at the rear 204 and holds a plurality of port members 300 at the front 202. In certain examples, the cable entrance 388 defines apertures 392 or structures at which one or more cable ties (e.g., zip ties, hook-and-loop straps, etc.) can be mounted to secure one or more cables. In the example shown, each of the port members 300 includes an optical adapter 236 configured to receive four SN plug connectors in a horizontal configuration. Other types of port members 300 are possible.

Figure 68:
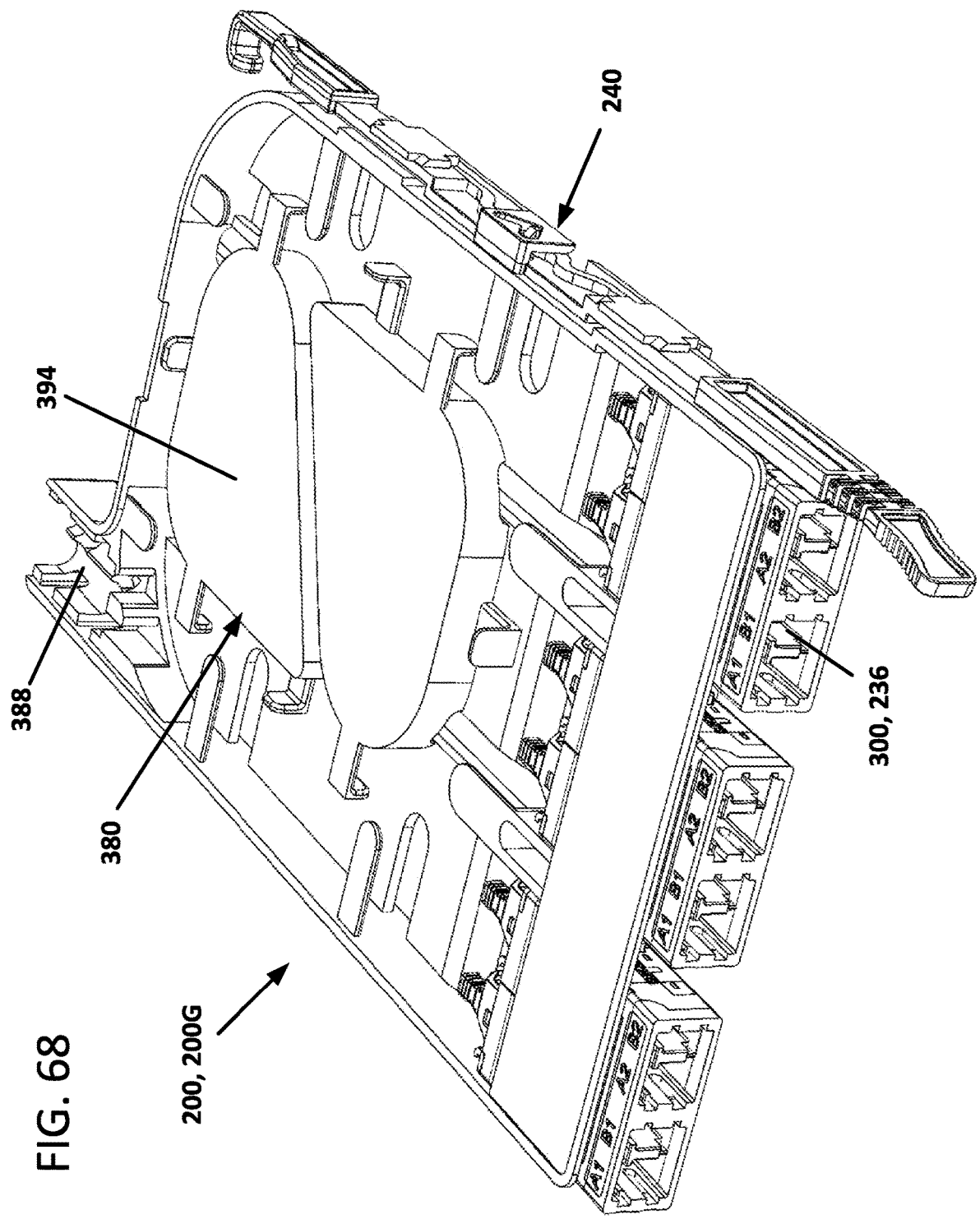
FIG. 68 is a top plan view of another example splice cassette configured in accordance with the principles of the present disclosure, the splice cassette including a second type of splice holder disposed at a splice region of the cassette.
Figure 69:
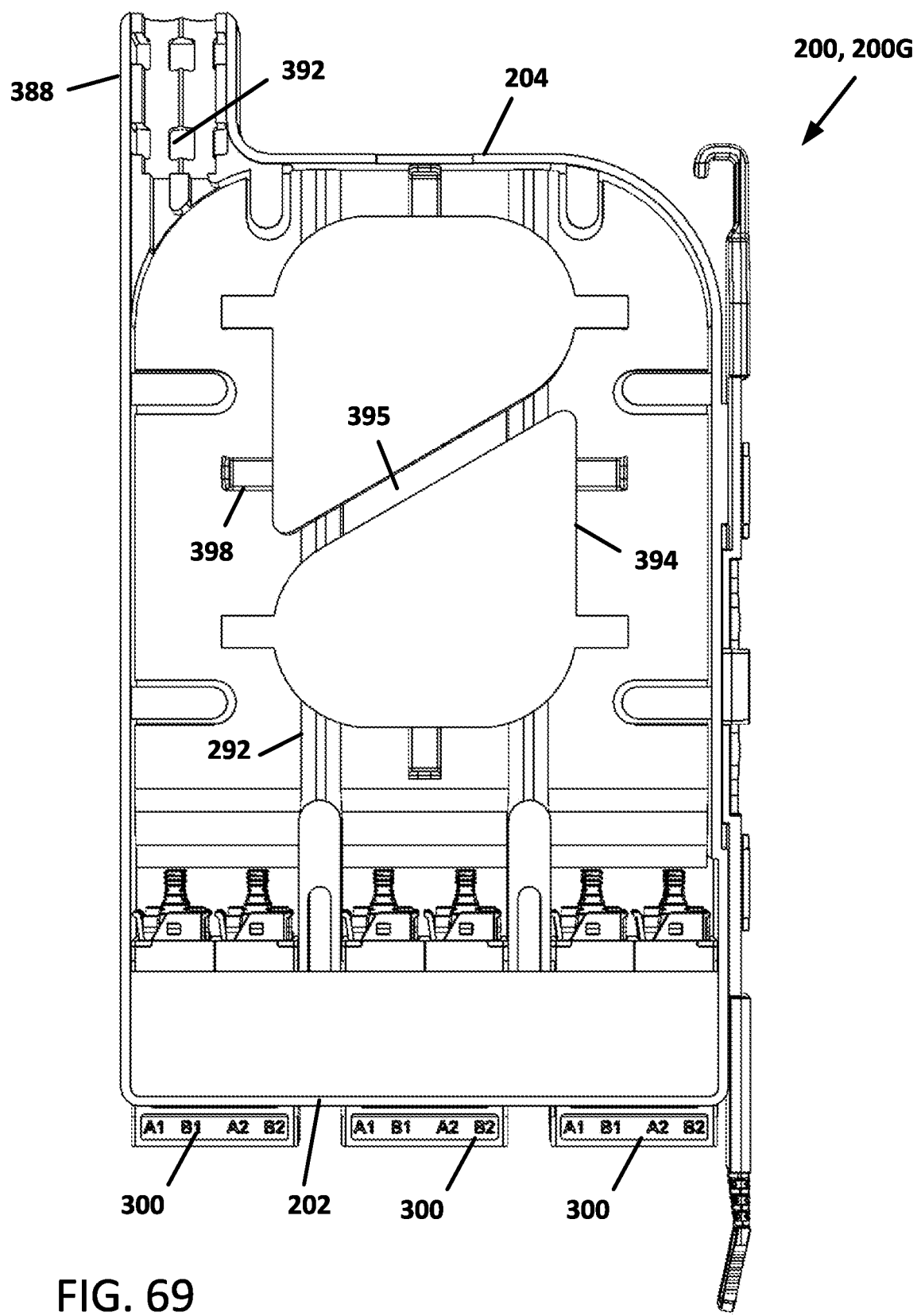
FIG. 69 is a top plan view of the splice cassette of FIG. 68.
Figure 70:
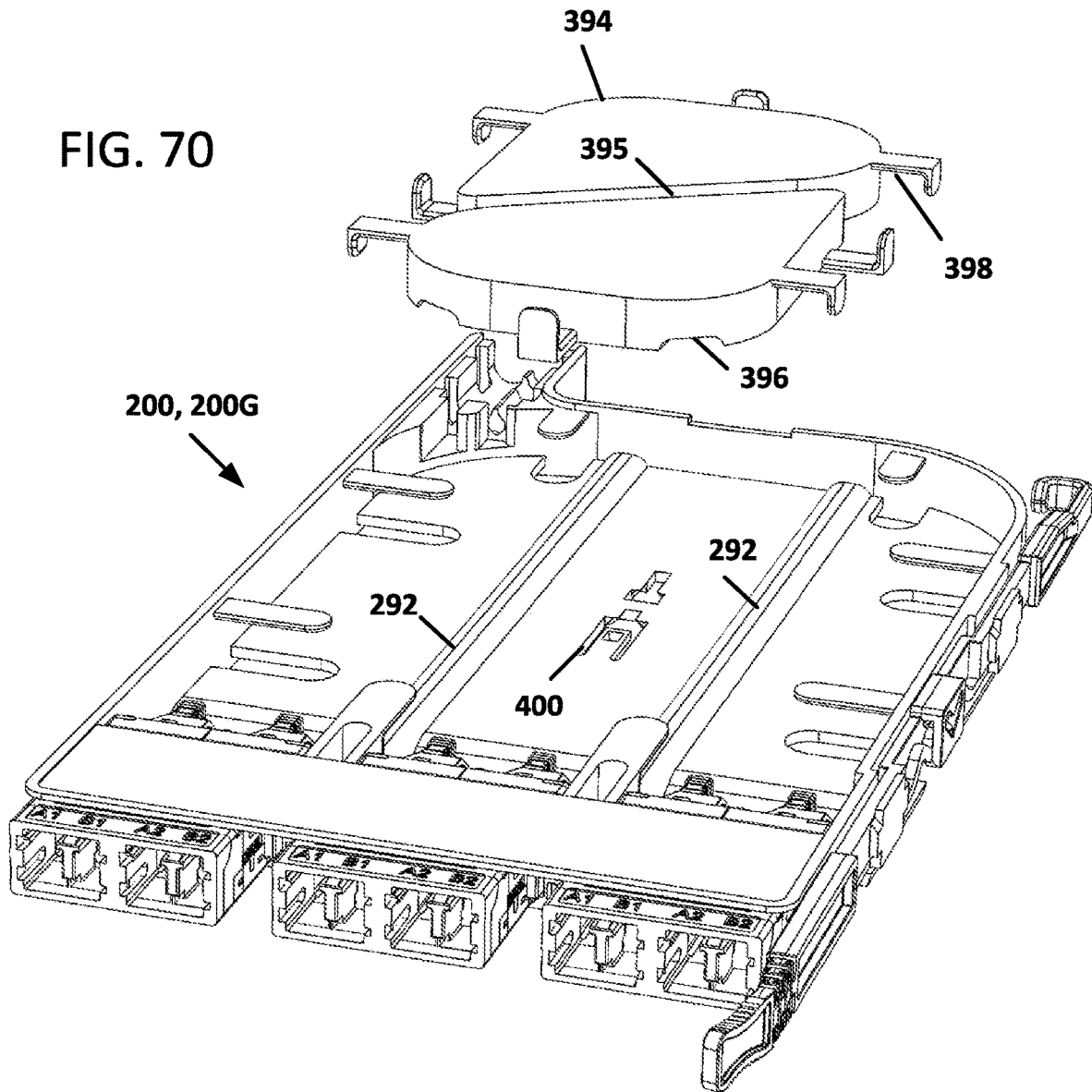
FIG. 70 is a top perspective view of the splice cassette of FIG. 68 with the splice holder exploded upwardly from the cassette.
Figure 71:
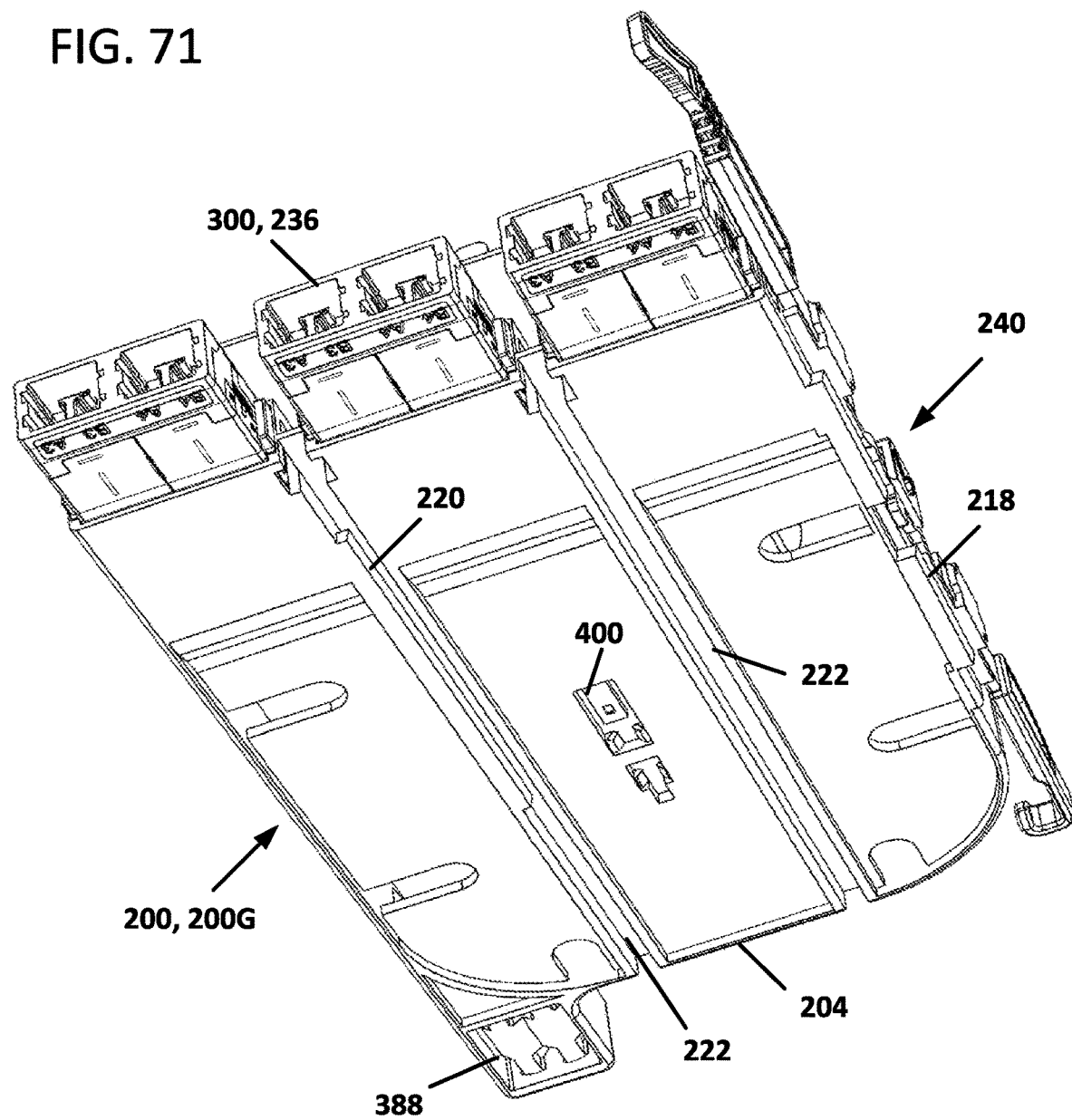
FIG. 71 is a bottom perspective view of a cassette body suitable for use with the splice cassette of FIG. 68 and with the splice cassette of FIG. 66.

In some implementations, a first type of splice holder 390 can be mounted at the splice region 380 (e.g., see FIGS. 66 and 67) and in other implementations, a second type of splice holder 394 can be mounted at the splice region 380 (e.g., see FIGS. 68-70). The first type of splice holder 390 is configured to hold multiple splice protectors for single-fiber splices (i.e., a splice between two single fibers). The second type of splice holder 394 defines a channel 395 configured to hold a splice protector for a multi-fiber splice (e.g., a mass-fusion splice). In certain examples, the second type of splice holder 394 defines has a perimeter configured to provide bend radius limit protection to fibers wrapped there around. In certain examples, the second type of splice holder 394 includes retention fingers 398 extending outwardly from the perimeter to guide fibers around the perimeter.

In certain implementations, an intermediate section of the floor 225 of the cassette 200G is lower compared to the floor 225 of non-splice cassettes (e.g., adapter packs, conversion cassettes, etc.) to accommodate the splice holders 390, 394. Accordingly, in certain examples, the elongate sections 292 protrude above the floor 225 along a full length of the cassette 200G from the front 202 to the rear 204 to define regions 382, 384, 386 of the floor 225. In some implementations, the splice holder 390 is configured to fit in a single region 384 of the floor 225 between two of the elongate sections 292. In other implementations, the splice holder 394 defines grooves 396 allowing the splice holder 394 to extend over the elongate sections 292.

In certain implementations, the cassette 200G includes a mounting structure 400 disposed at the floor 225. The mounting structure 400 is configured to retain the splice holder 390, 394. In certain examples, the mounting structure 400 includes a T-shaped aperture and a deflectable latch finger. Other configurations are possible. The mounting structure 400 enables the cassette 200G to be customized for the type of splice(s) to be retained within the cassette 200G.

Figure 72:
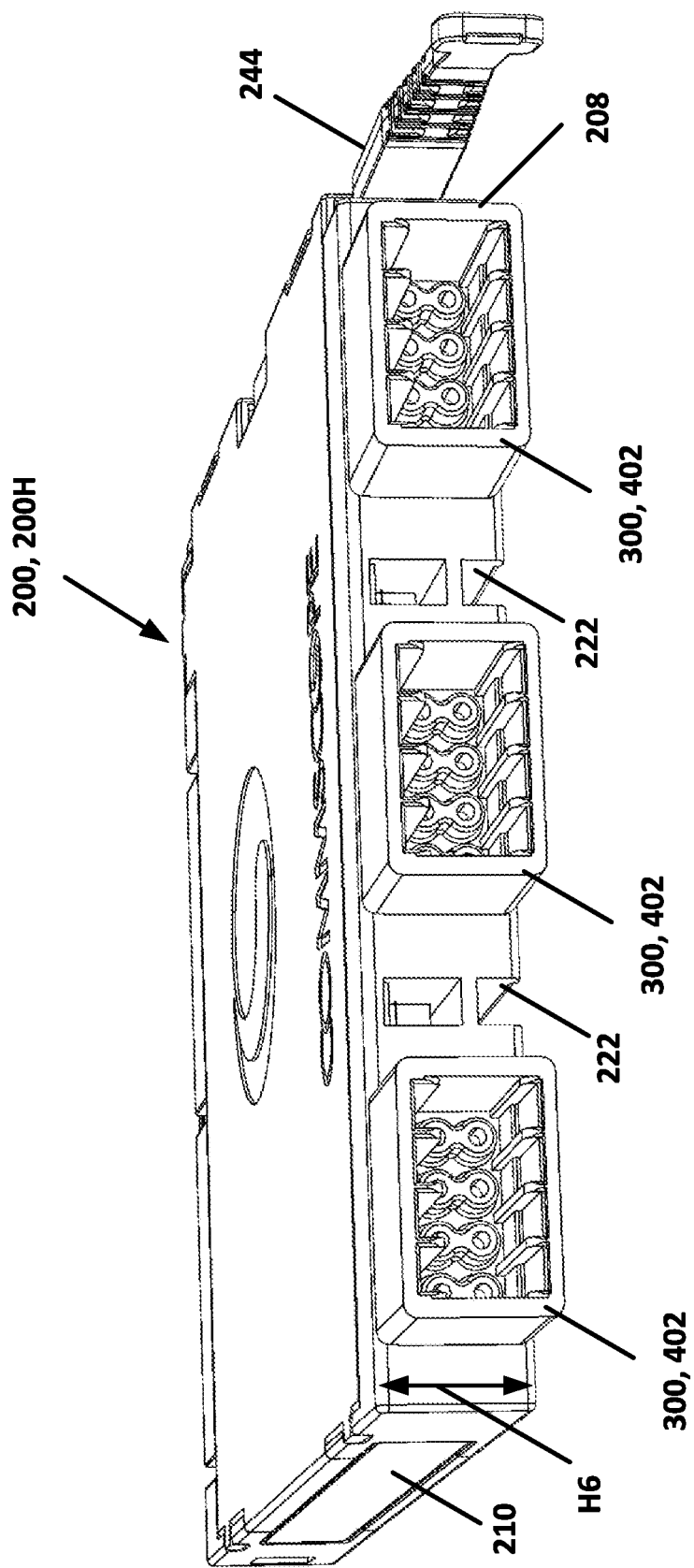
FIG. 72 is a top perspective view of an example cassette configured in accordance with the principles of the present disclosure, the cassette carrying port members configured to receive VSFF type plug connectors in a vertical orientation.

FIG. 72 shows another example implementation 200H of a cassette 200 suitable for mounting to the tray arrangement 120. The cassette 200H carries another implementation 402 of port members 300. The port members 402 are configured to receive very small form factor (VSFF) plug connectors (e.g., SN plug connectors, MDC plug connectors, etc.) in a vertical orientation. In certain implementations, the cassette 200H has a height H6 that is sufficiently tall to accommodate the height of the vertically oriented VSFF port members 402. In certain examples, the height H6 is between 11 mm and 13 mm tall. In certain examples, the height H6 is between 11.5 mm and 12.5 mm tall. In an example, the height is 12 mm tall.

In certain implementations, a single VSFF port member 402 is disposed between adjacent bottom channels 222 or between a bottom channel 222 and a side 208, 210 of the cassette 200H. In certain implementations, the bottom channels 222 of the cassette 200H have a common spacing or pitch P1 with the bottom channels 222 of the previously described cassettes 200A-200G (e.g., see FIG. 73). For example, the bottom channels 222 may have a channel pitch P1 between 30 mm and 35 mm. In certain examples, the bottom channels 222 have a pitch P1 between about 32 and 33 mm away from each other. In an example, the bottom channels 222 have a pitch P1 of about 32.7 mm. In the example shown, the VSFF port members 402 are each configured to receive four VSFF plug connectors. Other configurations are possible.

FIGS. 74-77 illustrate another implementation 200I of a cassette 200. The cassette 200I is configured substantially the same as the VSFF cassette 200H, except with a different channel pitch P2 that is larger than the channel pitch P1. Accordingly, the cassette 200I is suited for mounting to a tray arrangement 404 that is substantially the same as the tray arrangement 120 except for the spacing (i.e., pitch) between the guides 150, 350 (e.g., compare FIGS. 15 and 78). For example, the tray arrangement 120 of FIG. 15 carries twelve guides 150, 350 while the tray arrangement 404 of FIG. 78 carries nine guides 150, 350.

Figure 73:
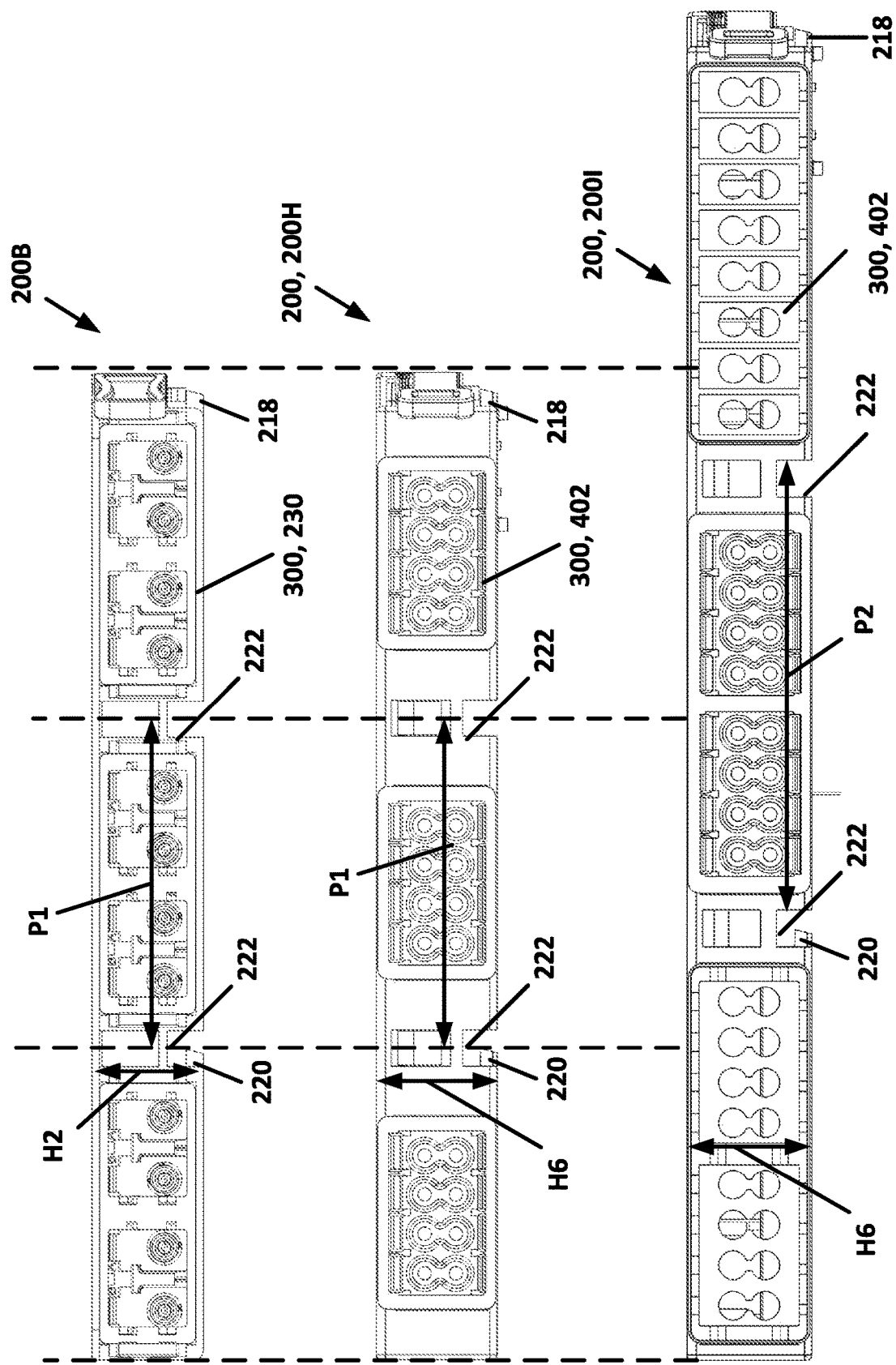
FIG. 73 is a front elevational view comparing the cassette of FIG. 72 with the cassette of FIG. 35 and the cassette of FIG. 74.
Figure 74:
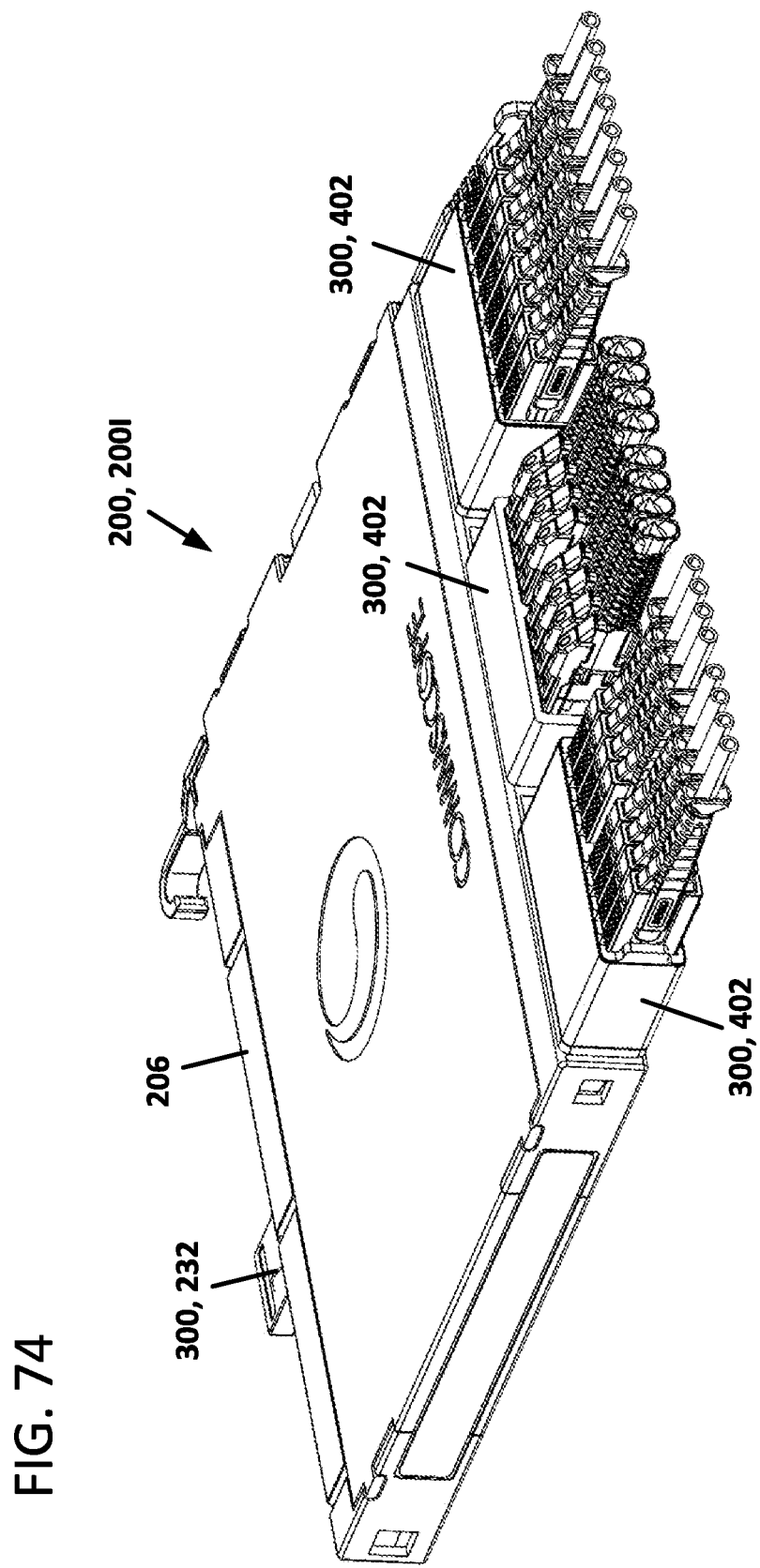
FIG. 74 is a front perspective view of an example cassette configured in accordance with the principles of the present disclosure, the cassette carrying port members configured to receive VSFF type plug connectors in a vertical orientation, the cassette having a different bottom channel spacing compared to the cassette of FIG. 72.
Figure 75:
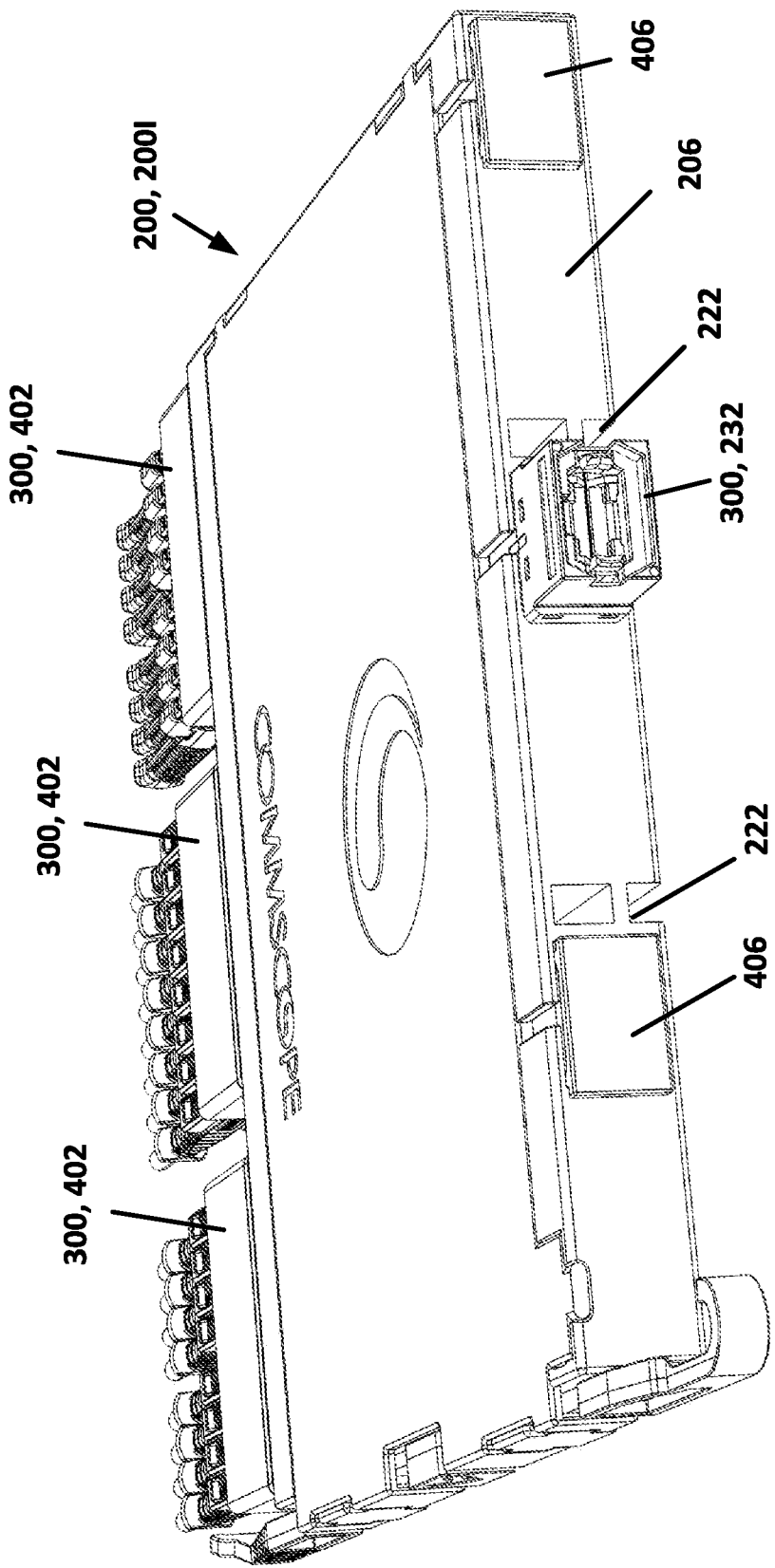
FIG. 75 is a rear perspective view of the cassette of FIG. 74.
Figure 76:
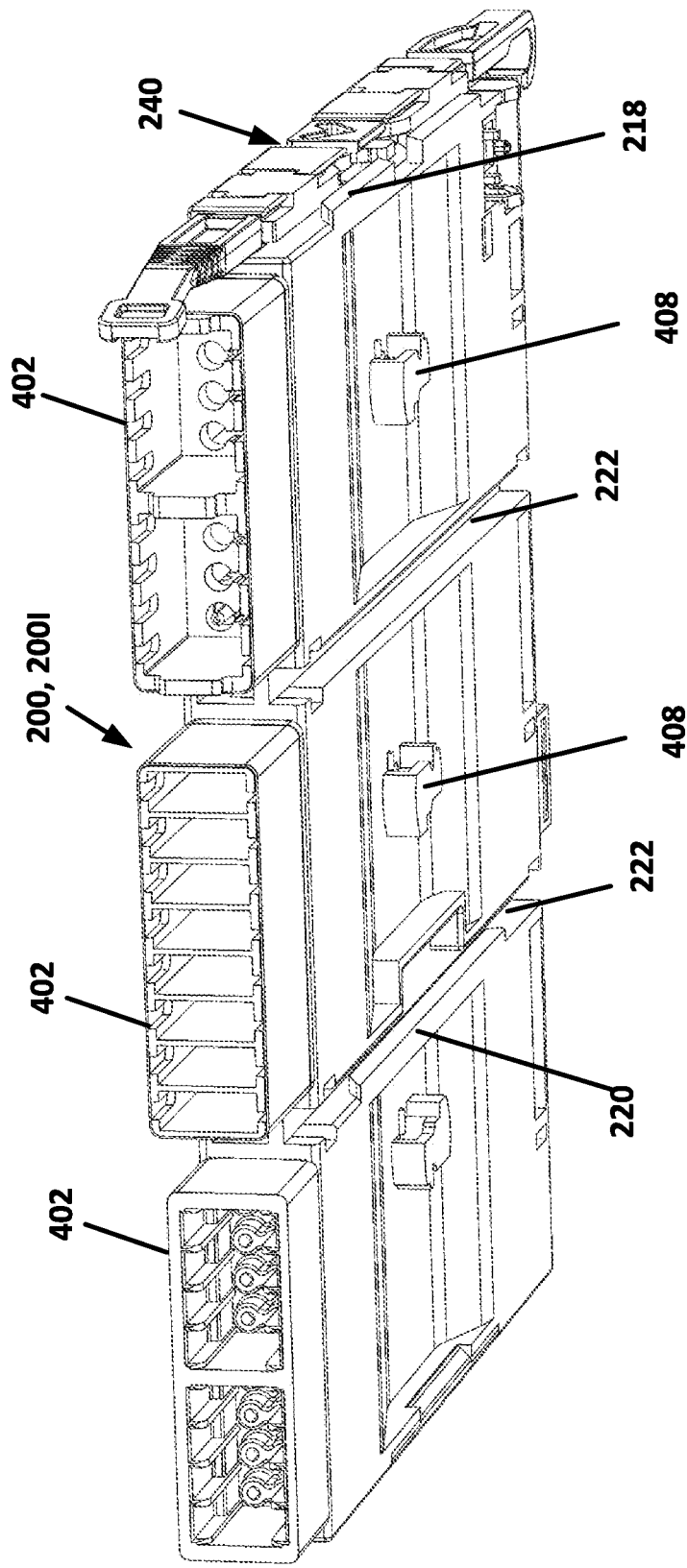
FIG. 76 is a bottom, front perspective view of the cassette of FIG. 74.
Figure 77:
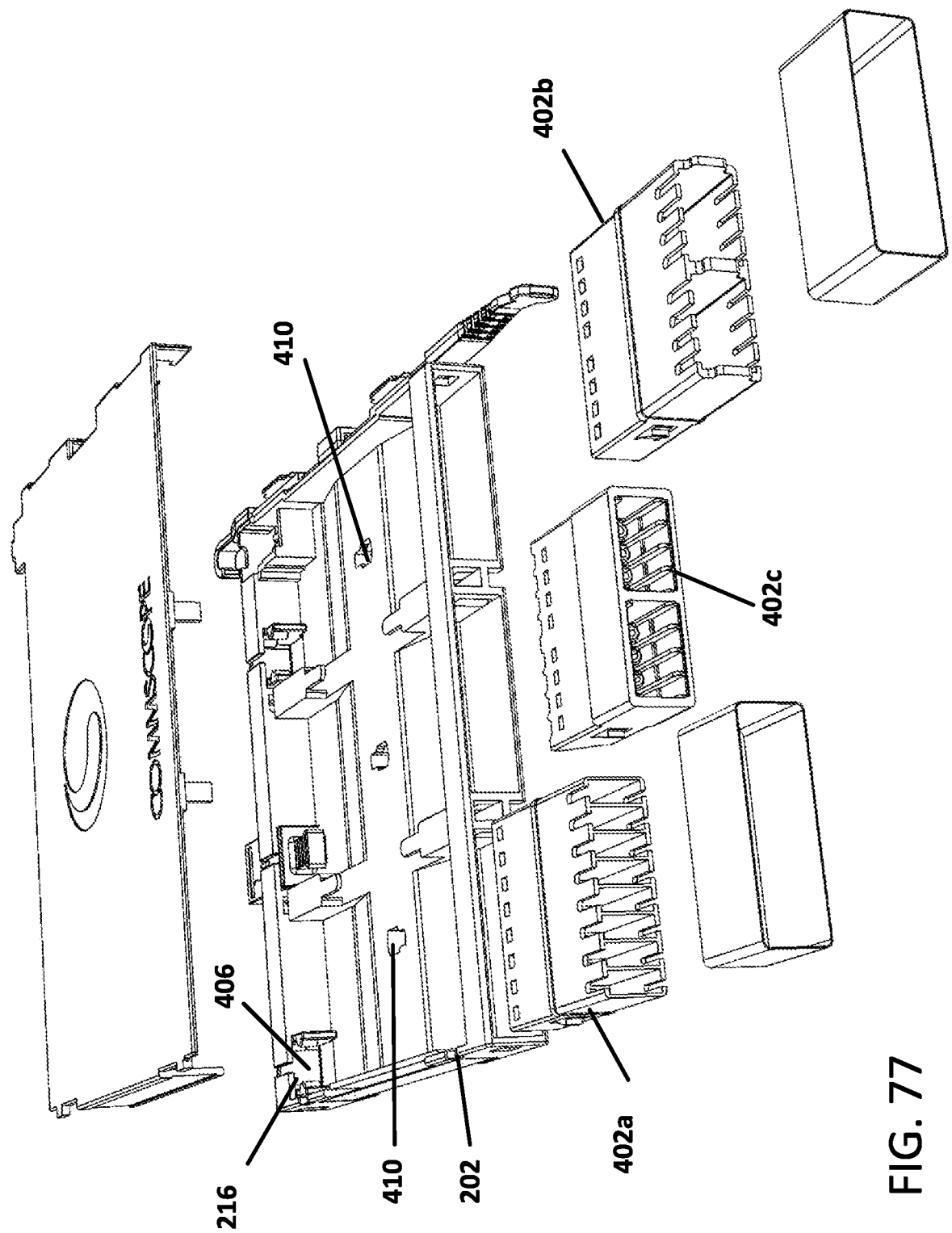
FIG. 77 is an exploded view of the cassette of FIG. 74.
Figure 80:
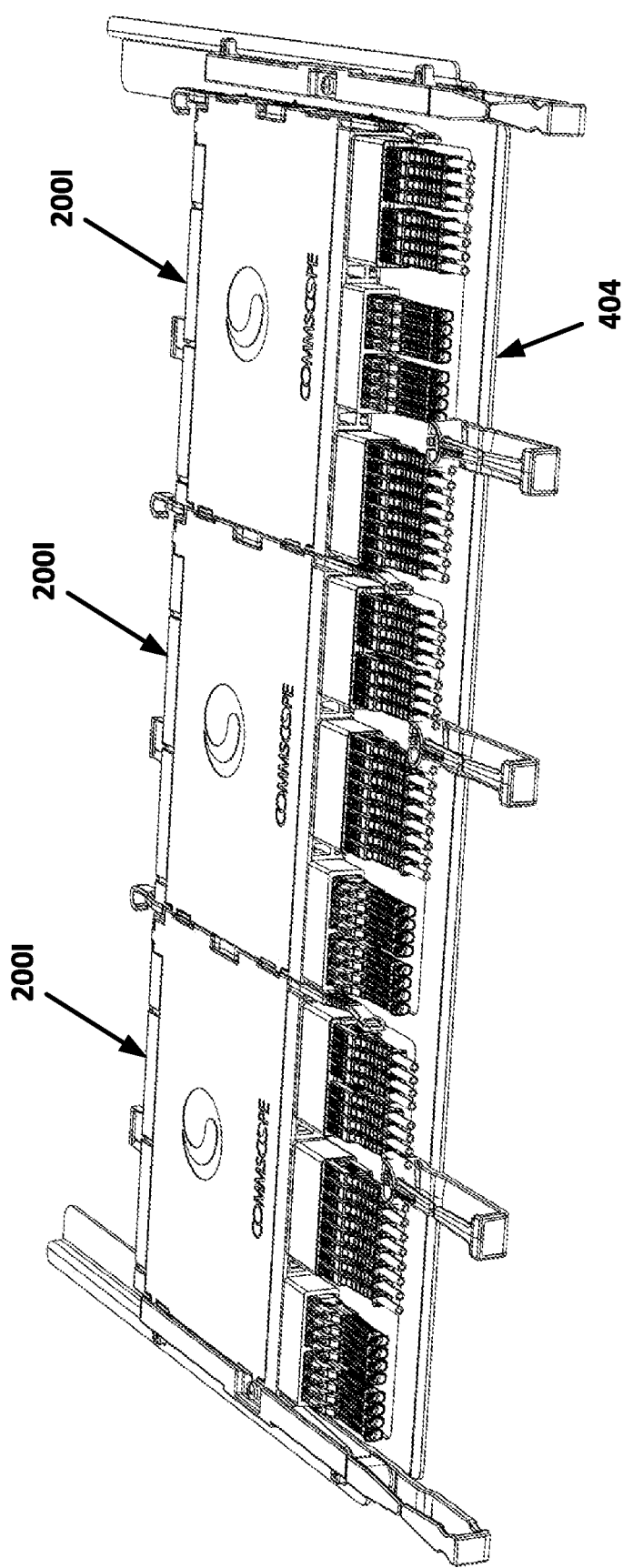
FIG. 80 shows the tray of FIG. 79 fully populated with cassettes of the type shown in FIG. 74.

In certain implementations, the difference in channel pitch P2 provides more space between the bottom channels 222 of the cassette 200I, which can be filled with additional or larger port members 300. For example, as shown in FIG. 73, the cassette 200I can carry a port member 402 defining eight ports for VSFF plug connectors at the front end 204 between the channels 222 whereas the cassette 200H carries a port member 402 defining four ports for VSFF plug connectors. FIG. 77 shows three different types of port members 300 that can be carried by the cassette 200I. A first type of port member 300 is a shuttered adapter 402a configured to receive SN plug connectors. A second type of port member 300 is a non-shuttered adapter 402b configured to receive SN plug connectors. A third type of port member 300 is a non-shuttered adapter 402c configured to receive MDC plug connectors.

In certain implementations, the cassette 200I can carry one or more port members 300 (e.g., single MPO adapters 232) at the rear end 206 of the cassette 200I. For example, the cassette 200I may define one or more rear apertures 216 at the rear end 206 at which to receive the rear port members 300. In certain implementations, the cassette 200I may include more rear apertures 216 than port members 300. In such implementations, a punch-out cover 406 may be initially provided at each of the rear apertures 216 not receiving a port member 300. In such cases, a user has the flexibility to select a position for a rear port member 300 to facilitate cable routing.

Figure 81:
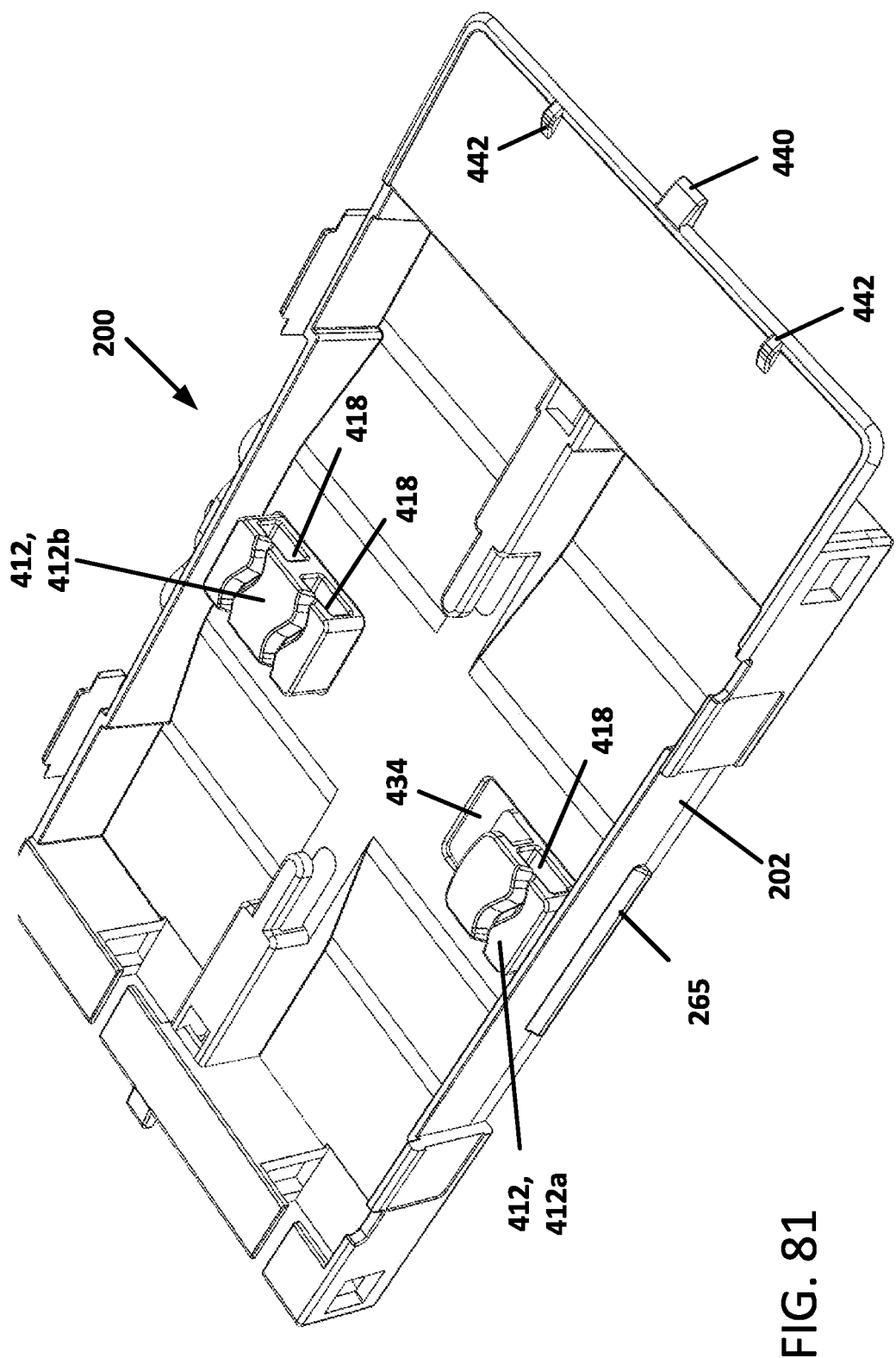
FIG. 81 shows a first example fiber management structure and a second example fiber management structure mounted at an example cassette body.

Referring to FIG. 81, in certain implementations, one or more fiber management structures 412 (e.g., spools, bend radius limiters, fiber guides, etc.) can be provided within any of the cassettes 200 disclosed herein. In certain examples, the body 202 of the cassette 200 is configured to receive the fiber management structure(s) 412. In certain examples, a fiber management structure 412 is removably mounted to the cassette body 202. In certain implementations, the fiber management structure 412 defines a through passage 418 through which one or more fibers can be routed. The fiber management structure 412 inhibits bending optical fibers beyond a minimum bend radius. In certain examples, the fiber management structure 412 facilitates maintaining separation or segregation of optical fibers of different cables.

Figure 88:
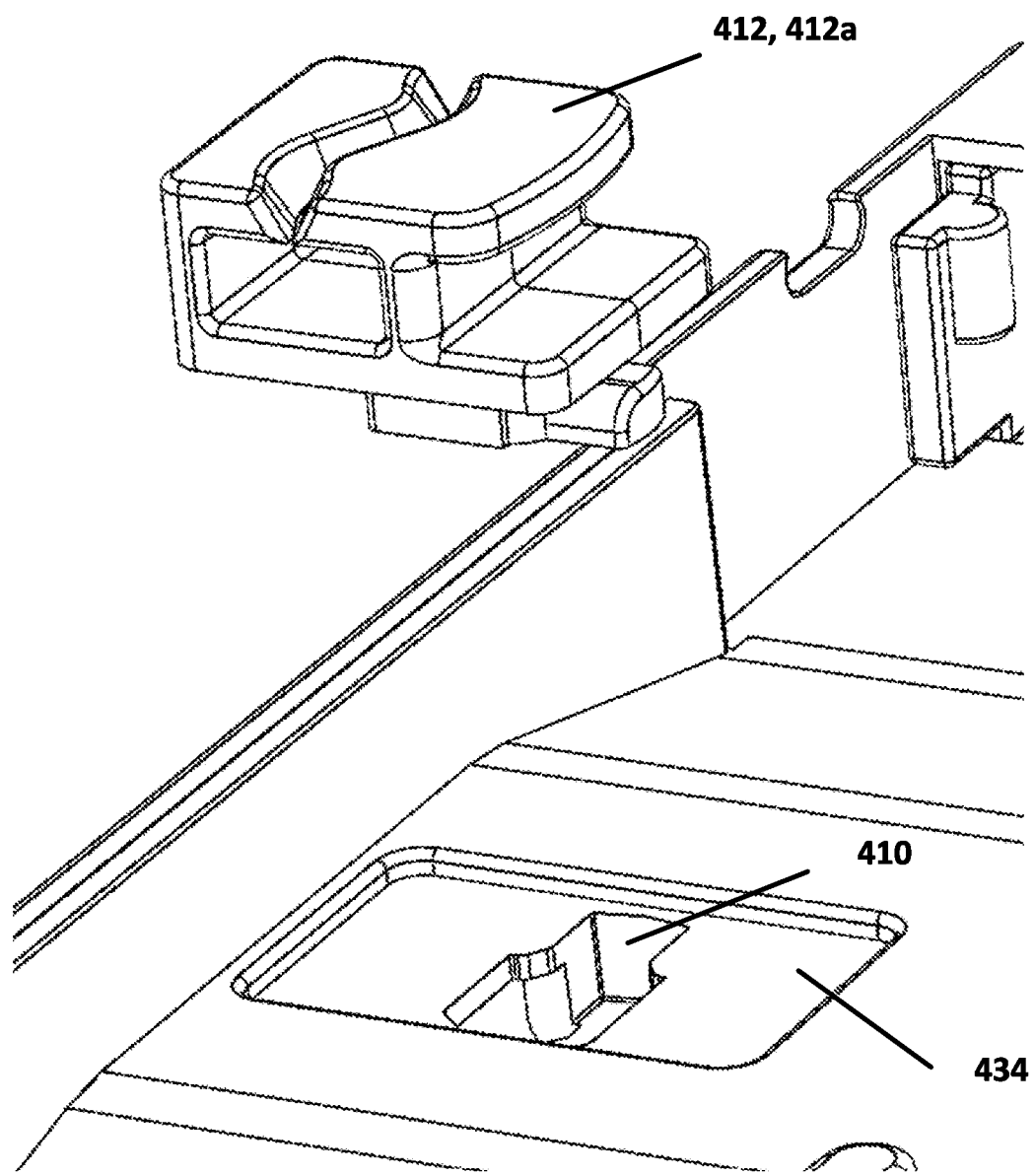
FIG. 88 shows a fiber management structure exploded away from an aperture configured to receive a fiber management structure.

In the example shown in FIGS. 77 and 88, the floor 225 of the cassette 200 defines one or more apertures 410 at which a fiber management structure 412 can be mounted. For example, a mounting member 414 of a fiber management structure 412 may be inserted through one of the apertures 410. In certain implementations, the mounting member 414 may be twisted to lock the mounting member 414 from moving back through the aperture 410. In certain implementations, the cassette 200 includes a retaining structure 408 to which the mounting member 414 can secure. In certain implementations, a blocking member 407 extends below each aperture 410.

Figure 82:
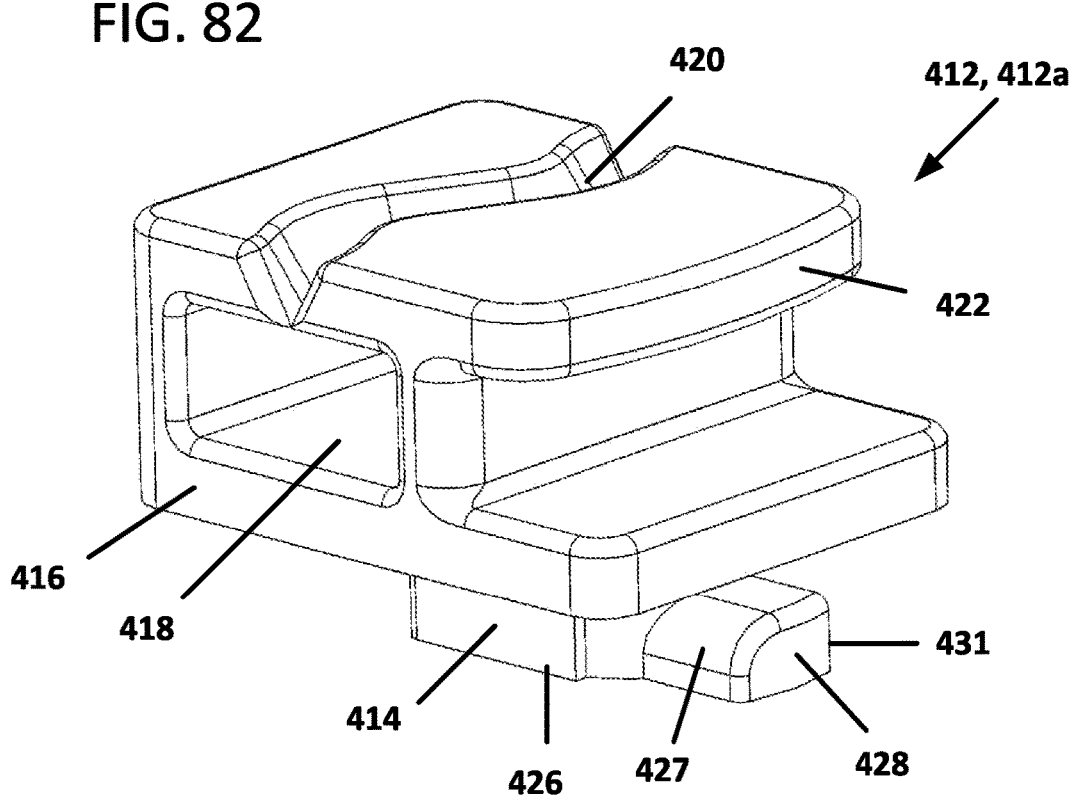
FIGS. 82 and 83 are top and bottom perspective views of the first example fiber management structure of FIG. 81.
Figure 83:
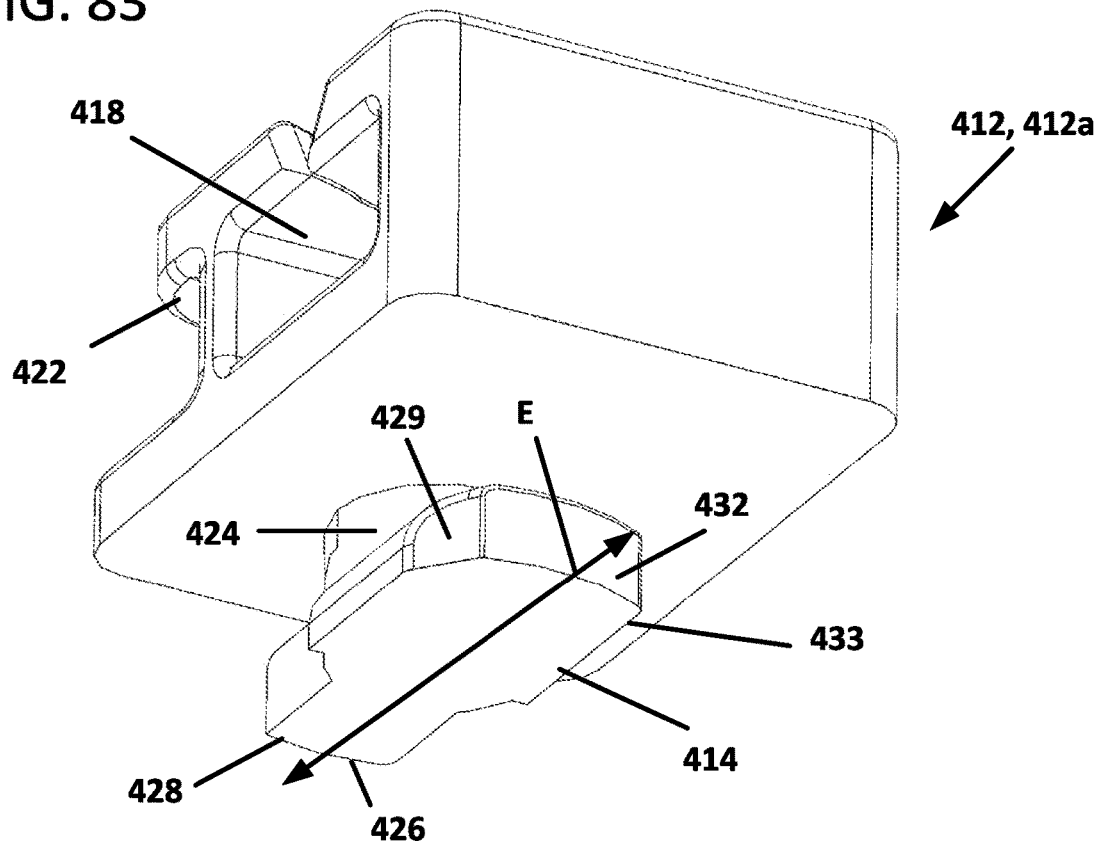

FIGS. 82 and 83 illustrate a first example 412a of a fiber management structure 412 suitable for use within the cassettes 200. The first fiber management structure 412a includes a body 416a that defines a through passage 418 through which one or more optical fibers may be routed. The body 416 defines a slit 420 leading to the through passage 418 to allow fibers to be laterally inserted into the passage 418 instead of threading the fibers through the passage 418. In certain examples, the body 416 also defines an outwardly extending gripping flange 422. The mounting member 414 includes a neck 424 extending outwardly from the body 416 to a foot 426. The foot 426 includes a first resilient lock member 428 and a second resilient lock member 432. Each resilient lock member 428, 432 defines a lead-in side 427, 431 and a retaining side 429, 433. The lead-in side 427, 431 is contoured (e.g., curved or ramped) while the retaining side 429, 433 is flat. In certain examples, the foot 426 is elongate along an axis E between the first and second lock members 428, 432.

Figure 84:
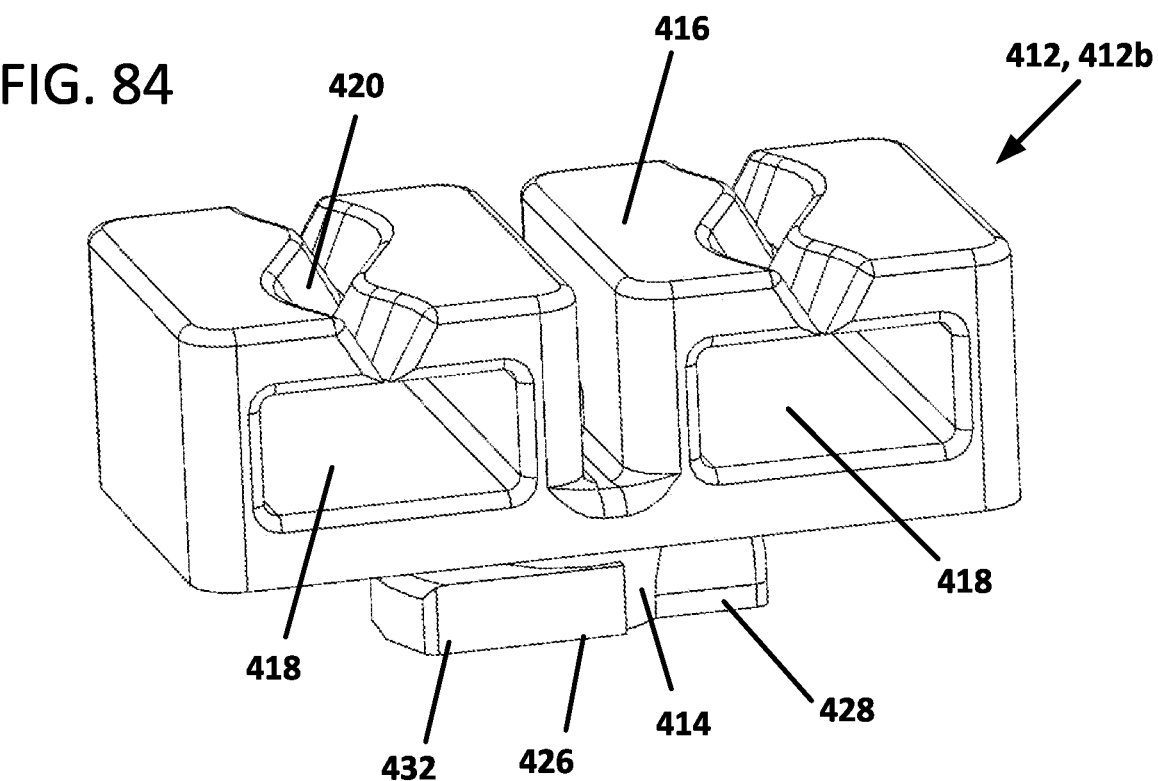
FIGS. 84 and 85 are top and bottom perspective views of the second example fiber management structure of FIG. 81.
Figure 85:
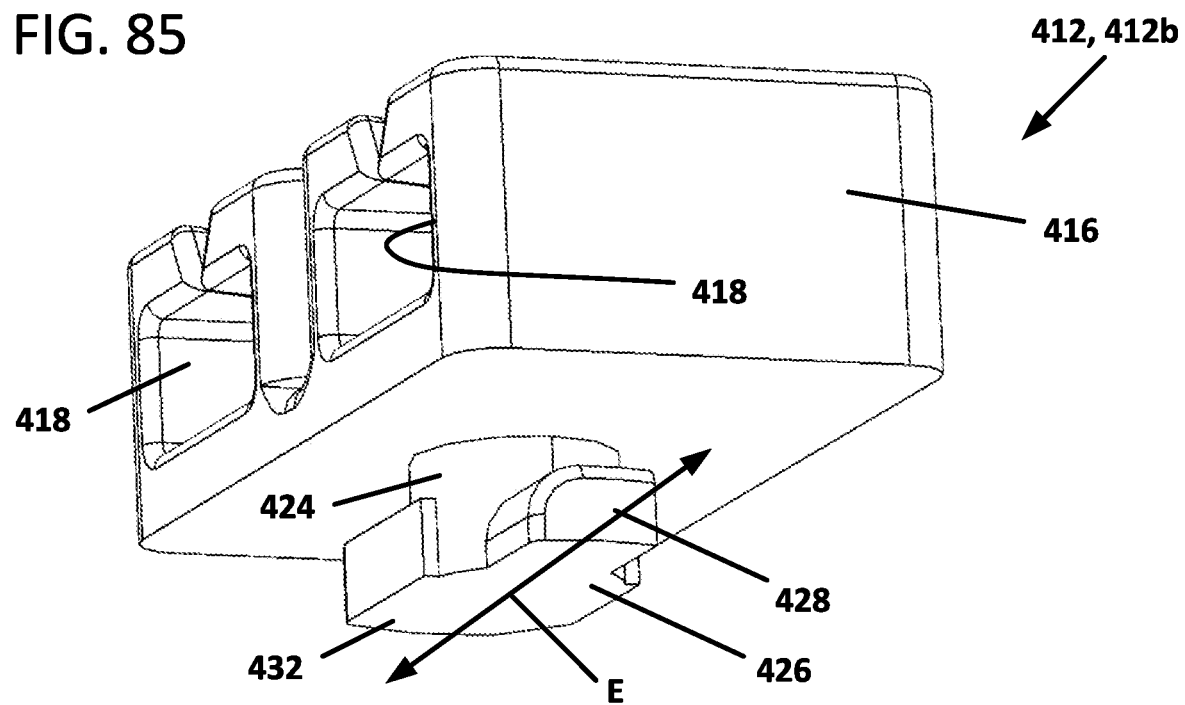

FIGS. 84 and 85 illustrate a second example 412b of a fiber management structure 412 suitable for use within the cassettes 200. The second fiber management structure 412b includes a body 416 defining two through passages 418 through each of which one or more optical fibers may be routed. The body 416 defines a respective slit 420 leading to each through passage 418 to allow fibers to be laterally inserted into the passages 418. The mounting member 414 includes a neck 424 extending outwardly from the body 416 to a foot 426. The foot 426 is elongate along an axis E. In certain examples, the foot 426 of the second fiber management structure 412b is the same as the foot 426 of the first fiber management structure 412a.

Figure 97:
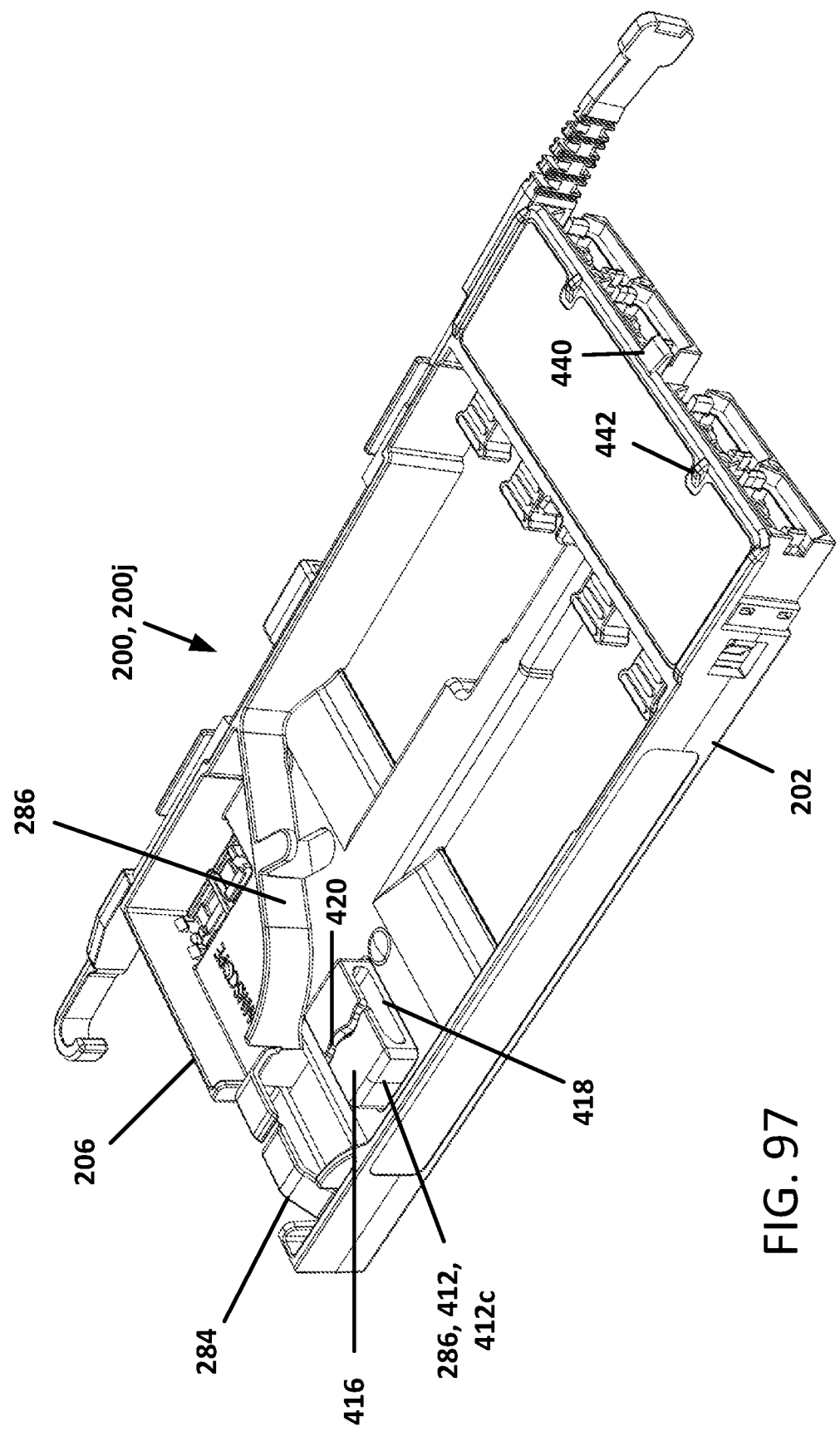
FIG. 97 is a top perspective view of another example cassette configured to connect a like number of front and rear plug connectors, the cassette being shown with an open top.
Figure 98:
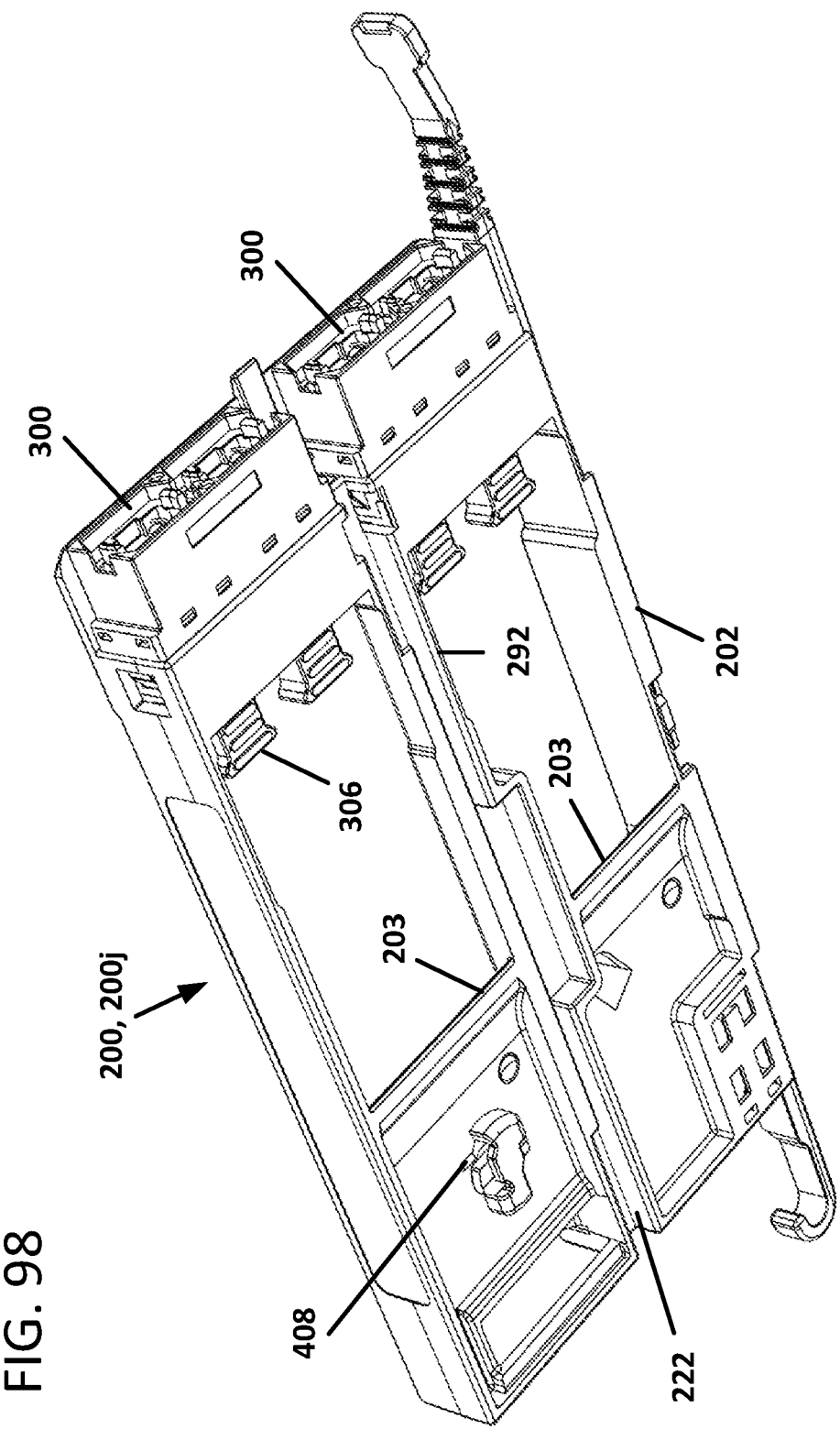
FIG. 98 is a bottom perspective view of the cassette of FIG. 97.

FIGS. 97 and 98 illustrate a third example 412c of a fiber management structure 412. The third fiber management structure 412c includes a body 416 defining a single through passages 418 through which one or more optical fibers may be routed. The body 416 defines a slit 420 leading to the through passage 418 to allow fibers to be laterally inserted into the passage 418 instead of threading the fibers through the passage 418. The body 416 and through passage 418 of the third example 412c are wider than the body 416 and through passage 418 of the first example 412a. The body 416 of the third example 412c does not include outwardly extending flanges compared to the first example. In certain examples, the passage 418 of the third example 412c is about twice the width of the passage 418 of the first example 412a while having the same height and depth.

Figure 86:
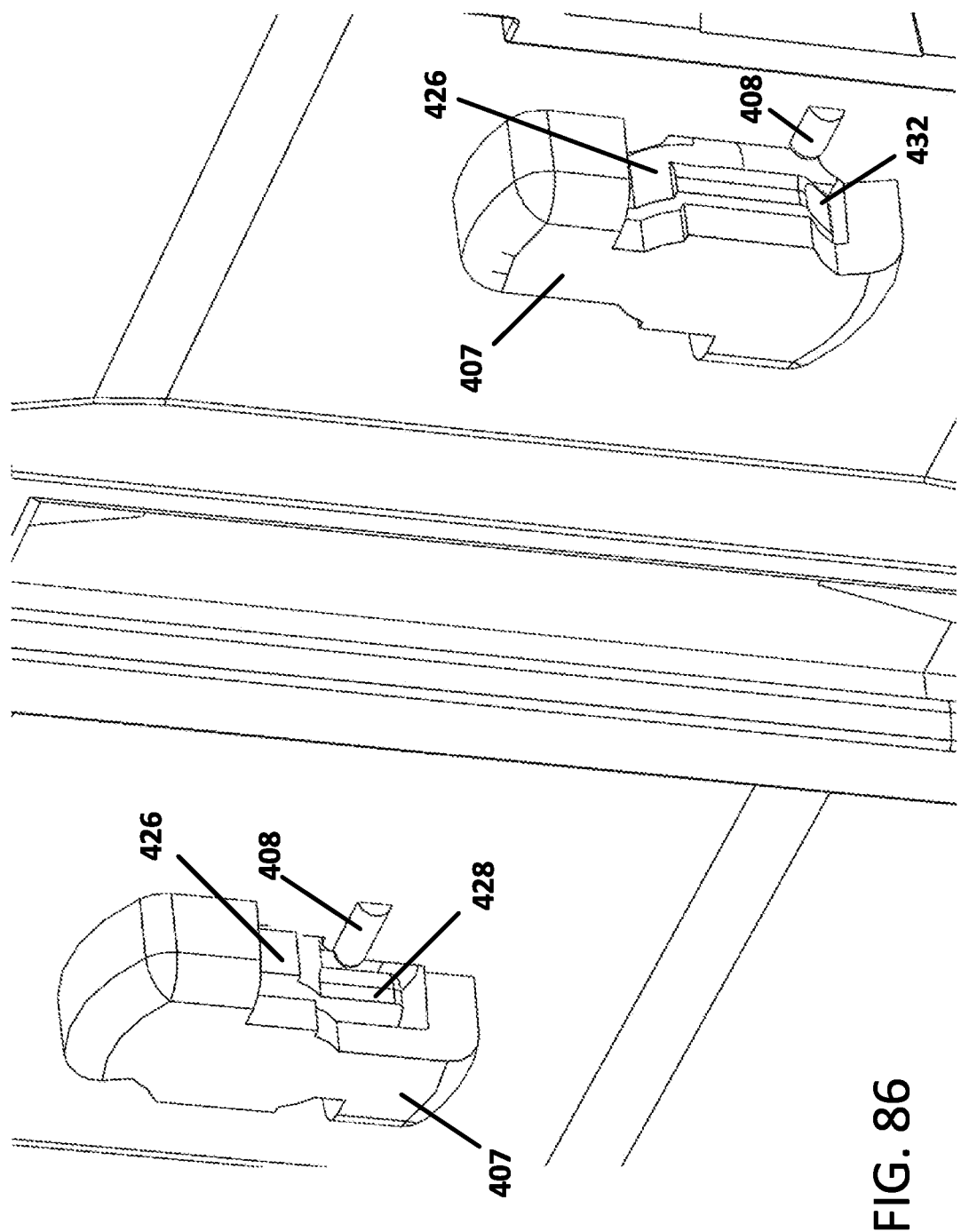
FIG. 86 shows mounting members of two fiber management structures mounted through two apertures of a cassette and disposed in a first rotational position allowing movement of the mounting member through the aperture.
Figure 87:
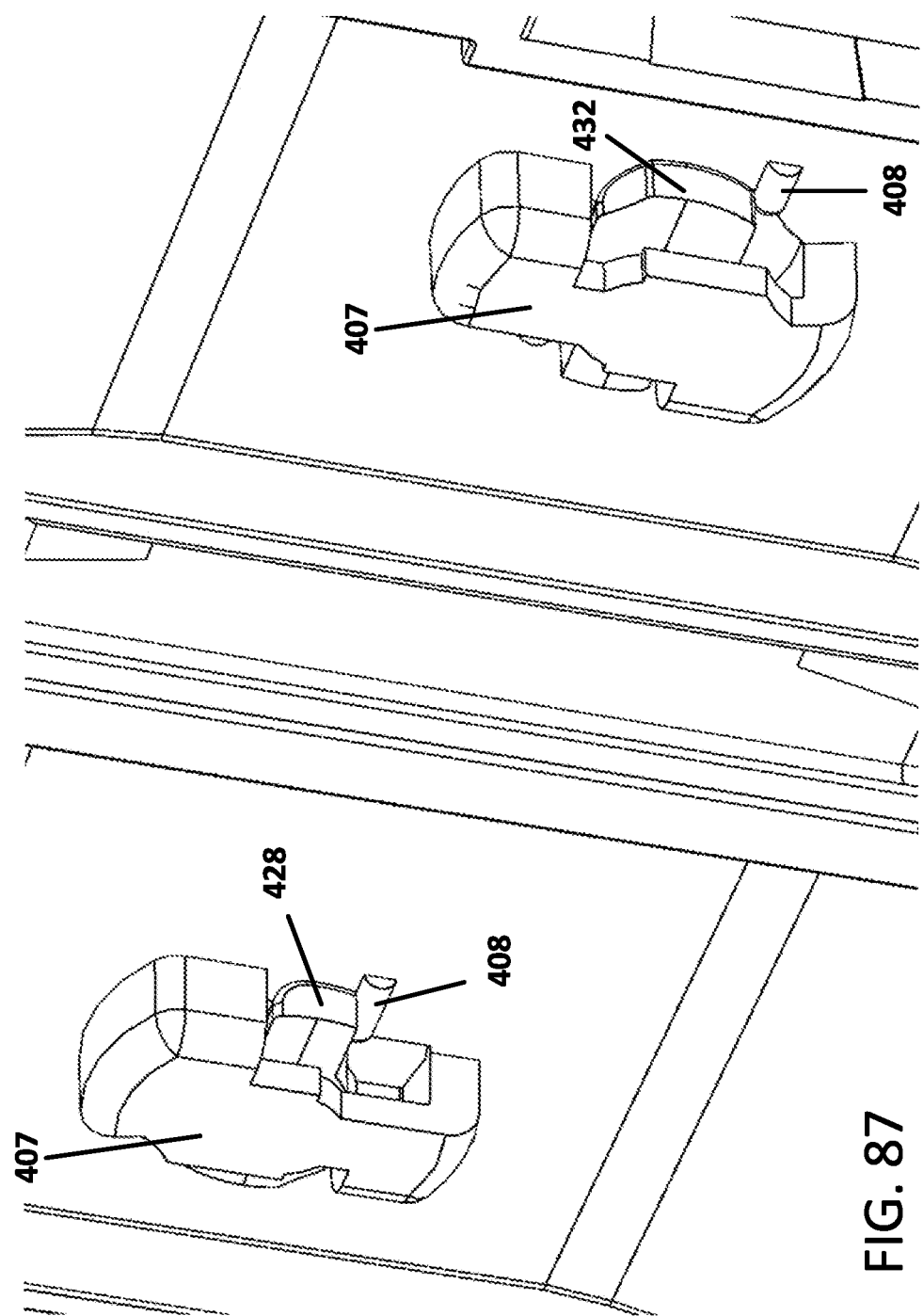
FIG. 87 shows the mounting members when the fiber management structures are disposed in a second rotational position inhibiting movement through the apertures.

In certain implementations, the mounting member 414 of the fiber management structure 412 is configured to lock to the cassette 200 through a twisting motion. For example, the foot 426 of the mounting member 414 is configured to be inserted through one of the apertures 410 in a first rotational orientation (e.g., see FIG. 86). In certain examples, the first and second lock members 428, 432 of the foot 426 have different shapes and sizes so that the foot 426 can only be inserted through the aperture 410 in the first rotational orientation. Restricting the starting position of the foot 426 facilitate the correct mounting of asymmetrical fiber management members 412. For example, as shown in FIG. 81, the through passages 418 can be offset from centers of the fiber management structures 412. Accordingly, a bend radius of fiber loops wound between fiber management structures 412 can be enhanced by mounting the fiber management structures 412 to increase the distance between the through passages 418 (e.g., see FIG. 91). Such a mounting configuration can be encouraged by alternating the orientation of adjacent apertures 410.

A retaining structure 408 (e.g., a bump or ramp) is disposed at a bottom of the cassette 200 adjacent the aperture 410. The retaining structure 408 s positioned so that rotating the fiber management structure 412 relative to the cassette 200 causes the foot 426 to ride over the retaining structure 408. For example, either the first lock member 428 or the second lock member 432 may flex over the retaining structure 408 during rotation. In certain implementations, two retaining structures 408 are disposed at each aperture 410— one at a first side and the other at a second side. Accordingly, each of the lock members 428, 432 flexes over a respective one of the retaining structures 408 during rotation. The lead-in side 427, 431 of each lock member 428, 432 facilitates flexing over the retaining structure 408.

When the fiber management structure 412 is moved to a second rotational position, the retaining side 429, 433 of each lock member 428, 432 abuts the retaining structure 408 to inhibit rotation back to the first rotational position. In certain examples, the second rotational position is offset 90 degrees from the first rotational position. In other examples, the second rotational position can be offset between 5 degrees and 175 degrees. In certain examples, the second rotational position can be offset between 45 degrees and 135 degrees. In certain examples, the second rotational position can be offset between 5 degrees and 90 degrees. In certain examples, the second rotational position can be offset between 90 degrees and 155 degrees.

Figure 89:
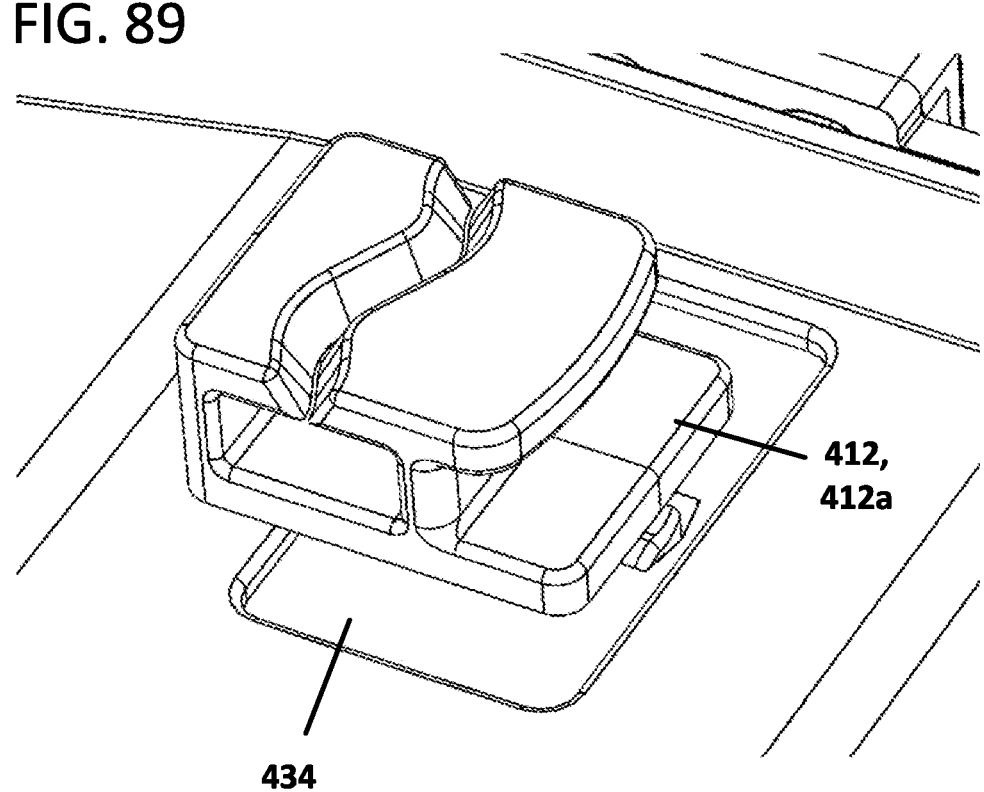
FIG. 89 shows the fiber management structure of FIG. 88 mounted at the aperture of FIG. 88 in the first rotational position.
Figure 90:
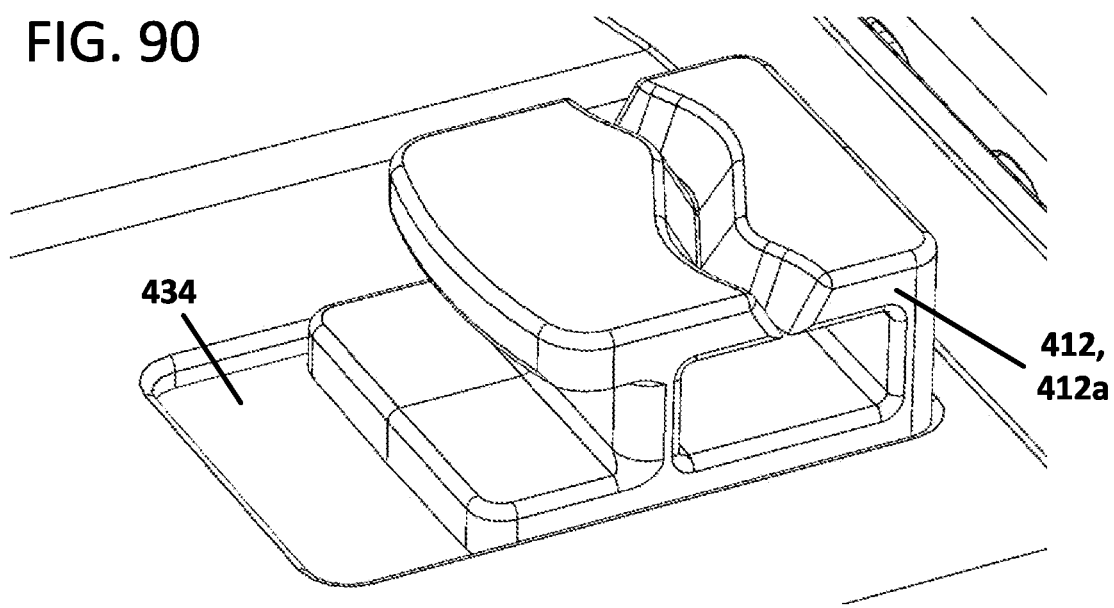
FIG. 90 shows the fiber management structure of FIG. 89 mounted at the aperture of FIG. 88 in the second rotational position.

Referring to FIGS. 88-90, in certain implementations, the aperture 410 is disposed within a depression 434 defined in the floor 425 of the cassette 200. The depression 434 may be sized and shaped to indicate a mounting orientation for the fiber management structure 412. For example, as shown in FIG. 89, the body 416 of the fiber management structure 412 does not align with the depression 434 when the mounting member 414 is first inserted through the aperture 410 in the first rotational position. The body 416 aligns with the depression 434 after the fiber management structure 412 is twisted to the second rotational position. In certain examples, engagement between the body 416 and a lip of the depression 434 inhibits movement of the body 416 back to the first rotational position. In certain examples, the depression 434 inhibits fibers from being trapped between the fiber management structure 412 and the cassette floor 225.

Figure 91:
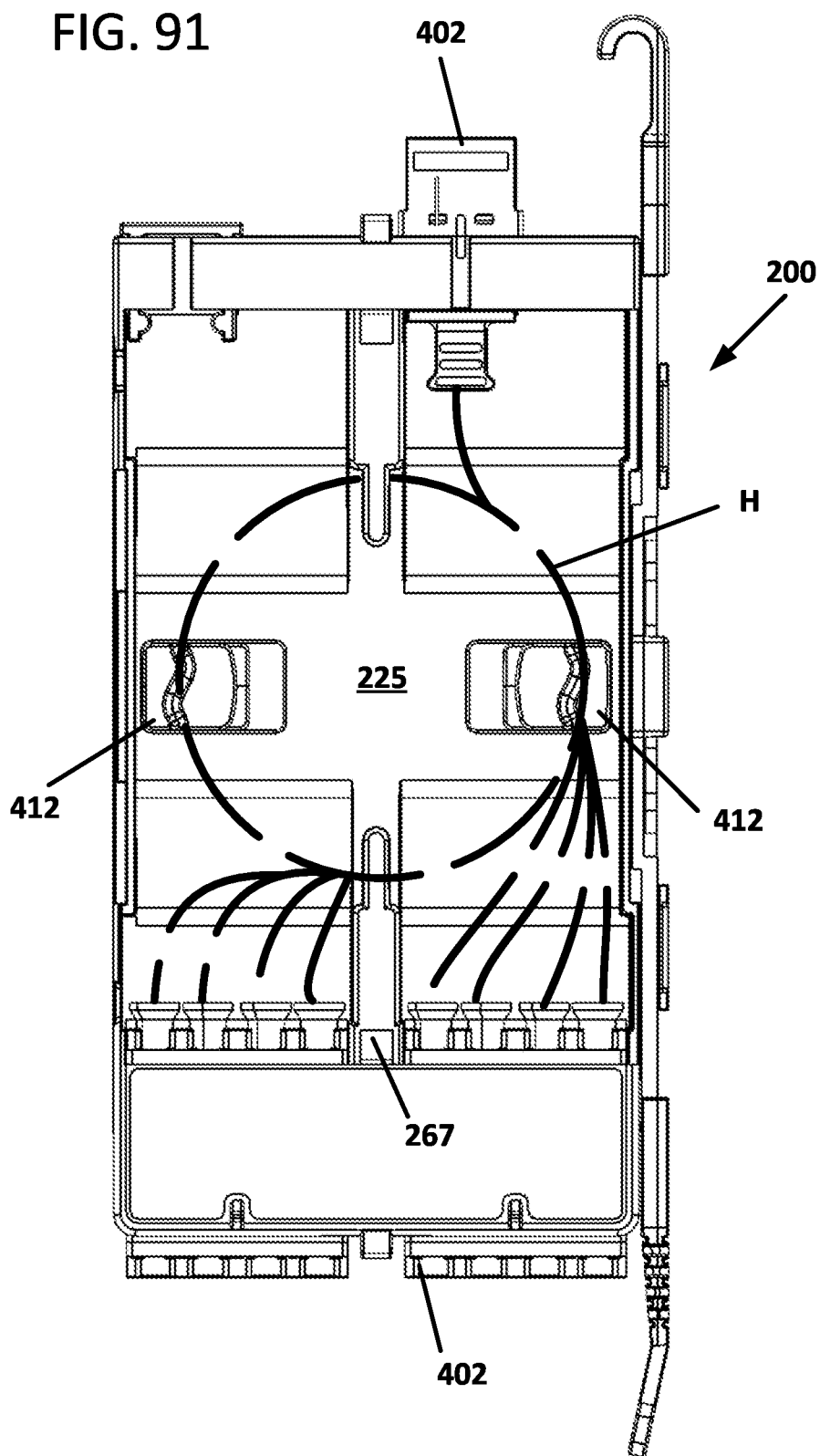
FIG. 91 is a top plan view of an example cassette including two opposing first fiber management structures; an example fiber routing structure is shown.
Figure 92:
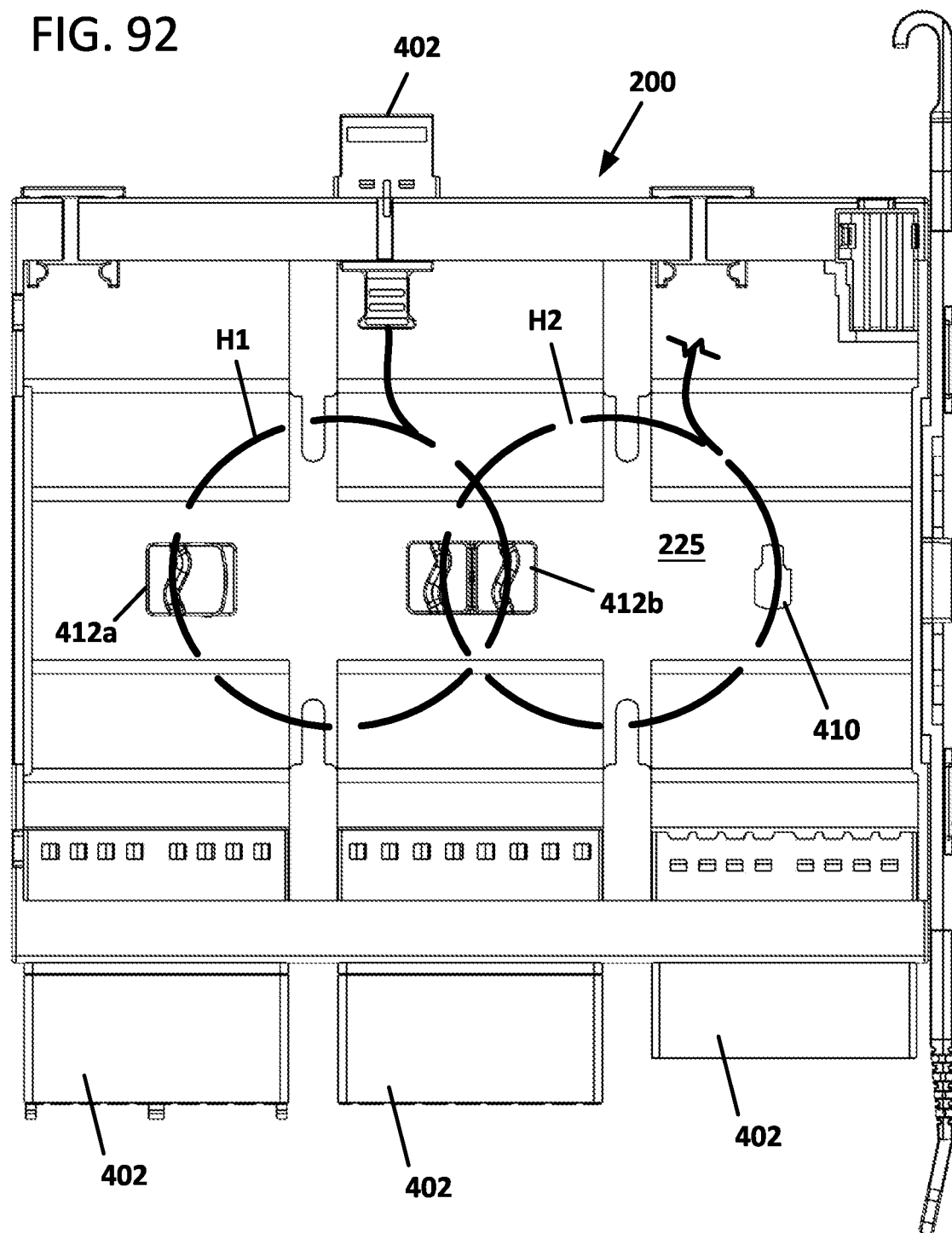
FIG. 92 is a top plan view of another example cassette including a first fiber management structure of the type shown in FIGS. 82 and 83 and a second fiber management structure of the type shown in FIGS. 84 and 85; another example fiber routing structure is shown.

FIGS. 91 and 92 illustrate fiber routing schemes within various cassettes 200 using the first and second fiber management structures 412a, 412b. In FIG. 91, two first fiber management structures 412a are mounted to the cassette floor 225 opposing each other. A group of fibers H (e.g., a fiber cable) extend from a multi-fiber connector at a rear port member 402, wind around the cassette floor 225 in a loop held by the fiber retaining structures 412, and separate out from the loop towards single-fiber connectors plugged into interior ports of front port members 402.

In FIG. 92, a second fiber management structure 412b is disposed at a central portion of the cassette floor 225 and a first fiber management structure 412a is disposed at one side of the cassette 200. In the example shown, the aperture 410 on the other side is unoccupied. In other examples, however, a first or second fiber management structure 412a, 412b can be mounted at the aperture 410. The through-passages 418 of the second fiber management structure 412b are offset from center to enhance bend radius protection of the fibers. For example, one or more loops of a first fiber cable H1 may be routed through the first fiber management structure 412a and through a far side through passage 418 of the second fiber management structure 412b. One or more loops of a second fiber cable H2 may be routed through the near-side through passage 418 of the second fiber management structure 412b. Accordingly, the fibers of the first cable H1 may be kept separate from the fibers of the second cable H2. Therefore, if one of the fibers is damaged, the corresponding cable H1, H2 can be removed and replaced without a technician needing to separate out the fibers from the other cable.

Figure 93:
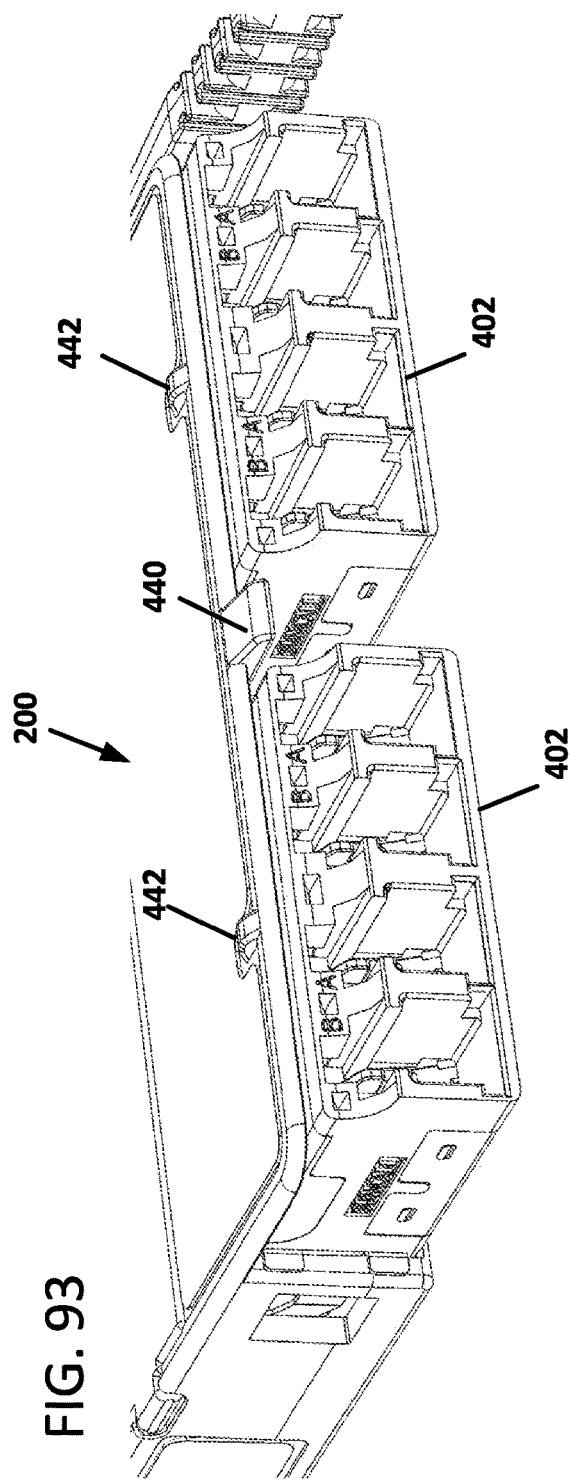
FIG. 93 is a front perspective view of a portion of an example cassette including an example beak and examples protrusions.
Figure 94:
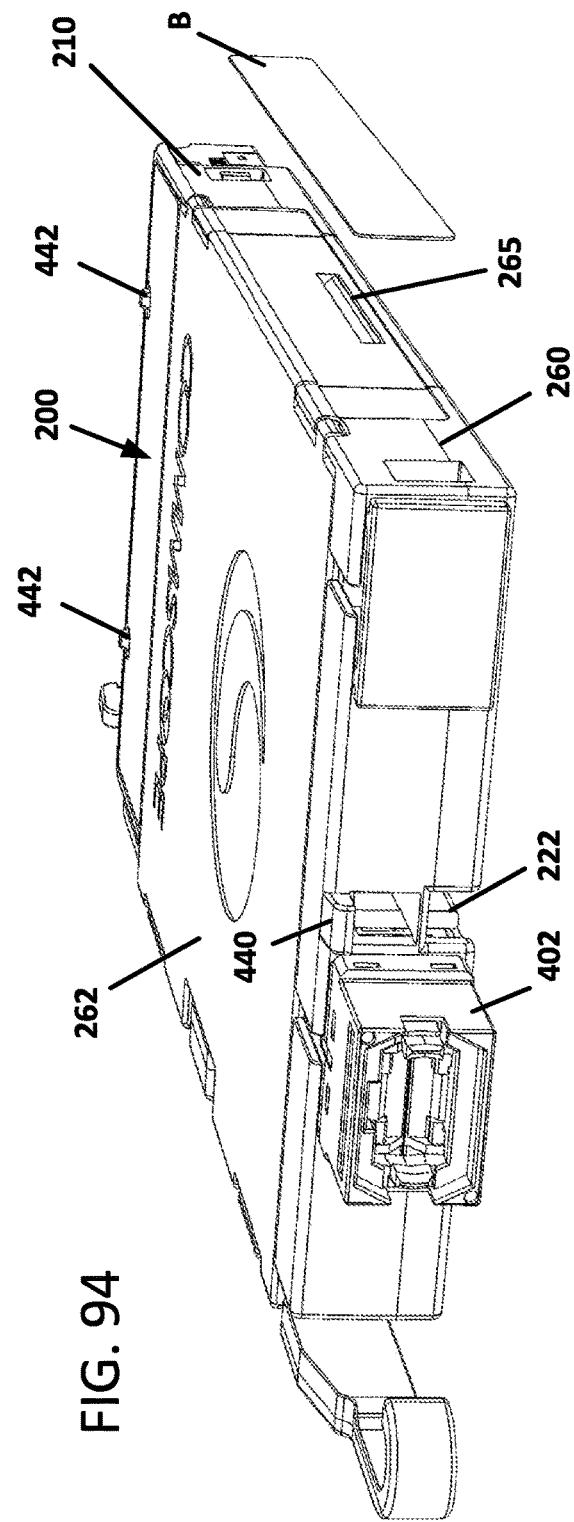
FIG. 94 is a rear perspective view of the cassette of FIG. 93.

Referring to FIGS. 93 and 94, certain types of cassettes 200 can be configured to facilitate installation of the cassette 200 on the tray arrangement 120 and/or to facilitate installation of a populated tray arrangement 120 within a chassis 105. Certain types of cassettes 200 include one or more beak members 440 extending forwardly from a front end 204 and/or rear end 206 of a cassette body 202. Each beak member 440 defines an upwardly facing ramp. In certain examples, the beak members 440 are disposed between adjacent port members 402. In an example, each beak member 440 is disposed over a bottom channel 222.

The beak members 440 protect the cassette 200 during insertion and/or removal in a situation where an upper tray arrangement 120 (i.e., a tray arrangement disposed above the tray arrangement within the chassis 105) bows downwardly. The upper tray arrangement 120 would ride over the beak 440 to clear the front end 204 or rear end 206 of the cassette 200 when the cassette 200 moves relative to the upper tray arrangement 120. The beak 440 also may protect the cassette 200 during insertion of a cassette 200 onto or removal of the cassette 200 from a tray arrangement 120 installed within the chassis 105. The beak 440 facilitates a smooth insertion or removal even if the upper tray arrangement 120 bows down towards the cassette 200.

In certain implementations, each cassette 200 includes one or more protrusions 442 disposed at a top of the cassette 200. In certain examples, the protrusions 442 are curved in a semi-circular shape. The protrusions 442 also function to raise an upper tray arrangement 120 away from the cassette 200 during insertion and/or removal of the cassette 200. In certain examples, the protrusion 442 raises the upper tray arrangement 120 sufficiently above the top of the cassette 200 to ensure clearance of plugs received at port members 402 of the cassette 200. For example, the protrusions 442 may inhibit catching of latch arms of plugs received at the port members 402 by the upper tray arrangement 120.

FIG. 94 also illustrates the cover 262 mounted to the base 260 of the cassette 200. In the example shown, the cover 262 defines an elongate aperture through which an elongate hook 265 extends to hold the cover 262 to the base 260 at the second side 210 of the cassette 200. A label B is configured to mount over the elongate aperture and elongate hook 265 after the cassette 200 is assembled to inhibit removal of the cover 262 from the base 260. In certain implementations, the cover 262 also may include an arm that extends into and secures within an aperture 267 disposed between port members 402 and/or above bottom channels 222.

Figure 95:
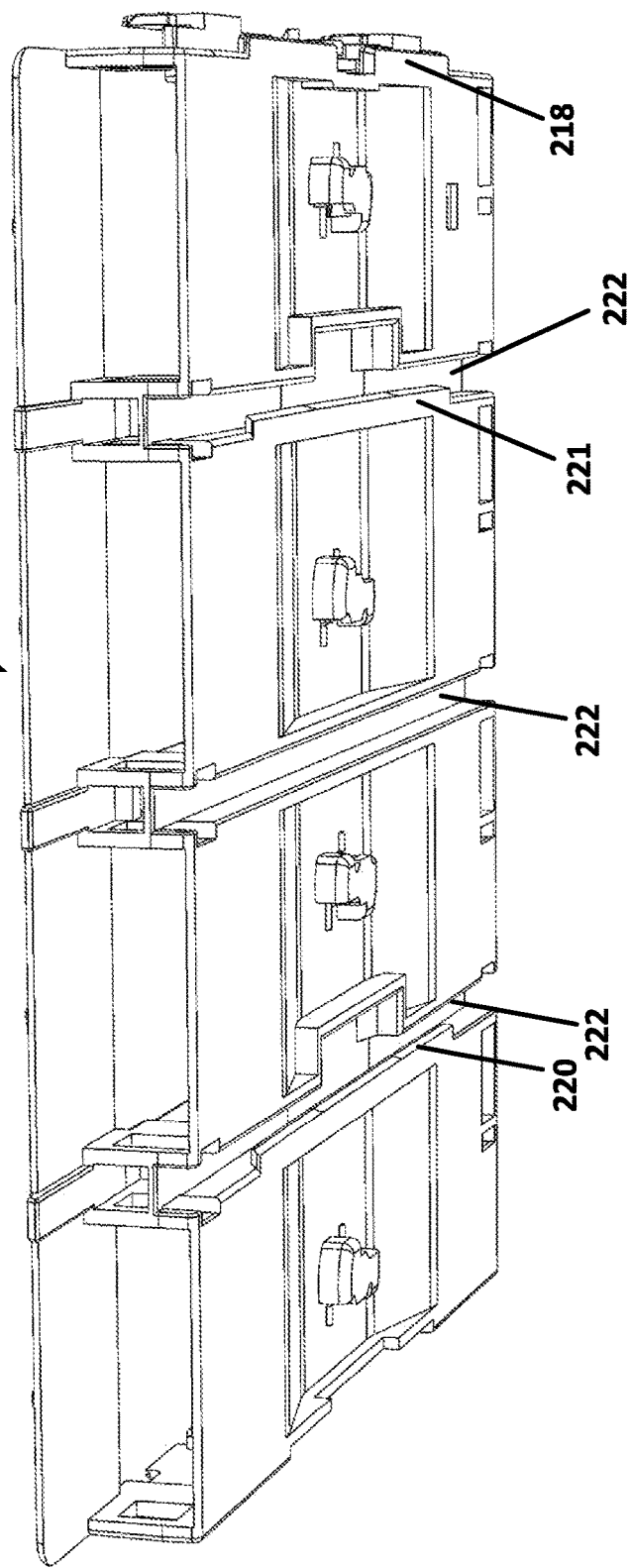
FIG. 95 is a bottom perspective view of a body of an example cassette including an additional bottom rail.
Figure 96:
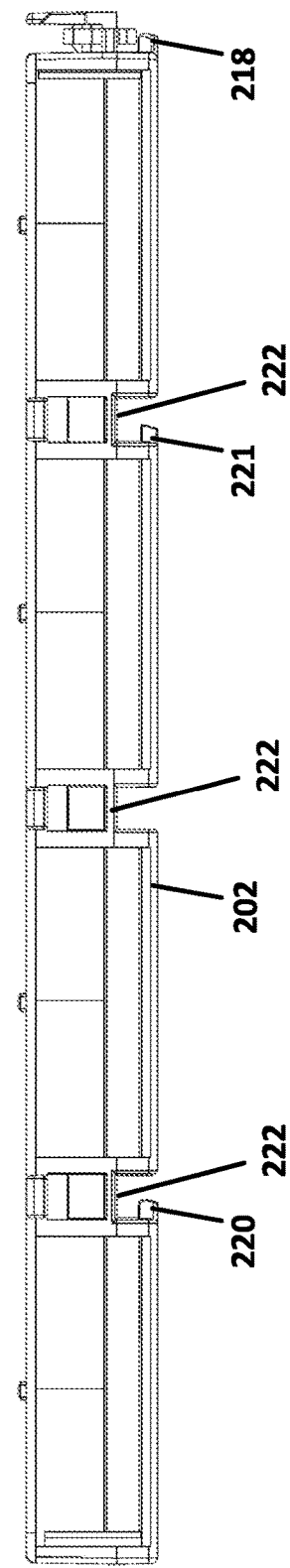
FIG. 96 is a front elevational view of the cassette of FIG. 95.

In some implementations, only one of the bottom channels 222 receives a bottom rail 220. In other implementations, however, additional bottom rails 221 may be disposed at one or more additional bottom channels 222 (e.g., see FIGS. 95 and 96). In some examples, the additional bottom rails 221 have a common configuration with the bottom rail 220. In other examples, the additional bottom rails 221 are smaller or otherwise differently shaped than the bottom rail 220 (e.g., see FIG. 96). The bottom rail 220 and the end rail 218 cooperate with the guides 150, 350 to secure the cassette 200 to the tray arrangement 120. In certain examples, the additional bottom rails 221 do not engage the guides 150, 350 unless lifting or bowing of the cassette 200 relative to the guide 150, 350 occurs. Accordingly, the additional bottom rails 221 do not contribute to friction between the cassette 200 and the guides 150, 150. In certain examples, the additional bottom rails 221 inhibit lifting or bowing of the cassette 200 away from the guides 150, 350.

Aspects of the Disclosure

Aspect 1. A communications arrangement comprising:
a tray arrangement carrying a plurality of spaced apart guides extending parallel to each other along a forward-rearward axis of the tray arrangement; and
a cassette configured to mount to the tray arrangement, the cassette carrying a plurality of port members, the cassette being sized to extend from a first guide, over a second guide, to a third guide, the cassette being configured to inter-connect with the first guide and the second guide, but not the third guide.

Aspect 2. A communications arrangement comprising:
a tray extending along a forward-rearward axis between opposite front and rear ends and along a lateral axis between opposite first and second sides carrying a plurality of guides spaced from each other along the lateral axis and extending generally parallel to each other, each of the guides extending along the forward-rearward axis, each of the guides defining a notch at a top of the guide; and
a cassette mounted to the tray and selectively slidable along the forward-rearward axis, the cassette extending along the forward-rearward axis between opposite front and rear ends of the cassette and along the lateral axis between opposite first and second ends of the cassette, the cassette carrying a latching arrangement at the first end, the latching arrangement including a stop member aligned over the top of one of the guides when the cassette is mounted to the tray, the stop member riding over the top of the guide as the cassette is slid along the forward-rearward axis until the stop member aligns with the notch defined in the top of the guide, the stop member entering the notch when aligned with the notch along the forward-rearward axis to lock the cassette relative to the tray.

Aspect 3. A communications arrangement comprising:
a tray arrangement carrying a plurality of guides;
the guides being configured to receive cassettes having widths of X and 1.5X without modifying the guides.

Aspect 4. A communications arrangement comprising:
a tray carrying a plurality of guides extending along a forward-rearward axis of the tray, the guides being parallel and spaced apart from each other along a lateral axis, each of the guides defining a groove facing in a first direction along the lateral axis, and each of the guides being devoid of grooves facing in an opposite second direction along the lateral axis;
a first cassette mountable to the tray by engaging and sliding along first and second ones of the guides, the first and second guides being adjacent each other; and
a second cassette mountable to the tray by engaging and sliding along third and fourth ones of the guides, the third and fourth guides being non-adjacent so that at least a fifth guide is disposed between the third and fourth guides along the lateral axis.

Aspect 5. A communications arrangement comprising:
a tray carrying a guide, the guide extending along a length between opposite first and second ends of the guide, the guide defining a groove extending along the length of the guide, the guide also extending between a bottom and a top, the bottom of the guide being configured to mount to the tray, the top of the guide defining a notch at an intermediate position between the first and second ends;
a cassette extending along a length between opposite front and rear ends, along a width between opposite first and second ends, and along a height between a top and a bottom, the cassette including an end rail at the first side that is configured to slide along the groove defined by the guide, the cassette including a latching arrangement disposed at the first end above the end rail, the latching arrangement including:
a stop member configured to move along the height of the cassette between a lock position and a release position; and a release handle that extends along the length of the cassette between opposite front and rear ends of the release handle so that the front end of the handle extends outwardly beyond the front end of the cassette and the rear end of the handle extends outwardly beyond the rear end of the cassette, the release handle being slidable along a forward-rearward axis relative to the cassette, the release handle being configured to transition the stop member from the lock position to the release position.

Aspect 6. A communications arrangement comprising:
a tray extending along a forward-rearward axis between a front end and a rear end, the tray also extending along a lateral axis between opposite first and second sides;
a plurality of guides mounted to the tray, the guides extending along lengths between opposite front and rear ends of the guides, the lengths of the guides being parallel to the forward-rearward axis of the tray, the guides being spaced apart along the lateral axis of the tray;
a cassette configured to mount to the tray by sliding along first and second ones of the guides from either the front ends of the first and second guides or from the rear ends of the first and second guides at a discretion of a user, the cassette including a locking arrangement configured to lock to the first guide to maintain the cassette in position relative to the first guide, the cassette carrying a release handle that moves relative to the cassette along an actuation axis that extends parallel to the forward-rearward axis of the tray, the release handle releasing the locking arrangement from the first guide when moved along the actuation axis in a forward direction or a rearward direction at the discretion of the user.

Aspect 7. A communications arrangement comprising:
a tray extending along a forward-rearward axis and along a lateral axis that is orthogonal to the forward-rearward axis, the tray defining a row of bays extending along the lateral axis, each of the bays extending along a width between an engagement end of a first guide and a non-engagement end of a second guide that is adjacent the first guide, the width extending along the lateral axis;
a plurality of cassettes each configured to mount to the tray across a respective plurality of the bays, each cassette being configured to slide over the respective plurality of bays along the forward-rearward axis of the tray, each cassette including first and second engagement members that inter-connect with the engagement ends of first and second guides, wherein the cassette does not inter-connect with the non-engagement ends of the guides.

Aspect 8. A communications cassette comprising:
a body extending along a length between opposite front and rear ends, along a width between opposite first and second ends, and along a height between a top and a bottom, the body including a latching arrangement disposed at the first end of the body, the latching arrangement including:
a stop member configured to move along the height of the body between a lock position and a release position; and
a release handle that extends along the length of the body between opposite front and rear ends of the release handle so that the front end of the release handle extends outwardly beyond the front end of the body and the rear end of the release handle extends outwardly beyond the rear end of the body, the release handle being slidable along a forward-rearward axis relative to the body, the release handle being configured to transition the stop member from the lock position to the release position.

Aspect 9. A communications cassette comprising:
a body having a width extending between opposite first and second ends of the body and a depth extending between opposite front and rear ends of the body;
a row of optical adapters carried at the front end of the body so that front ports of the optical adapters are accessible from the front end of the body;
an end rail disposed at the first end of the body; and
a bottom rail disposed at an intermediate position between the first and second ends of the body, the bottom rail having a common orientation with the end rail;
the body being devoid of rails at the second end of the body.

Aspect 10. A tray arrangement extending along a lateral axis between opposite first and second ends, along a forward-rearward axis between opposite front and rear ends, and along a height between a bottom and a top, the tray arrangement comprising:
a tray having a forward end portion towards the front end of the tray arrangement, a rearward end portion toward the rearward end of the tray arrangement, and an intermediate portion disposed between the forward end portion and the rearward end portion along the forward-rearward axis, the intermediate portion being raised along the height of the tray arrangement relative to the forward end portion; and
a plurality of guides extending across the intermediate portion along the forward-rearward axis, each of the guides being mounted to the forward end portion of the tray and to the rearward end portion of the tray, each of the guides extending partially over the forward end portion and partially over the rearward end portion.

Aspect 11. A tray arrangement comprising:
a tray extending along a forward-rearward axis and along a lateral axis that is orthogonal to the forward-rearward axis; and
a plurality of guides mounted to the tray, the guides being configured to slidably receive a plurality of cassettes along the forward-rearward axis, the guides being parallel to each other and spaced apart along the lateral axis so that the plurality of cassettes includes a plurality of base-8 cassettes or a plurality of base-12 cassettes at a discretion of the user without modifying a spacing between the guides, the base-12 cassette being wider than the base-8 cassette.

Aspect 12. A tray arrangement comprising:
a tray extending along a forward-rearward axis and along a lateral axis that is orthogonal to the forward-rearward axis; and
a plurality of guides mounted to the tray, each of the guides having an L-shaped transverse cross-sectional profile.

Aspect 13. A communications panel comprising:
a chassis defining an interior;
a tray arrangement configured to mount within the interior of the chassis, the tray arrangement extending along a forward-rearward axis between opposite front and rear ends and along a lateral axis between opposite first and second sides carrying a plurality of guides spaced from each other along the lateral axis and extending generally parallel to each other, each of the guides extending along the forward-rearward axis, each of the guides defining a notch at a top of the guide; and a cassette mounted to the tray arrangement and selectively slidable along the forward-rearward axis, the cassette extending along the forward-rearward axis between opposite front and rear ends of the cassette and along the lateral axis between opposite first and second ends of the cassette, the cassette carrying a latching arrangement at the first end, the latching arrangement including a stop member aligned over the top of one of the guides when the cassette is mounted to the tray, the stop member riding over the top of the guide as the cassette is slid along the forward-rearward axis until the stop member aligns with the notch defined in the top of the guide, the stop member entering the notch when aligned with the notch along the forward-rearward axis to lock the cassette relative to the tray.

Aspect 14. A communications panel system comprising:

a chassis defining an interior extending along a forward-rearward axis between opposite front and rear ends of the chassis and along a lateral axis between opposite first and second ends of the chassis;

a tray mountable within the interior of the chassis through the front end, the tray carrying a plurality of guides spaced apart from each other along the lateral axis, each of the guides extending along the forward-rearward axis;

a plurality of cassettes configured to slide along the guides to mount to the tray, each of the cassettes extending along a width between opposite first and second ends, the first end of each cassette carrying an end rail configured to inter-connect with a respective first one of the guides, an intermediate portion of the cassette carrying a bottom rail configured to inter-connect with a respective second one of the guides, the end rail and the bottom rail extending outwardly in a common direction from a base end contacting the cassette to a free end.

Aspect 15. A method of removing a cassette from a tray having a plurality of parallel guides each extending parallel to a forward-rearward axis of the tray, the cassette being slidable along the tray relative to the guides, each cassette carrying a release handle, the method comprising:

choosing one of a forward direction and a rearward direction along which to remove the cassette from the tray;

pulling the release handle relative to the cassette in the chosen direction to unlatch the cassette from a first of the guides; and continuing to pull the release handle in the chosen direction to slide the cassette in the chosen direction relative to the first guide.

Aspect 16. A tray arrangement extending along a lateral axis between opposite first and second ends, along a forward-rearward axis between opposite front and rear ends, and along a height between a bottom and a top, the tray arrangement comprising:

a tray having opposite top and bottom surfaces each extending along the lateral axis and the forward-rearward axis, the tray defining a main region at which a plurality of apertures are defined, each of the apertures extending between the top and bottom surfaces; and a plurality of guides heat attached the tray at the main region, each of the guides including a plurality of pegs extending into respective ones of the apertures defined in the tray, each of the guides defining a grooved side facing towards the first end of the tray arrangement and a closed side facing towards the second end of the tray arrangement.

Aspect 17. A tray arrangement extending along a lateral axis between opposite first and second ends, along a forward-rearward axis between opposite front and rear ends, and along a height between a bottom and a top, the tray arrangement comprising:

a tray; and a plurality of guides mounted to the tray, each of the guides extending along the forward-rearward axis, the guides being spaced from each other along the lateral axis, the guides including a first guide and a second guide connected by a webbing so that the first and second guides mount to the tray as a unit.

Aspect 18. A method of manufacturing a plurality of tray arrangements, the method comprising:

selecting one of a first tray arrangement and a second tray, each of the first and second trays defining a plurality of apertures, each of the first and second trays defining countersinks, the first tray having a different thickness than the second tray so that the apertures of the first tray have a different height than the apertures of the second tray;

mounting a plurality of guides to the selected one of the first and second trays, the guides each having a plurality of pegs, wherein mounting the guides includes inserting the pegs into the apertures of the selected one of the first and second trays, wherein the pegs of the guides have a common size regardless of which of the first and second trays is selected; and liquefying at least portions of the pegs into the countersinks.

Aspect 19. A communications arrangement comprising:

a tray arrangement carrying a plurality of guides spaced apart from each other along a lateral axis of the tray arrangement, each of the guides extending along a forward-rearward axis of the tray arrangement;

a plurality of cassettes mounted to the tray arrangement in a row along the lateral axis of the tray arrangement, each of the cassettes defining a plurality of front apertures each configured to receive at least one port member, the front apertures of each cassette being spaced from each other along the lateral axis of the tray arrangement by a first gap, wherein the cassettes are configured so that adjacent front apertures of adjacent cassettes on the tray arrangement are separated from each other by a second gap that is about equal to the first gap.

Aspect 20. A cassette extending along a forward-rearward axis between a front of the cassette and a rear of the cassette and along a lateral axis between opposite first and second sides of the cassette, the cassette comprising:

a body defining an interior having a first lane and a second lane that each extend along the forward-rearward axis, each of the first and second lanes defining a front region disposed at a front of the cassette, a rear region disposed at a rear of the cassette, and an intermediate region disposed between the front and rear regions along the forward-rearward axis, the front regions being separated from each other by a first protrusion, the rear regions being separated from each other by a second protrusion, and the intermediate regions being continuous with each other, each of the intermediate regions being elevated relative to the respective front and rear regions.

Aspect 21. A cassette extending along a forward-rearward axis between a front of the cassette and a rear of the cassette and along a lateral axis between opposite first and second sides of the cassette, the cassette also having a height extending between a bottom of the cassette and a top of the cassette, the cassette comprising:
  a base having a top side and a bottom side, the bottom side of the base defining a bottom channel extending along the forward-rearward axis between the front and the rear of the cassette, the bottom channel having an open side at the bottom of the cassette and a closed side at a first position along the height of the cassette; and
  a peripheral wall extending upwardly beyond the top side of the base to define an interior of the cassette so that the top side of the base defines a floor of the interior, the floor of the interior having an intermediate region extending between the first and second sides, the intermediate region of the floor being disposed at a second position along the height of the cassette, the second position being disposed between the top of the cassette and the first position, the floor of the interior also having a front region disposed at the front of the cassette, the front region being disposed a third position along the height of the cassette, the third position being disposed between the bottom of the cassette and the first position.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A communications arrangement comprising:
  a tray arrangement carrying a plurality of spaced apart guides extending parallel to each other along a forward-rearward axis of the tray arrangement; and
  a cassette configured to mount to the tray arrangement, the cassette carrying a plurality of port members, the cassette being sized to extend from a first of the guides, over a second of the guides, to a third of the guides, the cassette being configured to inter-connect with the first guide and the second guide, but not the third guide.

2. The communications arrangement of claim 1, wherein the guides are spaced apart from each other along a lateral axis of the tray arrangement by a common distance, the lateral axis being orthogonal to the forward-rearward axis, and wherein the tray arrangement defines a row of bays extending along the lateral axis, each of the bays extending away from an engagement end of a respective guide by the common distance, the cassette spanning at least two of the bays.

3. The communications arrangement of claim 2, wherein each guide defines a non-engagement side directly opposite the engagement side, wherein the cassette directly opposes the non-engagement side of the third guide.

4. The communications arrangement of claim 2, wherein the cassette is a first cassette of a plurality of cassettes, each of the cassettes being sized to span at least two respective bays, wherein the plurality of cassettes includes a second cassette spanning a different number of the bays than the first cassette.

5. The communications arrangement of claim 1, wherein the cassette is configured to mount to the tray arrangement by sliding along the first and second guides from either front ends of the first and second guides or from rear ends of the first and second guides at a discretion of a user.

6. The communications arrangement of claim 5, wherein the cassette includes a latching arrangement to secure the cassette to the tray arrangement in a stationary position relative to the first and second guides.

7. The communications arrangement of claim 6, wherein the latching arrangement is disposed above the first guide so that the latching arrangement slides along a top of the first guide as the cassette is moved relative to the tray arrangement and so that the latching arrangement includes a stop member that engages the first guide when the cassette is disposed in the stationary position.

8. The communications arrangement of claim 1, wherein the cassette defines a closed interior; and wherein the plurality of port members includes a plurality of front port members and at least one rear port member.

9. The communications arrangement of claim 1, wherein the cassette has an open top; and wherein the plurality of port members include only front port members.

10. The communications arrangement of claim 1, further comprising a fiber management structure mounted within an interior of the cassette by inserting a portion of the fiber management structure through an aperture defined in a floor of the cassette, the fiber management structure being configured to selectively lock to the cassette through twisting so that the portion engages retaining structures at an exterior of the floor of the cassette.

11. The communications arrangement of claim 1, further comprising:
  a beak extending forwardly from a front end of the cassette at a location disposed between adjacent ones of the port members, the beak defining an upwardly facing ramp; and
  a curved protrusion extending upwardly from a top of the cassette at the front end of the cassette.

12. The communications arrangement of claim 1, wherein the cassette includes a body defining an interior having a first lane and a second lane that each extend along the forward-rearward axis, each of the first and second lanes defining a front region disposed at a front of the cassette, a rear region disposed at a rear of the cassette, and an intermediate region disposed between the front and rear regions along the forward-rearward axis, at least some of the port members being disposed at the front of the cassette, the front regions being separated from each other by a first protrusion, the rear regions being separated from each other by a second protrusion, and the intermediate regions being continuous with each other, each of the intermediate regions being elevated relative to the respective front and rear regions.

13. A communications arrangement comprising:
  a tray carrying a plurality of guides spaced apart from each other along a lateral axis, each of the guides extending along a forward-rearward axis that is orthogonal to the lateral axis;
  a plurality of cassettes configured to slide along the guides to mount to the tray, each of the cassettes extending along a width between opposite first and second ends, the cassettes being oriented on the tray so that the widths of the cassettes extend along the lateral axis, the first end of each cassette carrying an end rail configured to inter-connect with a respective first one of the guides, an intermediate portion of the cassette carrying a bottom rail configured to inter-connect with a respective second one of the guides, each of the end rail and the bottom rail extending outwardly in a common direction from a respective base end contacting the cassette to a respective free end.

14. The communications arrangement of claim 13, wherein each of the cassettes defines at least one bottom channel extending along the forward-rearward axis when the cassette is mounted to the tray, the bottom channel being sized to accommodate one of the guides, and the bottom rail being disposed in the bottom channel.

15. The communications arrangement of claim 14, wherein the bottom channel is a first bottom channel; and wherein at least one of the cassettes defines a plurality of bottom channels, each of the bottom channels being sized to accommodate a respective one of the guides.

16. The communications arrangement of claim 15, further comprising an additional bottom rail disposed at a second one of the plurality of bottom channels, the additional bottom rail having a different shape than the bottom rail.

17. The communications arrangement of claim 13, wherein the bottom rail is flush with a bottom surface of the cassette.

18. The communications arrangement of claim 13, further comprising a fiber management structure mounted within an interior of one of the cassettes by inserting a portion of the fiber management structure through an aperture defined in a floor of the cassette, the fiber management structure being configured to selectively lock to the cassette through twisting so that the portion engages retaining structures at an exterior of the floor of the cassette.

19. The communications arrangement of claim 13, further comprising:
   a beak extending forwardly from a front end of one of the cassettes at a location disposed between adjacent ones of the port members, the beak defining an upwardly facing ramp; and
   a curved protrusion extending upwardly from a top of the one of the cassettes at the front end of the cassette.

20. A communications panel comprising:
   a chassis defining an interior;
   a plurality of the communications arrangements of claim 1 disposed within the interior.

21. The communications panel of claim 20, wherein the communications arrangements are independently movable between retracted and extended positions relative to the chassis.

* * * * *